(12) United States Patent
Yang et al.

(10) Patent No.: US 10,464,811 B2
(45) Date of Patent: Nov. 5, 2019

(54) METHOD OF FORMING A PARTICULATE POROUS METAL OXIDE OR METALLOID OXIDE

(75) Inventors: Yanhui Yang, Singapore (SG); Siu-Choon Ng, Singapore (SG); Xianbin Liu, Singapore (SG); Laisheng Li, Singapore (SG); Yu Du, Singapore (SG)

(73) Assignee: NANYANG TECHNOLOGICAL UNIVERSITY, Singapore (SG)

( * ) Notice: Subject to any disclaimer, the term of this patent is extended or adjusted under 35 U.S.C. 154(b) by 1157 days.

(21) Appl. No.: 12/754,519

(22) Filed: Apr. 5, 2010

(65) Prior Publication Data
US 2010/0254890 A1 Oct. 7, 2010

Related U.S. Application Data

(60) Provisional application No. 61/166,802, filed on Apr. 6, 2009.

(51) Int. Cl.
*C01B 13/36* (2006.01)
*B01J 20/10* (2006.01)
(Continued)

(52) U.S. Cl.
CPC ............. *C01B 13/36* (2013.01); *B01J 20/103* (2013.01); *B01J 20/283* (2013.01);
(Continued)

(58) Field of Classification Search
CPC ............... B01J 20/103; B01J 20/28004; B01J 20/28019; B01J 20/28064; B01J 20/28066;
(Continued)

(56) References Cited

U.S. PATENT DOCUMENTS 5,958,367 A * 9/1999 Ying .................. C01B 13/32
423/701
2006/0275927 A1 12/2006 Dubin et al. ............... 438/1
(Continued)

FOREIGN PATENT DOCUMENTS

WO 96/23879 8/1996
WO 03/029462 4/2003
WO WO 2006106493 A1 * 10/2006 ............. B01J 20/28

OTHER PUBLICATIONS

Fulvio et al (NPL: "Tailoring properties of SBA-15 materials by controlling conditions of hydrothermal synthesis"), 2005, pp. 5049-5053, vol. 15, Journal of Materials chemistry).*

(Continued)

*Primary Examiner* — Melvin C. Mayes
*Assistant Examiner* — Smita S Patel
(74) *Attorney, Agent, or Firm* — Seed IP Law Group LLP

(57) ABSTRACT

The present invention relates to a method of forming a particulate porous metal oxide or metalloid oxide, as well as uses of the obtained a particulate porous metal oxide or metalloid oxide. A solution of a non-ionic surfactant and either an ionic surfactant or an inorganic salt is formed in an acidic aqueous solution. A metal oxide precursor or a metalloid oxide precursor is added. The formed reaction mixture is heated under reflux upon agitation for a period sufficient to obtain a particulate porous metal oxide or metalloid oxide.

20 Claims, 20 Drawing Sheets

(51) Int. Cl.
  B01J 20/28      (2006.01)
  B01J 20/283     (2006.01)
  B01J 20/32      (2006.01)
  B01J 29/03      (2006.01)
  B01J 31/16      (2006.01)
  C01B 37/02      (2006.01)

(52) U.S. Cl.
  CPC ... *B01J 20/28004* (2013.01); *B01J 20/28019* (2013.01); *B01J 20/28047* (2013.01); *B01J 20/28064* (2013.01); *B01J 20/28066* (2013.01); *B01J 20/28069* (2013.01); *B01J 20/28083* (2013.01); *B01J 20/3204* (2013.01); *B01J 20/3219* (2013.01); *B01J 29/0308* (2013.01); *B01J 29/0325* (2013.01); *B01J 31/1633* (2013.01); *C01B 13/363* (2013.01); *C01B 37/02* (2013.01); *B01J 2531/18* (2013.01); *C01P 2002/01* (2013.01); *C01P 2002/72* (2013.01); *C01P 2002/86* (2013.01); *C01P 2004/03* (2013.01); *C01P 2006/12* (2013.01); *C01P 2006/14* (2013.01); *C01P 2006/16* (2013.01)

(58) Field of Classification Search
  CPC ............ B01J 20/28069; B01J 20/28083; B01J 20/283; B01J 20/3204; B01J 20/3219; B01J 29/0308; B01J 29/0325; C01P 2006/12; C01P 2006/14; C01P 2006/16; C01P 2002/01; C01P 2002/00; C01P 2002/72; C01P 2002/86; C01P 2004/03; C01B 13/36; C01B 13/363; C01B 13/14
  See application file for complete search history.

(56) References Cited

U.S. PATENT DOCUMENTS

2007/0191499 A1* 8/2007 Chmelka et al. ............... 521/27
2010/0051877 A1* 3/2010 Wei et al. ................. 252/408.1

OTHER PUBLICATIONS

Zhao et al (CN101274766—see machine translation and derwent abstract), published Oct. 1, 2008.*
PCT/IE2008/000074, Holmes et al (english translation), 2008.*
Stevens et al (NPL: Investigation of the Morphology of the Mesoporous SBA-16 and SBA-15 Materials, J.Phys. Chem. 2006, 110, pp. 9183-9187).*
Anunziata et al (NPL: Synthesis and characterization of SBA-13, SBA-15 and SBA-1 nanostructured catalytic materials, Journal of colloid and interface science, Vo.315, issue 1, Nov. 2007, pp. 184-190).*
ES2181528, Amoros Del Toro et al, machine translation, publication date Feb. 2003.*
Barrett et al., "The Determination of Pore Volume and Area Distributions in Porous Substances. I. Computations from Nitrogen Isotherms," J. Am. Chem. Soc. 73(1):373-380, 1951.
Beste et al., "Small antibody-like proteins with prescribed ligand specificities derived from the lipocalin fold," Proc. Natl. Acad. Sci. USA 96:1898-1903, 1999.
Boissiere et al., "Spherical MSU-1 Mesoporous Silica Particles Tuned for HPLC," Adv. Funct. Mater. 11(2):129-135, 2001.
Brunauer et al., "Adsorption of Gases in Multimolecular Layers," J. Am. Chem. Soc. 60(2):309-319, 1938.
Cassiers et al., "A Detailed Study of Thermal, Hydrothermal, and Mechanical Stabilities of a Wide Range of Surfactant Assembled Mesoporous Silicas," Chem. Mater. 14:2317-2324, 2002.
Chen et al., "Studies on mesoporous materials I. Synthesis and characterization of MCM-41," Microporous Materials 2:17-26, 1993.

Chen et al., "Faceted single crystals of mesoporous silica SBA-16 from a ternary surfactant system: surface roughening model," Microporous and Mesoporous Materials 81:241-249, 2005.
Chi et al., "CO oxidation over gold nanocatalyst confined in mesoporous silica," Applied Catalysis A: General 284:199-206, 2005.
Choma et al., "Critical appraisal of classical methods for determination of mesopore size distributions of MCM-41 materials," Applied Surface Science 196:216-223, 2002.
Deng et al., "In situ hydrothermally synthesized mesoporous LaCoO3/SBA-15 catalysts: High activity for the complete oxidation of toluene and ethyl acetate," Applied catalysis A: General 352:43-49, 2009.
Egeland et al., "Electrochemically directed synthesis of oligonucleotides for DNA microarray fabrication," Nucleic Acids Research 33(14):1-7, 2005.
Flodstrom et al., "In situ Synchrotron Small-Angle X-ray Scattering/X-ray Diffraction Study of the Formation of SBA-15 Mesoporous Silica," Langmuir 20:4885-4891, 2004.
Flodstrom et al., "Mechanism of Mesoporous Silica Formation. A Time-Resolved NMR and TEM Study of Silica-Block Copolymer Aggregation," Langmuir 20:680-688, 2004.
Fulvio et al., "Short-time synthesis of SBA-15 using various silica sources," Journal of Colloid and Interface Science 287:717-720, 2005.
Fulvio et al., "Tailoring properties of SBA-15 materials by controlling conditions of hydrothermal synthesis," J. Mater. Chem. 15:5049-5053, 2005.
Galacho et al., "Evaluation of the thermal and mechanical stability of Si-MCM-41 and Ti-MCM-41 synthesised at room temperature," Microporous and Mesoporous Materials 108:283-293, 2008.
Gallis et al., "The Use of Mesoporous Silica in Liquid Chromatography," Adv. Mater. 11(17):1452-1455, 1999.
Gill et al., "Biopharmaceutical drug discovery using novel protein scaffolds," Current Opinion in Biotechnology 17:653-658, 2006.
Gritti et al., "Ultra high pressure liquid chromatography Column permeability and changes of the eluent properties," Journal of Chromatography A 1187:165-179, 2008.
Holt et al., "Domain antibodies: proteins for therapy," Trends in Biotechnology 21(11):484-490, Nov. 2003.
Hwang et al., "Noncovalent Immobilization of Proteins on a Solid Surface by Cucurbit[7]uril-Ferrocenemethylammonium Pair, a Potential Replacement of Biotin-Avidin Pair," J. Am. Chem. Soc. 129:4170-4171, 2007.
Iliades et al., "Triabodies: single chain Fv fragments without a linker form trivalent trimers," FEBS Letter 409(3):437-441, Jun. 16, 1997.
Imperor-Clerc et al., "New insights into the initial steps of the formation of SBA-15 materials: an in situ small angle neutron scattering investigation," Chem. Commun. pp. 834-836, 2007.
Inagaki et al., "Mesoporous materials derived from layered silicates and the adsorption properties," Studies in Surface Science and Catalysis 117:65-76, 1998.
Kailasam et al., "Physico-chemical characterization of MCM-41 silica spheres made by the pseudomorphic route and grafted with octadecyl chains," Journal of Chromatography A. 1991:125-135, 2008.
Kim et al., "Synthesis of highly ordered mesoporous silica materials using sodium silicate and amphiphilic block copolymers," Chem. Commun. pp. 1159-1160, 2000.
Kleitz et al., "Phase Domain of the Cubic Im3m Mesoporous Silica in the $EO_{106}PO_{70}EO_{106}$-Butanol-$H_2O$ System," Langmuir 22:440-445, 2006.
Kong et al., "A facile direct route to synthesize large-pore mesoporous silica incorporating high CuO loading with special catalytic property," Microporous and Mesoporous Materials 118:348-353, 2009.
Kruk et al., "Relations between Pore Structure Parameters and Their Implications for Characterization of MCM-41 Using Gas Adsorption and X-ray Diffraction," Chem. Mater. 11:492-500, 1999.
Kruk et al., "Gas Adsorption Characterization of Ordered Organic-Inorganic Nanocomposite Materials," Chem. Mater. 13:3169-3183, 2001.

(56) References Cited

OTHER PUBLICATIONS

Kurganov et al., "Packings of an unidimensional regular pore structure as model packings in size-exclusion and inverse size-exclusion chromatography," Journal of Chromatography A. 753:177-190, 1996.
Kwon et al., "Quantitative Evaluation of the Relative Cell Permeability of Peptoids and Peptides," J. Am. Chem. Soc. 129:1508-1509, 2007.
Lin et al., "Synthesis of SBA-16 and SBA-15 mesoporous silica crystals templated with neutral block copolymer surfactants," Journal of Physics and Chemistry of Solids 69:415-419, 2008.
Link et al., "Size and Temperature Dependence of the Plasmon Absorption of Colloidal Gold Nanoparticles," J. Phys. Chem. B 103:4212-4217, 1999.
Liu et al., "Rapid synthesis of highly ordered Si-MCM-41," Journal of Colloid and Interface Science 319:377-380, 2008.
Ma et al., "Large-pore mesoporous silica spheres: synthesis and application in HPLC," Colloids and Surfaces A: Physicochem. Eng. Aspects 229:1-8, 2003.
Manyar et al., "Active Biocatalysts Based on Pepsin Immobilized in Mesoporous SBA-15," J. Phys. Chem. C 112:18110-18116, 2008.
Martin et al., "Great Improvement of Chromatographic Performance Using MCM-41 Spheres as Stationary Phase in HPLC," Chem. Mater. 16:1725-1731, 2004.
Mesa et al., "Morphology and porosity characteristics control of SBA-16 mesoporous silica. Effect of the triblock surfactant Pluronic F127 degradation during the synthesis," Solid State Sciences 7:990-997, 2005.
Michaux et al., "Hydrothermal stability of mesostructured silica prepared using a nonionic fluorinated surfactant," Microporous and Mesoporous Materials 116:308-317, 2008.
Mizutani et al., "Pore-expansion of monodisperse mesoporous silica spheres by a novel surfactant exchange method," Chem. Commun. pp. 1172-1174, 2007.
Mosavi et al., "The ankyrin repeat as molecular architecture for protein recognition," Protein Science 13:1435-1448, 2004.
Mureseanu et al., "Modified SBA-15 mesoporous silica for heavy metal ions remediation," Chemosphere 73:1499-1504, 2008.
Nakazawa et al., "Controlled Loadings in a Mesoporous Material: Click-on Silica," J. Am. Chem. Soc. 130(44):14360-14361, 2008.
Orlov et al., "Oxidation of volatile organic compounds on SBA-15 mesoporous molecular sieves modified with manganese," Chemosphere 74:344-348, 2009.
Park et al., "Large-pore mesoporous silica with three-dimensional wormhole framework structures," Microporous and Mesoporous Materials 118:239-244, 2009.
Qin et al., "Adsorption of anionic dyes on ammonium-functionalized MCM-41," Journal of Hazardous Materials 162:133-139, 2009.
Kadin et al., "The controlled release of drugs from emulsified, sol gel processed silica microspheres," Biomaterials 30:850-858, 2009.
Raimondo et al., "Mesoporous M41S materials in capillary gas chromatography," Chem. Commun. pp. 1343-1344, 1997.
Regev, O., "Nucleation Events during the Synthesis of Mesoporous Materials Using Liquid Crystalline Templating," Langmuir 12:4940-4944, 1996.
Ruthstein et al., "Resolving Intermediate Solution Structures during the Formation of Mesoporous SBA-15," J. Am. Chem. Soc. 128:3366-3374, 2006.
Ryoo et al., "Ordered mesoporous carbon molecular sieves by templated synthesis: the structural varieties," Studies in Surface Science and Catalysis 135:150, 2001.
Silverman et al., "Multivalent avimer proteins evolved by exon shuffling of a family of human receptor domains," Nature Biotechnology 23(12):1556-1561, Dec. 2005.
Skerra, A., "Engineered protein scaffolds for molecular recognition," Journal of Molecular Recognition 13:167-187, 2000.
Somani et al., "Textural and Structural Properties of Mesoporous Silica Synthesized Under Refluxing Conditions," Journal of Porous Materials 12:87-94, 2005.
Stober et al., "Controlled Growth of Monodisperse Silica Spheres in the Micron Size Range," Journal of Colloid and Interface Science 26:62-69, 1968.
Stone et al., "The assembly of single domain antibodies into bispecific decavalent molecules," Journal of Immunological Methods 318:88-94, 2007.
Takimoto et al., "Encapsulation of cellulase with mesoporous silica (SBA-15)," Microporous and Mesoporous Materials 116:601-606, 2008.
Tatsumi et al., "Mechanical Stability of Mesoporous Materials, MCM-48 and MCM-41," Journal of Porous Materials 6:13-17, 1999.
Thoelen et al., "The use of M41S materials in chiral HPLC," Chem. Commun. pp. 1841-1842, 1999.
Xu et al., "Controlled drug release from bifunctionalized mesoporous silica," Journal of Solid State Chemistry 181:2837-2844, 2008.
Yu et al., "Nonionic Block Copolymer Synthesis of Large-Pore Cubic Mesoporous Single Crystals by Use of Inorganic Salts," J. Am. Chem. Soc. 124:4556-4557, 2002.
Yu et al., "Morphology Development of Mesoporous Materials: a Colloidal Phase Separation Mechanism," Chem. Mater. 16:889-898, 2004.
Zhang et al., "Mesoporous Silica with Multiple Catalytic Functionalities," Adv. Funct. Mater. 18:3590-3597, 2008.
Zhao et al., "Nonionic Triblock and Star Diblock Copolymer and Oligomeric Surfactant Syntheses of Highly Ordered, Hydrothermally Stable, Mesoporous Silica Structures," J. Am. Chem. Soc. 120:6024-6036, 1998.
Zhao et al., "Triblock Copolymer Syntheses of Mesoporous Silica with Periodic 50 to 300 Angstrom Pores," Science 279:548-552, Jan. 23, 1998.
Zhao et al., "Biomolecule separation using large pore mesoporous SBA-15 as a substrate in high performance liquid chromatography," Chem. Commun. pp. 752-753, 2002.
Zhu et al., "Chiral mesoporous organosilica spheres: Synthesis and chiral separation capacity," Microporous and Mesoporous Materials 116:36-43, 2008.

\* cited by examiner

| sample | d spacing /nm | $S_{BET}$ /m²/g | Pore size /nm | $V_p$ /cm³/g | Wall thickness /nm |
|---|---|---|---|---|---|
| 2 h without CTAB | 9.6 | 977 | 5.4 | 1.50 | 5.69 |
| 45 min | 10.1 | 1125 | 7.5 | 2.90 | 4.16 |
| 1 h | 10.1 | 744 | 7.5 | 1.80 | 4.16 |
| 1.5 h | 10.0 | 623 | 8.2 | 1.77 | 3.35 |
| 2 h | 9.8 | 743 | 8.0 | 2.10 | 3.32 |

Fig. 3

| sample | d spacing /nm | S$_{BET}$ /m²/g | Pore size /nm | V$_p$ /cm³/g | Wall thickness /nm |
|---|---|---|---|---|---|
| 5 h | 8.2 | 804 | 5.2 | 2.90 | 4.27 |
| 6h | 9.8 | 743 | 8.0 | 2.10 | 3.32 |
| 24 h | 10.0 | 651 | 8.2 | 2.00 | 3.35 |

Fig. 4

| sample | d spacing /nm | S$_{BET}$ /m²/g | Pore size /nm | V$_p$ /cm³/g | Wall thickness /nm |
|---|---|---|---|---|---|
| 6h | 9.8 | 743 | 8.0 | 2.10 | 3.32 |
| Boiling water for 12 h | 10.0 | 522 | 9.0 | 1.50 | 2.55 |
| 1073 K for 12 h | 9.3 | 598 | 6.8 | 1.70 | 3.94 |
| 450 Mpa for 10 min | 9.8 | 533 | 7.5 | 1.20 | 3.81 |

Fig. 5

| sample | d spacing /nm | S$_{BET}$ /m²/g | Pore size /nm | V$_p$ /cm³/g | Wall thickness /nm |
|---|---|---|---|---|---|
| parent SBA-15 | 10.0 | 858 | 5.8 | 1.25 | 5.75 |
| Boiling water for 12 h | 10.0 | 477 | 7.5 | 1.20 | 4.04 |
| 1073 K for 12 h | 9.5 | 451 | 4.8 | 1.20 | 6.17 |
| 450 Mpa for 10 min | 10.0 | 641 | 3.7, 5.7 | 0.87 | 5.84 |

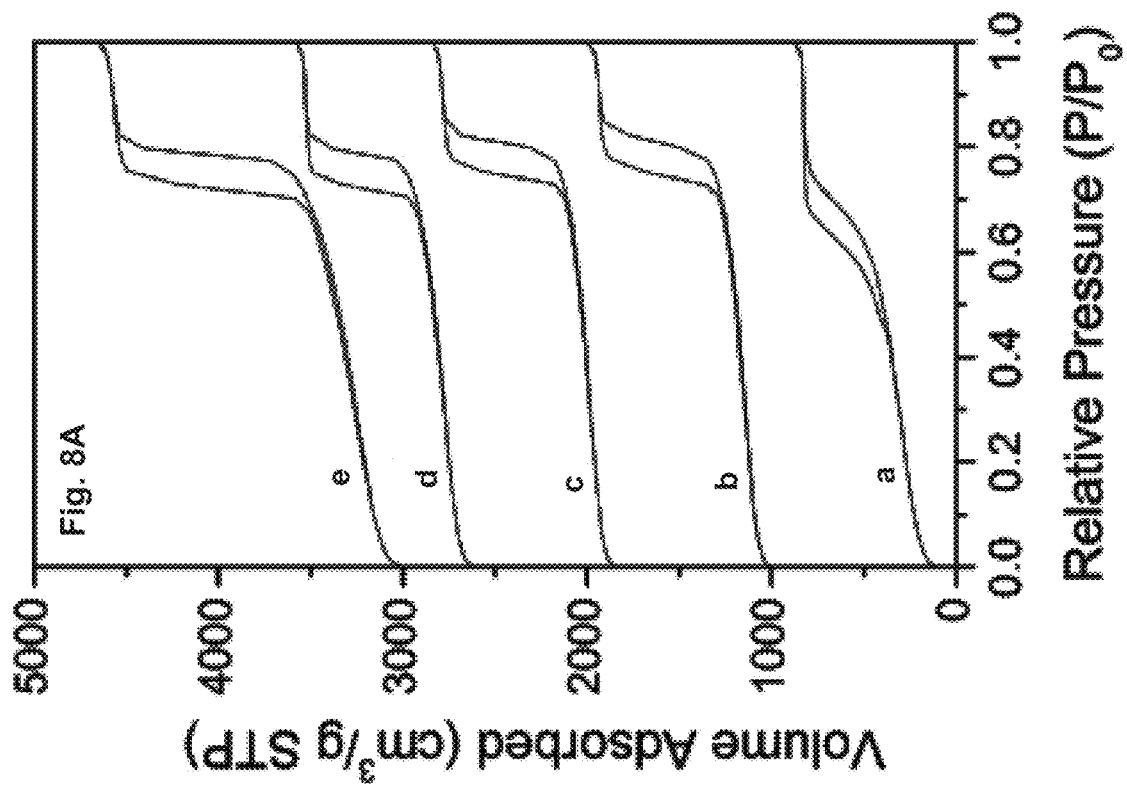
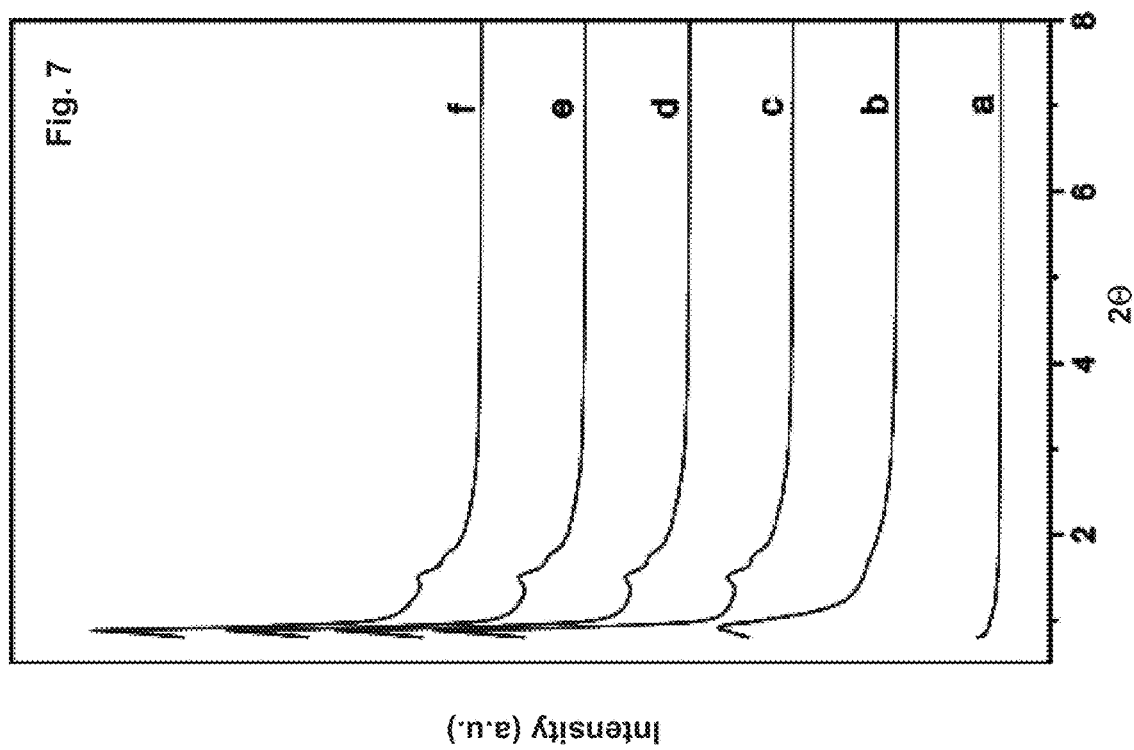

Chemical shift / ppm

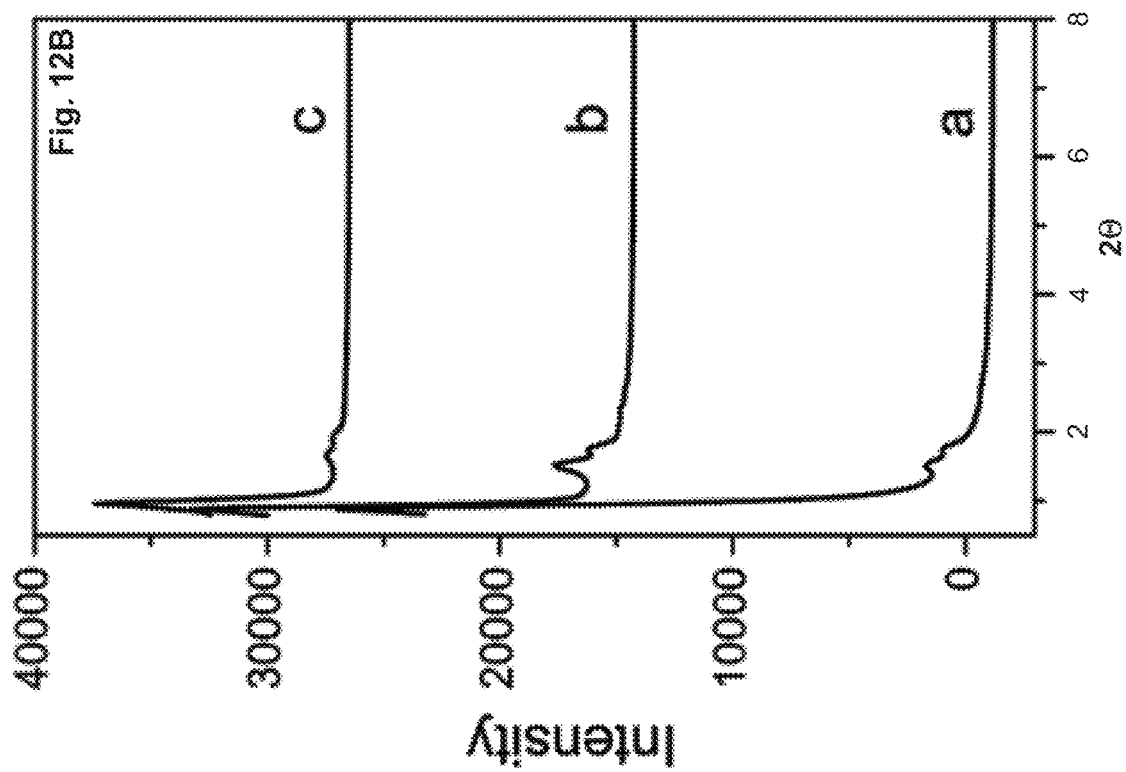
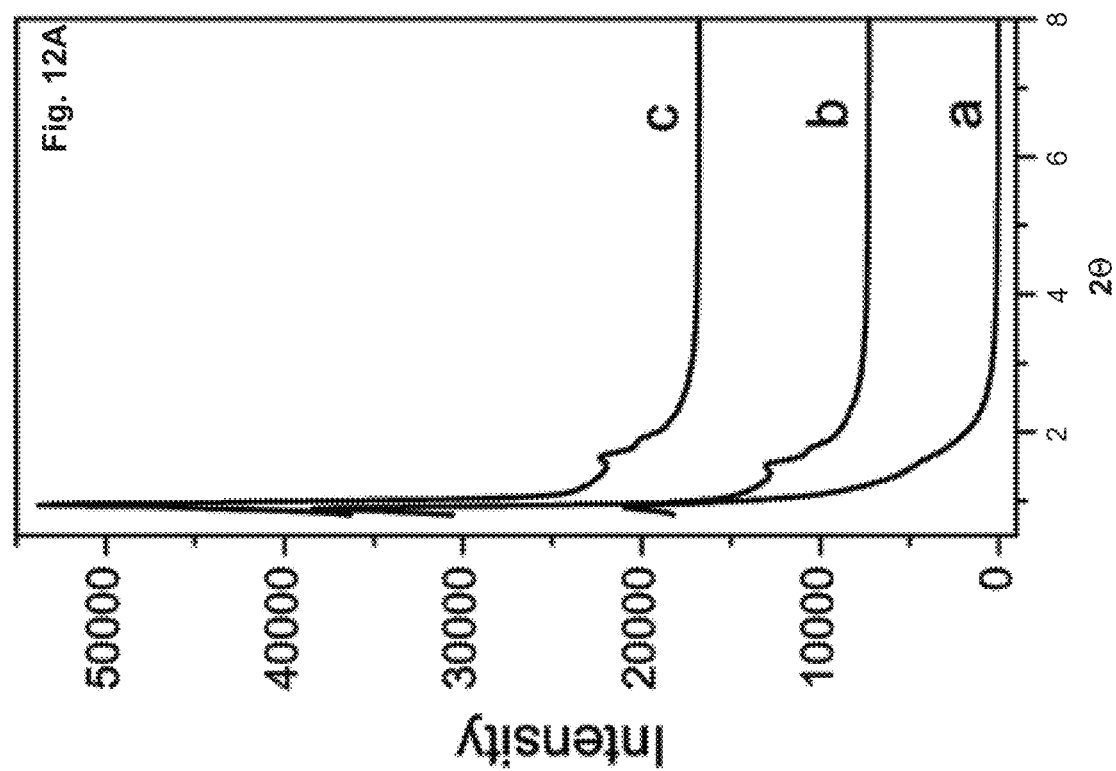

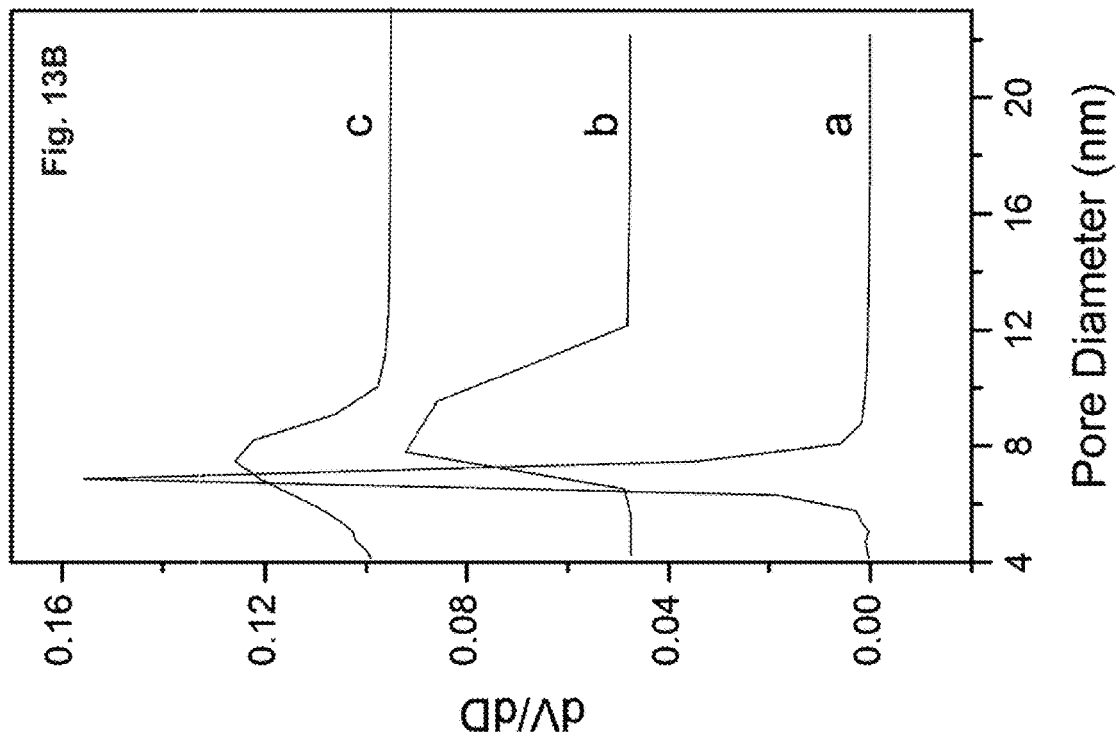
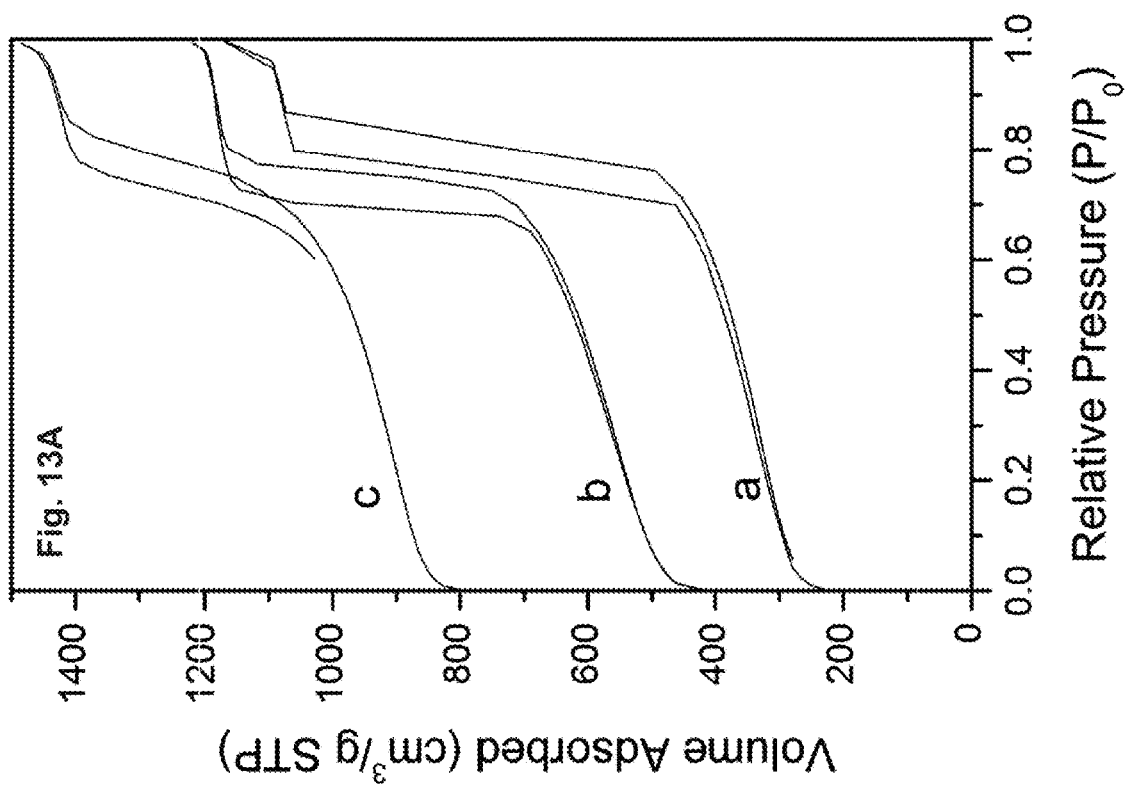

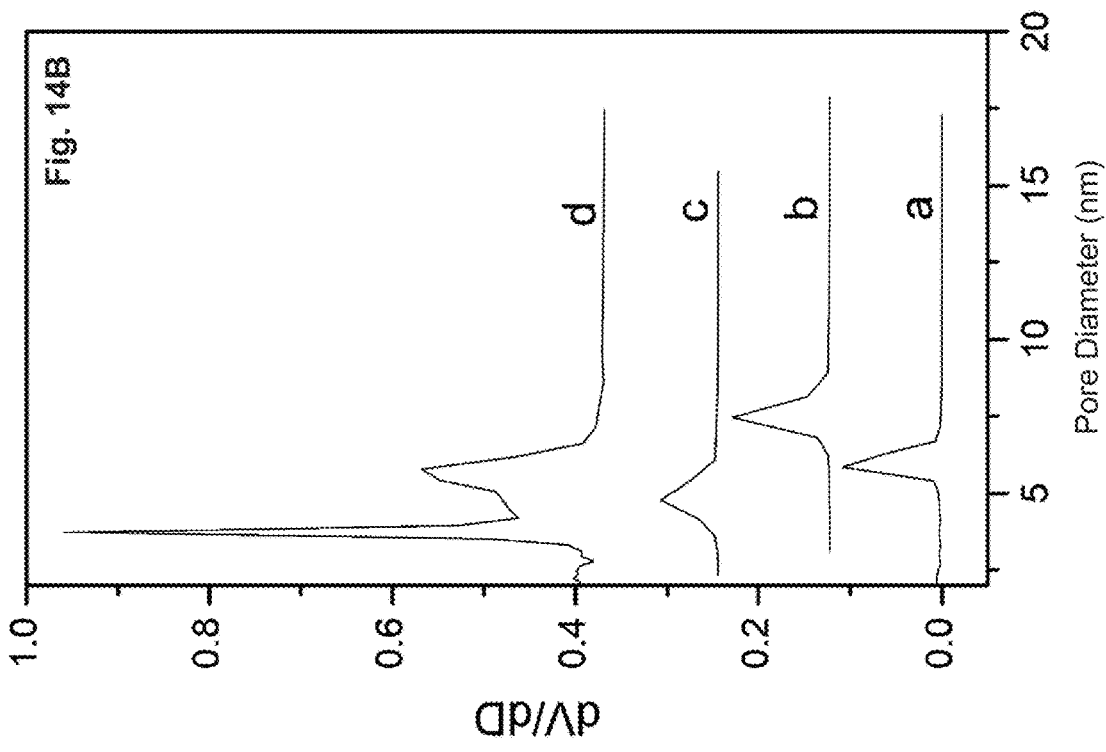
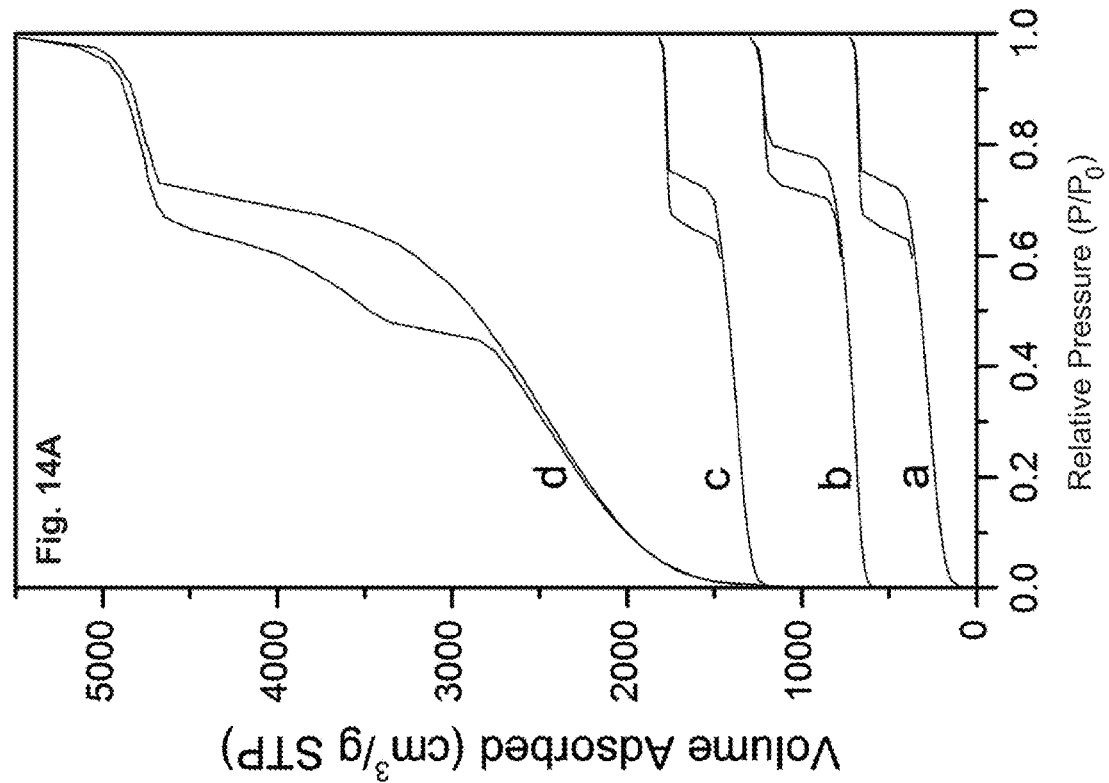
Fig. 14A
Fig. 14B

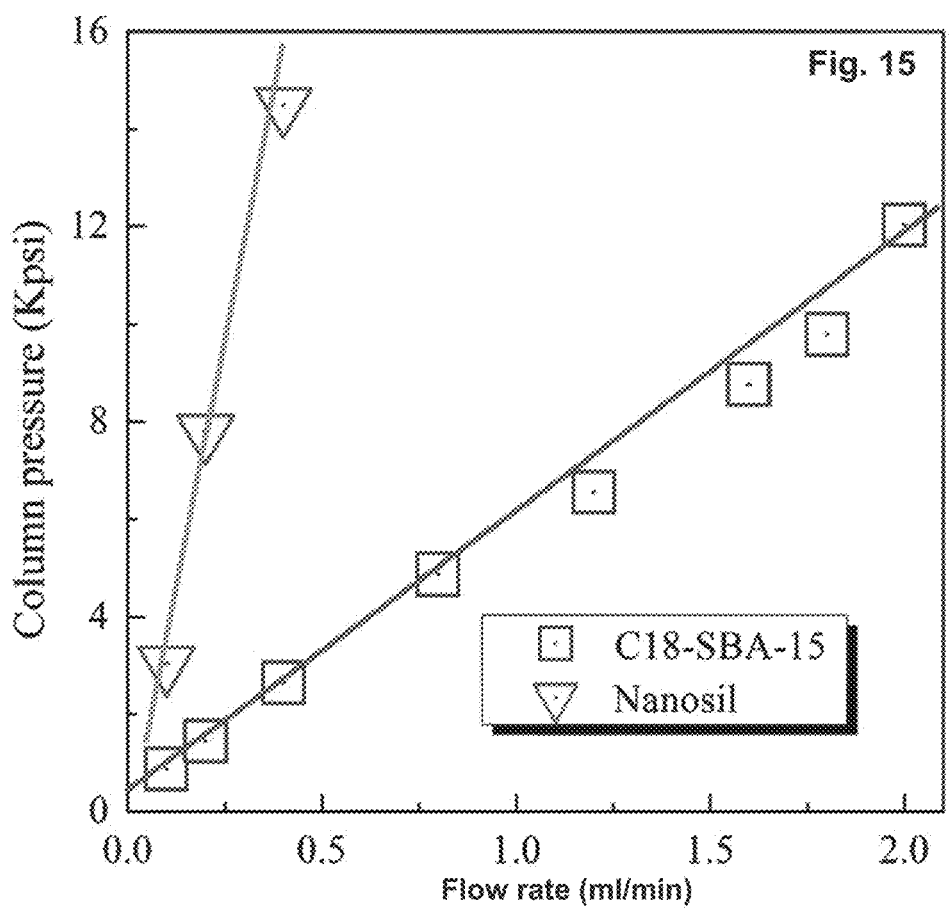
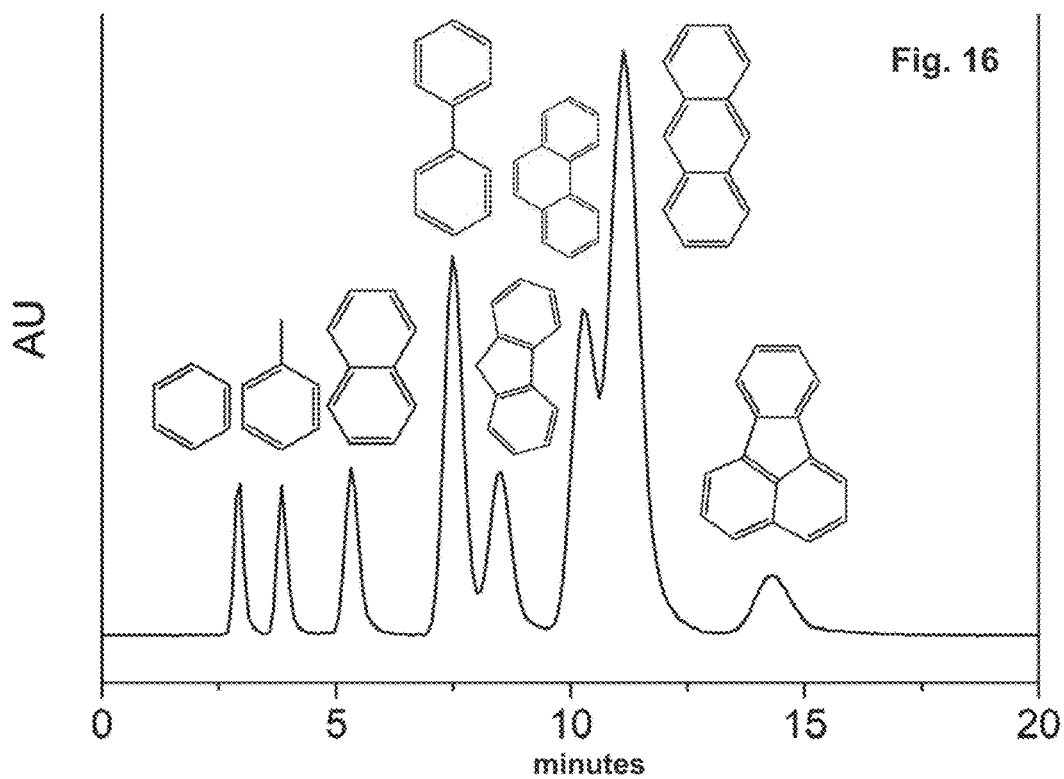

Fig. 17: Textural parameters of various SBA-16 samples

| Sample | d-spacing (nm) | $S_{BET}$ (m$^2$/g) | D (nm) | $V_p$ (cm$^3$/g) | $a_0$ (nm) | t (nm) |
|---|---|---|---|---|---|---|
| SBA-16-cv | 9.0 | 1203 | 3.4 | 1.35 | 12.73 | 7.6 |
| SBA-16-01/06 | 9.0 | 691 | 3.5 | 0.70 | 12.73 | 7.6 |
| SBA-16-1.5/06 | 10.4 | 994 | 3.5 | 0.94 | 14.71 | 9.2 |
| SBA-16-02/06 | 8.9 | 1114 | 3.4 | 1.34 | 12.59 | 7.5 |
| SBA-16-cv-hy* | / | 285 | 3.5 | 0.48 | / | / |
| SBA-16-02/06-hy* | 9.0 | 527 | 3.5 | 0.6 | 12.73 | 7.5 |
| SBA-16-cv-th* | 8.5 | 300 | 3.3 | 0.29 | 12.02 | 7.1 |
| SBA-16-02/06-th* | 8.5 | 551 | 3.4 | 0.38 | 12.02 | 7.0 |
| SBA-16-cv-3.15ton | 9.5 | 540 | 3.5 | 0.6 | 13.44 | 8.1 |
| SBA-16-cv-4.17ton | 9.2 | 446 | 3.5 | 0.38 | 13.01 | 7.9 |
| SBA-16-cv-10ton | 9.2 | 370 | 3.4 | 0.36 | 13.01 | 7.8 |
| SBA-16-cv-13.5ton | / | 317 | 3.4 | 0.29 | / | / |
| SBA-16-02/06-3.15ton | 8.8 | 1008 | 3.3 | 0.71 | 12.45 | 7.5 |
| SBA-16-02/06-4.17ton | 8.8 | 769 | 3.4 | 0.55 | 12.45 | 7.4 |
| SBA-16-02/06-10ton | 8.8 | 577 | 3.3 | 0.42 | 12.45 | 7.5 |
| SBA-16-02/06-13.5ton | 8.5 | 551 | 3.2 | 0.38 | 12.02 | 7.2 |

Fig. 18: Results of benzyl alcohol oxidation over Au-containing mesoporous silica catalysts

| Catalyst | Pre-treatment | TOF (h⁻¹) | Conv. (%) | Benzyldehyde select. (%) |
|---|---|---|---|---|
| SBA-16 | - | - | < 1.0 | - |
| Au/SBA-16-80 | Air, 80 °C | 803 | 6.3 | > 99 |
| Au/SBA-16-540 | Air, 540 °C | 484 | 3.8 | > 99 |
| Au/SBA-16-200H | H$_2$, 200 °C | 1655 | 13.0 | > 99 |
| Au/SBA-16-400H | H$_2$, 400 °C | 2419 | 19.0 | > 99 |
| Au/SBA-15-400H | H$_2$, 400 °C | 2048 | 16.1 | > 99 |
| Au/MCM-41-400H | H$_2$, 400 °C | 827 | 6.5 | > 99 |

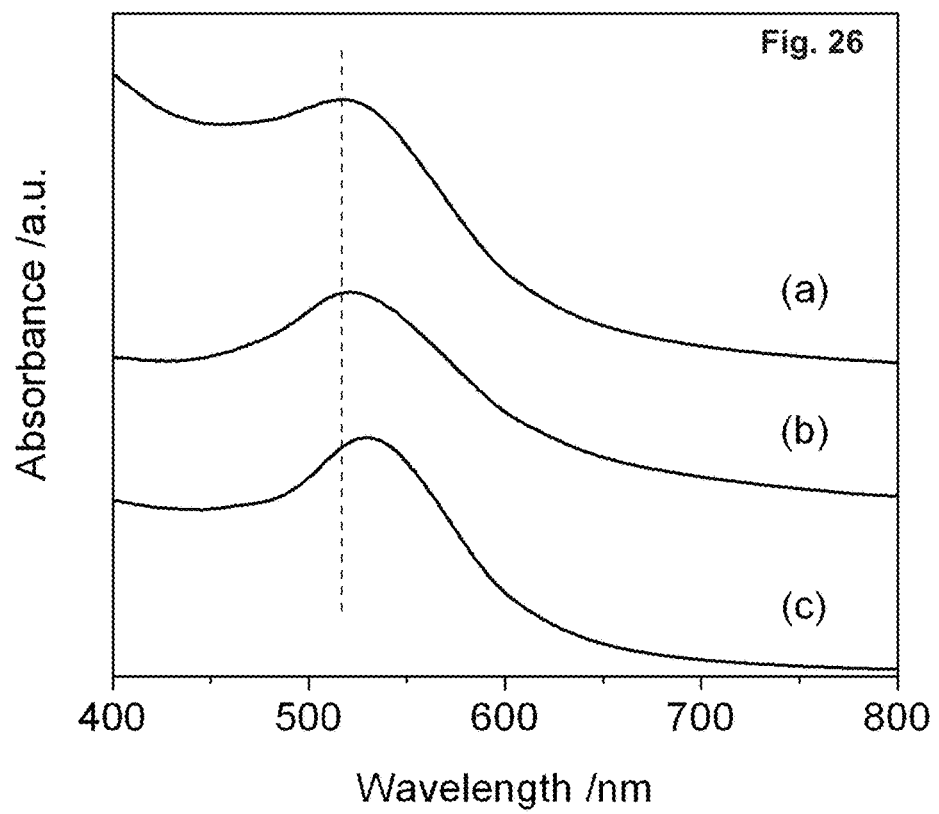
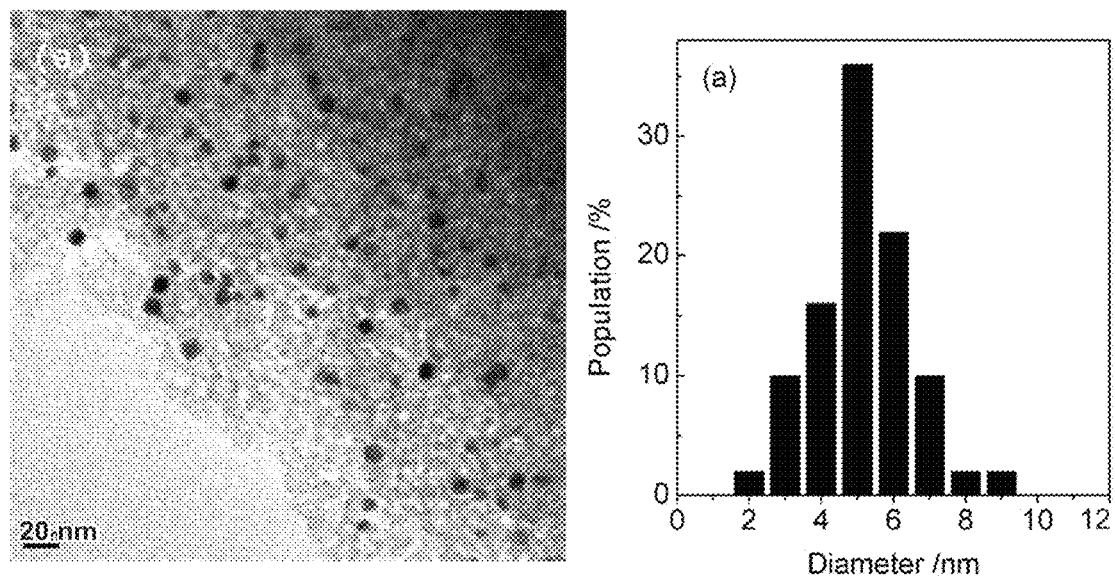

METHOD OF FORMING A PARTICULATE POROUS METAL OXIDE OR METALLOID OXIDE

CROSS-REFERENCE TO RELATED APPLICATIONS

This application makes reference to and claims the benefit of priority of an application for "method of forming a particulate porous metal oxide or metalloid oxide" filed on Apr. 6, 2009 with the United States Patent and Trademark Office, and there duly assigned Ser. No. 61/166,802. The content of said application filed on Apr. 6, 2009 is incorporated herein by reference for all purposes in its entirety.

FIELD OF THE INVENTION

The present invention relates to a method of forming a particulate porous metal oxide or metalloid oxide. The invention also relates to uses of a particulate porous metal oxide or metalloid oxide obtainable by the method.

BACKGROUND OF THE INVENTION

Due to its large surface area, mesoporous silica has received attention, rendering it useful for a variety of applications including as adsorbent in gas or liquid phase. Since the discovery of M41 S family mesoporous silicas, studies in ordered mesoporous materials have attracted extensive attention. SBA-15 mesoporous silica has been extensively studied due to its large pore size, thick pore walls, and high hydrothermal stability. These features are of great interest for various applications such as adsorption, catalysis, separations, and hard-templating synthesis of nanowires, nanotubes, ordered mesoporous carbons, polymers and metal oxides. Among the SBA type materials, SBA 16 is considered to be a particular interesting mesostructure, as it has a 3-D cubic arrangement of mesopores corresponding to the Im3m space group.

There are numerous reports on the synthesis, characterization, and applications of SBA-15 material. In general, the synthesis approaches to SBA-15 involve the self-assembly of block co-polymer at 40° C. for 24 h, followed by silica condensation at 100° C. or even higher temperature for 48 h under static condition (Kim, J. M., & Stucky, G. D., *Chem. Commun.* (2000) 1159). Somani et al. reported the synthesis of mesoporous silica under refluxing conditions. They concluded that the mesoporous silica prepared under refluxing condition showed better textural properties compared to that prepared by conventional static hydrothermal synthesis (Somani, R., et al., *J. Porous Mater.* (2005) 12, 87). Researchers also modified the synthesis by introducing cetyltrimethylammonium bromide (CTAB) as co-surfactant in order to control the textural, structural, and morphological properties of SBA-type mesoporous silicas. Ma et al. successfully obtained the mesoporous silica material with spherical morphology, further applied as the stationary phase in high performance liquid chromatography (HPLC) (Ma, Y., et al., *Colloid Surf A* (2003) 229, 1). Mesa et al. proposed that the presence of cationic CTAB could help to regularize the shape of micelles and their interaction with silica species, lead to a better mesostructure order of SBA-type materials (Mesa, M., et al., *Solid State Sci.* (2005) 7, 990).

Recently, several interesting results have been reported on the structural progress during the formation of hexagonal mesoporous silicas. Regev et al. presented an insight into the appearance of ordered cetyltrimethylammonium chloride (CTAC) micelle in a very short time (about 3 min) by cryogenic transmission electron microscopy (Cryo-TEM) and small angle X-ray scattering (SAXS) (Regev, O., *Langmuir* (1996) 12, 4940). Our results showed that the synthesis time of MCM-41 could be significantly reduced without affecting the quality in terms of mesostructural order (Liu, X., et al., *Colloid Interface Sci.* (2008) 319, 377). Considering the advantages of SBA-15 over MCM-41 silica, it would be highly desirable to have an effective and non-time-consuming recipe for the synthesis of highly ordered SBA-15. It is generally accepted that reducing the synthesis time can be the most applicable approach for large scale production of mesoporous materials in all synthesis methods.

Because the cage like SBA-16 mesostructured silica can only be produced in a narrow window of synthesis parameters (Zhao, D, et al., *J. Am. Chem. Soc.* (1998) 120, 6024), very limited SBA-16 synthesis methods have been reported so far. Using block co polymer F108 as template in presence of $K_2SO_4$ and HCl, SBA-16 single crystal (particle size ~1 μm) was obtained under static condition by Yu et al. (Yu, C., et al., *J. Am. Chem. Soc.* (2002) 124, 4556; Yu, C., et al., *Chem. Mater.* (2004) 16, 889). Kleitz et al. (*Langmuir* (2006) 22, 440) reported the synthesis of SBA-16 silicas using F127-butanol $H_2O$ mixture at low HCl concentration. SBA-16 can be also prepared with CTAB being added as co-template (Lin, C.-L., et al., *J. Phys. Chem. Solids* (2008) 69, 415; Chen, B.-C., et al., *Micropor. Mesopor. Mater.* (2005) 81, 241); CTAB has been suggested to help control the morphology and regulate the shape of mesostructure. For instance, Mesa et al. (*Solid State Sci.* (2005) 7, 990) proposed that the presence of cationic CTAB can regulate the shape of micelles and their interaction with the silica precursors in the SBA-16 synthesis.

Accordingly it is an object of the present invention to provide a method of forming a particulate porous metal oxide or metalloid oxide that is fast and suitable for the formation of high quality mesoporous particles.

SUMMARY OF THE INVENTION

In a first aspect the present invention provides a method of forming a particulate porous metal oxide or metalloid oxide, i.e. an oxide of one of a metal and a metalloid. The method includes forming an acidic aqueous solution of (a) a non-ionic surfactant and (b) an ionic surfactant and/or an inorganic salt. The method further includes adding to the solution a metal oxide precursor or a metalloid oxide precursor. Thereby a reaction mixture is formed. The method also includes heating, typically boiling the reaction mixture under reflux upon agitation for a period of time that is sufficient to obtain a particulate porous metal oxide or metalloid oxide.

In some embodiments the method includes agitating the reaction mixture at an elevated temperature below the boiling point thereof for a period of time sufficient to allow a gel to form. The reaction mixture that includes the gel may then be heated under reflux upon agitation for a period of time sufficient to obtain a particulate porous metal oxide or metalloid oxide.

In a second aspect the invention provides a particulate porous metal oxide or metalloid oxide obtainable by a method according to the first aspect.

In a third aspect the invention relates to the use of a particulate porous metal oxide or metalloid oxide according to the second aspect in one of the separation of a mixture of molecules in a fluid, catalysis and in the formation of a drug delivery vehicle.

In a fourth aspect the invention provides a chromatography stationary phase. The chromatography stationary phase includes a particulate porous metal oxide or metalloid oxide obtainable by a method according to the first aspect.

In a fifth aspect the invention relates to a method of performing a fluid chromatographic separation of a mixture of molecules. The method includes contacting the mixture of molecules and a particulate porous metal oxide or metalloid oxide according to the second aspect.

BRIEF DESCRIPTION OF THE DRAWINGS

The invention will be better understood with reference to the detailed description when considered in conjunction with the non-limiting examples and the accompanying drawings, in which:

FIG. 3 is a table showing textural parameters of calcined SBA-15 samples obtained in the modified synthesis.

FIG. 4 is a table showing textural parameters of textural parameters of modified synthesis of calcined SBA-15 samples under various treatment conditions.

FIG. 5 is a table showing textural parameters of conventional calcined SBA-15 samples under various treatment conditions.

FIG. 7 depicts XRD patterns of as-synthesized SBA-15 samples at different self-assembly times: (a) 1 h without introducing CTAB in initial synthesis mixture, (b) 2 h without introducing CTAB in initial synthesis mixture, (c) 2 h, (d) 1.5 h, (e) 1 h and (f) 45 min.

FIG. 12 depicts mechanical, hydrothermal and thermal stabilities of SBA-15 obtained by modified method (A) and by conventional method (B). (a) Press at 450 MPa for 10 min, (b) hydrothermal treatment in boiling water for 12 h under continuous stirring and (c) calcined at 1073 K for 12 h in air.

FIG. 13 depicts the nitrogen adsorption/desorption isotherms (A) and the pore size distributions (B) calculated from the desorption branch by the BJH method: (a) calcined at 1073 K for 12 h in air, (b) hydrothermal treatment in boiling water for 12 h under continuous stirring and (c) pressing at 450 MPa for 10 min.

FIG. 14 depicts the nitrogen adsorption/desorption isotherms (A) and the pore size distributions (B) calculated from the desorption branch by the BJH method of conventional SBA-15 samples: (a) parent calcined SBA-15, (b) hydrothermal treatment in boiling water for 12 h under continuous stirring and (c) calcined at 1073 K for 12 h in air and (d) Press at 450 MPa for 10 min.

FIG. 15 depicts a column pressure comparison of a Nanosil column and a C18-SBA-15 column at different flow rates using acetonitrile/water (50:50, v/v) as the mobile phase. Column temperature: 25° C.

FIG. 16 shows the chromatograms of nonpolar alkyl aromatics on a $C_{18}$-SBA-15 column from left to right: benzene, toluene, naphthalene, biphenyl, fluorene, phenanthrene, anthracene, fluoranthene. Mobile phase: acetonitrile-water (55:45, v/v, 1.0 mL/min) UV: 254 nm. Column: 4.6×50 mm, 500 nm~1000 nm $C_{18}$-SBA-15 silica packing, without end-capping.

FIG. 17 depicts the d-spacing, BET surface area ($S_{BET}$), pore diameter (D), pore volume ($V_p$), unit cell parameter ($a_0$) and pore wall thickness (t) of various SBA-16 samples. SBA formed according to the method of the state of the art are denoted "cv" (*:"-hy" represents SBA-16 after hydrothermal treatment and "-th" represents SBA-16 after thermal treatment. $=2^{1/2}d_{110}$, Pore wall thickness $t=3^{1/2} a_0/2-D$).

FIG. 18 depicts results of benzyl alcohol oxidation over Au-containing mesoporous silica catalysts. Reaction conditions: the amount of Au in each catalyst $2.5\times10^{-3}$ mmol; benzyl alcohol 10 mL (98.5 mmol), 160° C., $O_2$ flow rate 20 mL $min^{-1}$, reaction time 3 h.

FIG. 26 depicts UV-vis spectra of Au-containing mesoporous silica samples: (a) Au/SBA-16-02/06; (b) Au/SBA-15, (c) Au/MCM-41.

DETAILED DESCRIPTION OF THE INVENTION

Figures 1, 2:
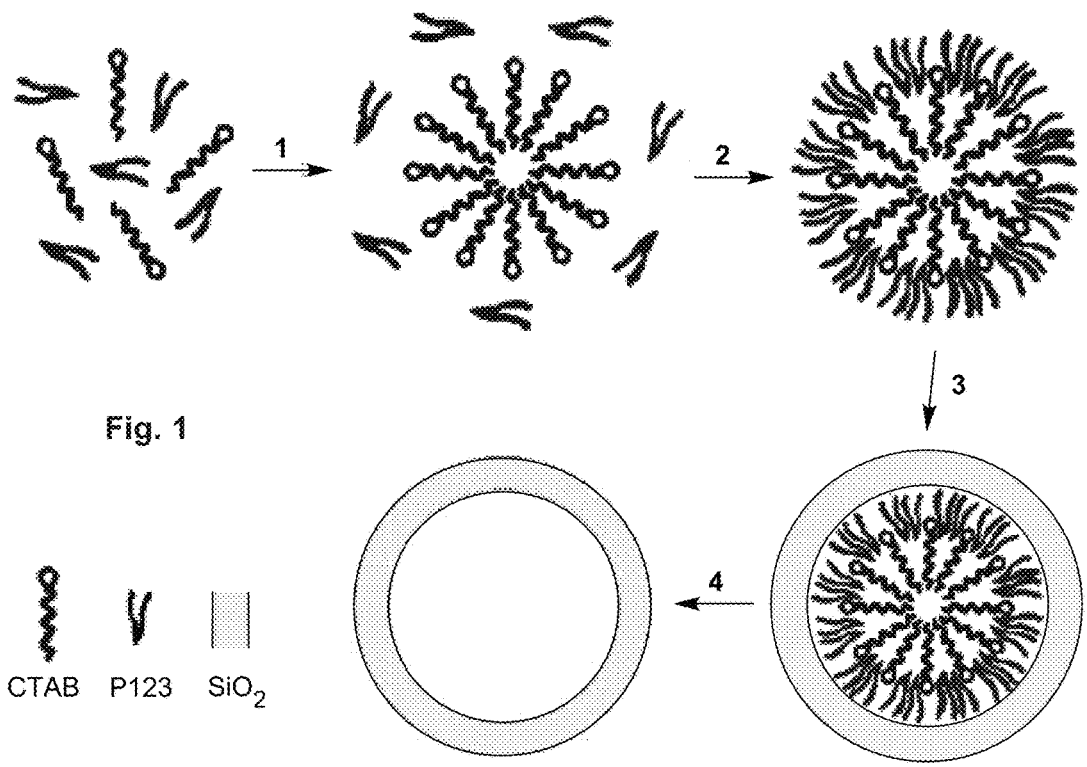
FIG. 1 is a schematic diagram of the assumed mechanism underlying the method of the invention. Illustrated is the synthetic procedure for mesoporous silica using P123 and CTAB as surfactant and co-surfactant, respectively. 1: Self-assembly of CTAB. 2: Self-assembly of P123. 3: Condensation of silica. 4: Removal of the surfactant.
FIG. 2 is a table showing the textural parameters of various calcined samples with an aging time set to 24 h.

The present invention provides a method of forming a particulate porous metal oxide or metalloid oxide. The metal oxide or metalloid oxide may in some embodiments have porous characteristics similar to SBA-15 and SBA-16 silica (SBA: Santa Barbara University). The metal oxide may be an oxide of any desired metal, such as titanium, vanadium, zirconium, niobium, vanadium, chromium, manganese, iron, cobalt, zinc, aluminium and molybdenum. Illustrative examples of a suitable metalloid oxide are silicon, germanium or antimony.

In the method an acidic solution is formed. The solution may be rendered acidic by means of any desired acid. As an illustrative example, any desired mineral acid may be used. In some embodiments forming an acidic aqueous solution includes mixing water and a mineral acid. Examples of a suitable mineral acid include, but are not limited to, hydrochloric acid, nitric acid, sulfuric acid, phosphoric acid and boric acid. Accordingly, the pH of the solution is below pH 7.0. The pH of the solution may be selected in the range from about pH 1 to about pH 6, including from about pH 1 to about pH 5, about pH 1 to about pH 4, about pH 1 to about pH 3 and about pH 1 to about pH 2.

The solution is an aqueous solution. In some embodiments the solution is a solution in a mixture of water and an alcohol. Any desired alcohol may be used as long as it can form a mixture with water in the selected ratio at a temperature from about room temperature to the boiling point of the mixture, including from about room temperature to about 130° C., from about room temperature to about 100° C., from about room temperature to about 80° C., from about room temperature to about 60° C. or from about room temperature to about 40° C. Examples of a suitable alcohol include, but are not limited to, methanol, ethanol, 1,2-ethanediol (ethylene glycol), 1,3-propanediol (-βpropylene glycol), 1,2-propanediol, n-propanol, iso-propanol, n-butanol, iso-butanol, tert-butanol, 2-butanol, 2,3-butanediol (dimethylethylene glycol), 2-methyl-1,3-propanediol, 1-pentanol (amyl alcohol), 2-pentanol, 2-methyl-3-butanol, 3-methyl-1-butanol (iso-pentanol), 3-pentanol (sec-amyl alcohol), 2,4-pentanediol (2,4-amylene glycol), 4-methyl-1,7-heptanediol, 1,9-nonanediol, cyclohexanol, propoxymethanol and 2-ethoxyethanol (ethylene glycol ethyl ether).

Where the solution includes an alcohol, any desired ratio of the alcohol and the water used may be selected. In some embodiments the molar ratio of water to alcohol in the acidic aqueous solution mixture of water and an alcohol may for example be selected in the range from about 50:1 to about 1:5, such as from about 20:1 to about 1:1, including for instance a ratio of about 10:1. It is noted in this regard that the concentration of surfactants (see below) in the form of micelles decreases with increasing concentrations of an alcohol. It is further noted that generally the presence and amount of an alcohol affects the morphology and (meso) structure of the particulate porous metal oxide or metalloid oxide. In this regard the main chain length of the alcohol used as well as the presence of side chains therein may have an effect. An alcohol may also control, for example, decrease the hydrolysis and/or condensation rate of the metal oxide precursor or metalloid oxide precursor, which may in turn also affect the (meso)structure and morphology of the obtainable product. Thus, the alcohol can be useful in obtaining a spherically shaped particle. A further orientation in this regard for embodiments where an anionic surfactant is used can be taken from the data published by Wang et al. (*Journal of Colloid and Interface Science* (2009) 331, 156-162).

The solution includes a non-ionic surfactant and/or urea. Any non-ionic surfactant can generally be used. It may for example be an ether and/or include hydroxyl groups. In some embodiments a non-ionic surfactant is a polyether. As an illustrative example, a fluorinated polyether of the type $R^1_m(R^2O)_n$ may be used, wherein m and n are independently from one another an integer from about 2 to about 20, $R^1$ is a fluorinated aliphatic, alicyclic, or aromatic moiety and $R^2$ is an aliphatic, alicyclic, or aromatic moiety. The use of a respective surfactant, $C_8F_{17}C_2H_4(OC_2H_4)_9OH$, has been described by Michaux et al. (*Microporous and Mesoporous Materials* (2008) 116, 308-317).

A suitable polyether may for instance be a diblock (A-B) or triblock copolymer (A-B-A or A-B-C). The polyether may for example include one of an oligo(oxyethylene) block or segment, a poly(oxyethylene) block (or segment), an oligo-(oxypropylene) block, a poly(oxypropylene) block, an oligo (oxybutylene) block and a poly(oxybutylene) block. An illustrative example of a respective triblock copolymer is a poloaxamer. A poloaxamer is a difunctional block copolymer surfactant terminating in primary hydroxy groups. It typically has a central non-polar chain, for example of poly-oxypropylene (poly(propylene oxide)), flanked by two hydrophilic chains of e.g. polyoxy-ethylene (poly(ethylene oxide)). The polyether may thus in some embodiments be a poly-(ethylene oxide)-poly(propylene oxide)-poly(ethylene oxide) (PEO-PPO-PEO) triblock copolymer. The lengths of the polymer blocks can be customized, so that a large variety of different poloxamers with slightly different properties is commercially available. For the generic term "poloxamer", these copolymers are commonly named with the letter "P" (for poloxamer) followed by three digits, the first two digits ×100 give the approximate molecular mass of the polyoxypropylene core, and the last digit ×10 gives the percentage polyoxyethylene content (e.g., P407=Poloxamer with a polyoxypropylene molecular mass of 4,000 g/mol and a 70% polyoxyethylene content). For the Pluronic tradename, coding of these copolymers starts with a letter to define it's physical form at room temperature (L=liquid, P=paste, F=flake (solid)) followed by two or three digits, the first digit(s) refer to the molecular mass of the polyoxypropylene core (determined from BASF's Pluronic grid) and the last digit ×10 gives the percentage polyoxyethylene content (e.g., F127=Pluronic with a polyoxypropylene molecular mass of 4,000 g/mol and a 70% polyoxyethylene content). The polyether may for example be a triblock copolymer of oxirane with 2-methyl-oxirane, having the Chemical Abstract No. 691397-13-4.

Illustrative examples of such a polyether are the commercially available triblock copolymers Adeka Pluronic F 68, Nissan Plonon 104, Novanik 600/50, Lutrol 127, Pluriol PE 1600, Plonon 104, Plonon 407, Pluronic 103, Pluronic 123, Pluronic P 123, Pluronic 127, Pluronic A 3, Pluronic F-127, Pluronic F 168, Pluronic 17R2, Pluronic P 38, Pluronic P 75, Pluronic PE 103, Pluronic L 45, Pluronic SF 68, Slovanik 310, Synperonic P 94 or Synperonic PE-F 127, to name a few.

The term "non-ionic surfactant" as used herein also includes surfactants that have repeating portions of uncharged moieties and one or two terminal groups that can carry a charge, for instance a terminal amino group. While the general structure is in such a surfactant non-ionic, it may carry an ionic terminal group. In some embodiments the non-ionic surfactant is an α,ω-diamine polypropylene oxide such as in the case of Jeffamine surfactants or Surfonamine surfactants (see Park, I, & Pinnavaia, T. J., *Micro-porous and Mesoporous Materials* (2009) 118, 239-244). Suitable examples of such surfactants include, but are not limited to, D2000, M2005, T3000, T5000, ML300 and MNPA1000.

In some embodiments the non-ionic surfactant is used in a ratio to the metal oxide precursor or the metalloid oxide precursor (see also below) that is selected in the range between about 0.001 to 0.01 or 0.001 to about 0.007, including in the range from about 0.002 to about 0.006 or from about 0.003 to about 0.006. In one embodiment the ratio between the non-ionic surfactant and the metal oxide precursor or the metalloid oxide precursor is about 0.005.

The solution may further include an ionic surfactant, such as a cationic, an anionic or a zwitterionic surfactant. Anionic surfactants include for instance carboxylic acids such as perfluorooctanoate, sulfates such as alkyl benzene sulfonates, sodium lauryl sulfate, sodium laureth sulfate or n-lauroylsarcosine sodium. Cationic surfactants include for instance ammonium compounds such as cetyl trimethylammonium bromide (CTAB), cetylpyridinium chloride, a tetraethyl ammonium salt or a benzalkonium chloride. Illustrative examples of a zwitterionic surfactant are dodecyl betaine, cocamidopropyl betaine or coco ampho glycinate.

A cationic surfactant may for example be a halogenide such as an alkyl ammonium salt. In a corresponding alkyl ammonium salt, the alkyl moiety may for example have a main chain from about 8 to about 24 carbon atoms such as from about 8 to about 20 carbon atoms. As illustrative examples of a suitable respective ionic surfactant may serve cetyltrimethylammonium chloride (Chemical Abstracts No 112-02-7), hexade-cyldimethylethylammonium chloride, dodecyl-trimethylammonium bromide, cetyltrime-thylammonium bromide (CAS No. 57-09-0), N,N,N-tripropyl-1-undecanaminium chloride, dimethylisopropyldodecylammonium iodide (CAS No. 41431-86-1), myristyltri-methyl ammonium bromide (CAS No 1119-97-7), myristyltrimethyl ammonium chloride, trimethylpentadecylammonium bromide, trimethylpentadecylammonium chloride, trimethylheptadecylammonium bromide, trimethylheptadecylammonium chloride, octadecyl-tri-methylammonium bromide, trimethylstearylammonium chloride trimethylstearylammonium bromide, dimethylpropyltetradecylammonium chloride (CAS No 25732-88-1), tri-hexylmethylammonium bromide (CAS No 2390-64-9), bis(2-ethylhexyl) dimethylammonium iodide (CAS No 2390-66-1) and didecyldimethylammonium chloride.

In some embodiments the ionic surfactant is an ionic liquid. Ionic liquids typically have an organic cation and an anion that may be either organic or inorganic. The polarity of ionic liquids (cf. below for examples) is known to be largely determined by the associated anion. While e.g. halides, pseudohalides, $BF_4^-$, methyl sulphate, $NO_3^-$, or $ClO_4^-$ are polar liquids, hexafluorophosphates, $AsF_6^-$, bis (perfluoroalkyl)-imides, and $[C_4F_6SO_3]^-$ are non-polar liquids. Examples of a polar ionic liquid include, but are not limited to, 1-ethyl-3-methylimidazolium tetrafluoroborate, N-butyl-4-methylpyridinium tetrafluorobo-rate, 1,3-dialky-limidazolium-tetrafluoroborate, 1,3-dialkylimidazolium-hexafluoroborate, 1-ethyl-3-methylimidazolium bis(pentafluoroethyl)phosphinate, 1-butyl-3-methylimida-zolium tetrakis(3,5-bis(trifluoromethylphenyl)borate, tetrabutyl-ammonium bis(trifluoro-methyl)imide, ethyl-3-methylimidazolium trifluoromethanesulfonate, 1-butyl-3-methyl-imidazolium methylsulfate, 1-n-butyl-3-methylimidazolium ([bmim]) octylsulfate, and 1-n-butyl-3-methylimidazolium tetrafluoroborate. Examples of a non-polar liquid include, but are not limited to mineral oil, hexane, heptane, cyclohexane, benzene, toluene, dichloromethane, chloroform, carbon tetrachloride, carbon disulfide, dioxane, diethyl ether, diisopropylether, methyl propyl ketone, methyl iso-amyl ketone, methyl isobutyl ketone, cyclohexanone, isobutyl isobutyrate, ethylene glycol diacetate, and a non-polar ionic liquid. Examples of a non-polar ionic liquid include, but are not limited to, 1-ethyl-3-methylimidazolium bis [(trifluoromethyl)sulfonyl]amide bis(triflyl)amide, 1-ethyl-3-methyl-imidazolium bis[(trifluoromethyl)sulfonyl]amide trifluoroacetate, 1-butyl-3-methylimida-zolium hexafluorophosphate, 1-hexyl-3-methylimidazolium bis(trifluorometh-ylsulfonyl)-imide, 1-butyl-3-methylimidazolium bis(trifluoromethylsulfonyl)imide, trihexyl(tetra-decyl)phosphonium bis[oxalato(2-)]borate, 1-hexyl-3-methyl imidazolium tris (pentafluoroethyl)trifluorophosphate, 1-butyl-3-methyl-imidazolium hexafluorophosphate, tris-(pentafluoroethyl)trifluorophosphate, trihexyl(tetradecyl)phosphonium, N''-ethyl-N,N,N', N'-tetramethylguanidinium, 1-butyl-1-methyl pyrrolidinium tris(pentafluoroethyl) trifluorophosphate, 1-butyl-1-methyl pyrrolidinium bis(trifluoromethylsulfonyl) imide, 1-butyl-3-methyl imidazolium hexafluorophosphate, 1-ethyl-3-methylimidazolium bis(trifluoro-methylsulfonyl)imide and 1-n-butyl-3-methylimidazolium.

In some embodiments the ionic surfactant is used in a ratio to the metal oxide precursor or the metalloid oxide precursor (see also below) that is selected in the range between about 0.01 and about 0.04, including in the range above about 0.01 up to about 0.035 or from about 0.015 to about 0.03. In one embodiment the ratio between the non-ionic surfactant and the metal oxide precursor or the metalloid oxide precursor is about 0.02.

Any inorganic salt may be used. As an illustrative example a highly charged inorganic salt such as a sulfate, e.g. $K_2SO_4$, a nitrate, e.g. $AgNO_3$, a phosphate, e.g. $Na_2HPO_4$, or a halide, e.g. NaCl or LiCl is suitable for the use in the method of the present invention.

In particular in embodiments where an anionic-surfactant is employed, a suitable co-structure directing agent such as an aminosilane, including a quaternary aminosilane, may be added to the acidic aqueous solution. A respective positively charged (in the acidic solution via a proton) co-structure directing agent is thought to interact with the negatively charged anionic surfactant.

In some embodiments more than one metal oxide or metalloid oxide, or respective precursors thereof, are used in the method of the invention. Independent sols may be formed in such embodiments, which may then be combined. As an illustrative example, a metal oxide precursor and a metalloid oxide precursor may be used to form two independent sols that are combined to form the gel. In some embodiments a further metal oxide, such as a mixed oxide, for instance a redox catalyst such as a perovskite-type oxide ($ABO_3$), typically in particulate form, or one or more precursors thereof, may be added to the acidic aqueous solution in addition to the metal oxide precursor and/or the metalloid oxide precursor. Where the formation of two pure separate phases, e.g. a perovskite phase and the phase of the metal or metalloid oxide is desired, an organic acid such as citric acid may be added. An analogous example of forming mesoporous $\gamma LaCoO_3/SBA-15$ by adding La and Co nitrates as well as tetraethyl orthosilicate to an acidic aqueous solution of P123 has been disclosed by Deng et al. (*Applied Catalysis A: General* (2009) 352, 43-49). A further analogous example of forming CuO-loaded mesoporous SBA-15 has been disclosed by Kong et al. (*Microporous and Mesoporous Materials* (2009) 118, 348-353). In such an example $CuSO_4$ and $Al(NO_3)$ are added to the acidic aqueous solution that inludes a non-ionic surfactant. In some embodiments a dopant compound may also be added. A respective dopant may be or include a metal such as aluminium or boron. As two illustrative examples, aluminium nitrate or triethylborane may be added. Where desired, other matter may be added. An illustrative example of further matter that may be added is a substance that affects emulsion formation.

In some embodiments the reaction mixture formed by adding the metal oxide precursor or metalloid oxide precursor is agitated, e.g. stirred, at a temperature below its boiling point. Depending on an alcohol present and on the type and amount of surfactants used, the temperature may for instance be selected in the range from about room temperature to about 130° C., from about room temperature to about 100° C., from about 35° C. to about 100° C., from about room temperature to about 80° C., from about 35° C. to about 80° C., from about room temperature to about 65° C., from about 35° C. to about 65° C., from about room temperature to about 40° C., from about 35° C. to about 40° C. or it may also be selected to be about 35° C. or about 40° C. In typical embodiments an elevated temperature, i.e. a temperature above room temperature, is applied. In some embodiments the elevated temperature is kept constant for a selected period of time, such as a period of time from about 30 minutes to about 5 hrs, including a period of time from about 30 minutes to about 4 hrs, a period of time from about 45 minutes to about 5 hrs, a period of time from about 45 minutes to about 4 hrs, a period of time from about 45 minutes to about 3 hrs or a period of time from about 45 minutes to about 2 hrs.

Bringing the reaction mixture to an elevated temperature may in some embodiments involve dissolving the metal oxide precursor or metalloid oxide precursor. A metal oxide precursor is generally formed from a metal, a metal compound, from a metal oxide compound or from a metal oxide that is provided and added to the solvent. The metal compound may for instance be a metal salt such as a halogenide or a carboxylate. A colloidal dispersion of the selected metal or metalloid, with suitable additives, may for example be used. Any metal oxide compound may also be used that can be dissolved in the selected water/alcohol composition and that is of sufficient reactivity for the formation of a porous metal oxide. The same applies mutatis mutandis to a metalloid precursor. As indicated above, the metalloid may in some embodiments be silicon. A metalloid compound may for example be an inorganic metalloid salt such as a germanium halide, sodium silicate ($Na_2SiO_3$) or silicon carboxylate. The metalloid compound may also be an organic metalloid compound (e.g. salt) such as silicon acetate or germanium acetylacetonate. In some embodiments the metalloid precursor is an alkoxide such as a silicon alkoxide, a zirconium alcoxide, a titanium alkoxide or an aluminium alkoxide. Examples of silicon alkoxides include for instance methyl silicate ($Si(OMe)_4$), ethyl silicate ($Si(OEt)_4$), propyl silicate ($Si(OPr)_4$), isopropyl silicate ($Si(Oi-Pr)_4$), pentyl silicate ($Si(OCH_5H_{11})_4$), octyl silicate ($Si(OC_8H_{17})_4$), isobutyl silicate ($Si(OCH_2iPr)_4$), tetra(2-ethyl-hexyl) orthosilicate ($Si(OCH_2C(Et)n-Bu)_4$), tetra(2-ethylbutyl) silicate ($Si(OCH_2CHEt_2)_4$), ethylene silicate (($C_2H_4O_2)_2Si$), tetrakis(2,2,2-trifluoroethoxy)silane ($Si(OCH_2CF_3)_4$), tetrakis(methoxyethoxy)silane ($Si(OCH_2CH_2OMe)_4$), benzyl silicate or cyclopentyl silicate. Examples of germanium alkoxides include, but are not limited to, tetrapropyloxygerman, tetramethyloxygerman, o-phenylene germinate, ethylene germanate or 2,2'-spirobi[naphtho[1,8-de]-1,3,2-dioxagermin. Examples of titanium alkoxides include, but are not limited to, triethoxyethyltitanium, triethoxymethoxytitanium, ethyl isopropyl titanate, isopropyl propyl titanate, isopropyl methyl titanate, butoxytris(2-propanolato)titanium, monoisopropoxytributoxytitanium, butoxytris(1-octadecanolato) titanium or dibutoxybis(octyloxy)titanium. Three illustrative examples of a zirconium alcoxide are dieth-oxybis(2-propanolato)zirconium, octyl titanate and triethoxymethoxyzirconium. When selecting a metal or metalloid alkoxide precursor it will be advantageous to keep in mind the relative reactivity of the metal/metalloid compounds to hydrolysis and poly-condensation. As an illustrative example, titanium and zirconium compounds have a higher reactivity in this regard than e.g. silicon compounds. Accordingly, polycondensation of titanium n-propoxide is significantly easier to control than polycondensation of titanium i-propoxide.

The method of the invention can be classified as a sol-gel process. The sol formed may include a metalloid oxide such as silica or germanium oxide. As an illustrative example the sol may include a suspension of colloidal silica-based particles, for instance nanoparticles. The silica and/or the germaniumoxide may be formed from the respective precursor in situ during the reaction process. The sol may for instance be generated by hydrolysis of a precursor such as silicon alkoxide. The hydrolysis of a silicon alkoxide is thought to induce the substitution of OR groups linked to silicon—with R being any hydrolysable aliphatic, alicyclic, aromatic or arylaliphatic group—by silanol Si—OH groups, which then lead to the formation of a silica network via condensation polymerisation. The acid present, such as hydrochloric acid, is thought to function as a catalyst.

The formed sol undergoes a catalysed transition (cf. above) to form a gel. A polymerization-induced phase separation occurs in the course of the cross-linking reactions. Non-ionic surfactants with —$CH_2$—$CH_2$—O— units locate in the gel phase, while water, the alcohol and ionic surfactants locate in the fluid phase. After the phase separation the fluid phase can be removed relatively easily if desired. For the condensation reaction leading to a polymerised metalloid oxide or metal oxide the non-ionic surfactant generally serves as a template molecule around which the inorganic precursor can condense. The non-ionic surfactant is thought to interact through an indirect reaction of the template with the positively charged silica source. Cooperative assembly between surfactant micelles and oligomeric oxide is thought to enhance the arrangement of the micelles. In the case of triblockcopolymer that includes polyethyleneoxide and polypropyleneoxide blocks, minute so called "micropores" (which should in fact we called nanopores) are typically formed in the walls of the pores, e.g. mesopores, by the polyethyleneoxide blocks that are directed to the aqueous solution, whereas the polypropyleneoxide blocks are more hydrophobic and are thought to give rise to the internal structure of the pore. Generally, electrically neutral hydrogen-bonding is believed to contribute to the pore formation. In the case of primary amine surfactants hydrogen-bonding interactions with the terminal amino groups are thought to contribute to the pore formation, thereby giving rise to neutral supramolecular templating that results in the generation of 3D wormhole framework structures.

Where the nonionic surfactant includes polyethyleneoxide blocks and polypropyleneoxide blocks, altering the lengths of the respective polyethyleneoxide blocks may be carried out to achieve different amounts of micropores and to change the pore wall thickness. Altering the length of the polypropyleneoxide blocks may be carried out to obtain different pore diameters. Increased hydrophobic micelle cores formed by larger polypropyleneoxide blocks for instance result in enlarged pore sizes. Other synthesis parameters such as the temperature, the pH and the choice of a co-surfactant and other additives such as swelling agents electrolytes, salts, etc. allow pore size engineering and tuning of the general properties and morphology.

In embodiments where particularly large pores are desired, the surfactants may be changed, for example a cationic trimethyl-alkyl-ammonium salt may be replaced by a trimethly-alkyl-ammonium salt with a longer alkyl chain as described by Mizutani et al. (*Chem. Commun.* (2007) 1172-1174), before heating the gel under reflux.

In methods used in the art a reaction mixture is left to react at a constant temperature in a closed condition, generally a sealed container, for about 24 hours to avoid evaporation of volatile components. In a method according to the present invention the reaction mixture is heated, typically boiled, under reflux upon agitation, including stirring. In some embodiments during this heating a gel is formed. In some embodiments the gel formed by agitating the reaction mixture at an elevated temperature below its boiling point is already present in the reaction mixture. In such embodiments the gel is thus exposed to heating under reflux.

In some embodiments heating the reaction mixture under reflux is carried out in the presence of an alcohol. The alcohol may in some embodiments be an alcohol that was present in the acidic aqueous solution of a non-ionic surfactant and at least one of an ionic surfactant and an inorganic salt, so that it may also be carried over to the heating under reflux. The alcohol may also have been added after forming or providing the respective acidic aqueous solution. The alcohol may for example be added to the formed gel or it may be added before the gel is formed, wherein heating the reaction mixture in the presence of an alcohol upon agitation is carried out by maintaining in the reaction mixture the alcohol released from the alkoxide during gel formation.

Heating under reflux is carried out for a period of time sufficient to obtain a particulate porous metal oxide or metalloid oxide. Those skilled in the art will appreciate that significantly shorter periods of time are sufficient to obtain a particulate porous, including mesoporous metal oxide or metalloid oxide than currently employed in the art, using e.g. a sealed container. The overall production time is thus substantially shortened. Typically heating is carried out for at least 5 hours, for example for a period in the range from about 5 to about 24 hours, including about 6 to about 24 hours, about 6 to about 18 hours, about 6 to about 12 hours, about 6 to about 10 hours or for about 5 hours, about 6 hours, about 7 hours or about 8 hours. Those skilled in the art will appreciate that, surprisingly, the method of the present invention provides particulate matter of higher particle homogeneity (in structural terms) than hydrothermal methods that have also been tested in the art (Somani, et al., 2005, supra). At the same time the method of the invention avoids the use of a supercritical fluid such as carbon dioxide. It is further noted that, while further additives may be used in the method of the invention, no additional use of further substances is required. In embodiments with adding further substances, the desired properties of the product thus ought to be monitored. As an illustrative example, adding 1,3,5-trimethylbenzene may be used in order to expand the pore diameter, its use will however often lead to a loss in uniformity of the structure of the particulate porous material.

In typical embodiments at least the non-ionic surfactant used in the formation of the particulate porous metal oxide or metalloid oxide needs to be removed for subsequent usage. In order to remove the organic surfactant, the obtained product may then be calcined. The particulate porous metal oxide or metalloid oxide may for example be calcined in air and/or in an air-ozone mixture at a temperature from about 200 to about 700° C., such as from about 200 to about 600° C. The calcination may be carried out for a period of time from about 1 to about 24 hours, such as for instance from about 2 to about 18 hours. To remove the organic surfactant, the surfactant may also be extracted from the obtained product by boiling the gel with a suitable solvent such as a liquid or a supercritical fluid such as carbon dioxide. Thereby the organic surfactant can be recovered and reused. However, generally relatively large amounts of solvent are required for complete extraction.

The particulate porous metal oxide or metalloid oxide obtained may be exposed to any further desired subsequent treatment. An illustrative example is a coating with for instance alumina, which may be achieved by hydrolyzing an alumina precursor loaded onto the porous particulate material. A coating with manganese may for example be carried out using a treatment with $Mn_2(CO)_{10}$ as described by Orlov & Klinowski (*Chemosphere* (2009) 74, 344-348). A further example is the covalent or non-covalent immobilisation, including functionalization, of a selected molecule or chemical moiety. In some embodiments a method according to the invention includes covalently coupling the particulate porous metal oxide or metalloid oxide to a molecule selected from the group consisting of a low molecular weight organic compound, an oligomer and a polymer. For example a low molecular weight organic compound with an aliphatic, an alicyclic, an aromatic, an arylaliphatic, or an arylalicyclic main chain may be immobilized on the particle surface.

The term "aliphatic" means, unless otherwise stated, a straight or branched hydrocarbon chain, which may be saturated or mono- or poly-unsaturated and include heteroatoms (see below). An unsaturated aliphatic group contains one or more double and/or triple bonds (alkenyl or alkinyl moieties). The branches of the hydrocarbon chain may include linear chains as well as non-aromatic cyclic elements. The hydrocarbon chain, which may, unless otherwise stated, be of any length, and contain any number of branches. Typically, the hydrocarbon (main) chain includes 1 to 5, to 10, to 15 or to 20 carbon atoms. Examples of alkenyl radicals are straight-chain or branched hydrocarbon radicals which contain one or more double bonds. Alkenyl radicals generally contain about two to about twenty carbon atoms and one or more, for instance two, double bonds, such as about two to about ten carbon atoms, and one double bond. Alkynyl radicals normally contain about two to about twenty carbon atoms and one or more, for example two, triple bonds, such as two to ten carbon atoms, and one triple bond. Examples of alkynyl radicals are straight-chain or branched hydrocarbon radicals which contain one or more triple bonds. Examples of alkyl groups are methyl, ethyl, propyl, butyl, pentyl, hexyl, heptyl, octyl, nonyl, decyl, the n isomers of these radicals, isopropyl, isobutyl, isopentyl, sec-butyl, tert-butyl, neopentyl, 3,3 dimethylbutyl. Both the main chain as well as the branches may furthermore contain heteroatoms as for instance N, O, S, Se or Si or carbon atoms may be replaced by these heteroatoms.

The term "alicyclic" means, unless otherwise stated, a non-aromatic cyclic moiety (e.g. hydrocarbon moiety), which may be saturated or mono- or poly-unsaturated. The cyclic hydrocarbon moiety may also include fused cyclic ring systems such as decalin and may also be substituted with non-aromatic cyclic as well as chain elements. The main chain of the cyclic hydrocarbon moiety may, unless otherwise stated, be of any length and contain any number of non-aromatic cyclic and chain elements. Typically, the hydrocarbon (main) chain comprises includes 3, 4, 5, 6, 7 or 8 main chain atoms in one cycle. Examples of such moieties include, but are not limited to, cyclopentyl, cyclohexyl, cycloheptyl, or cyclooctyl. Both the cyclic hydrocarbon moiety and, if present, any cyclic and chain substituents may furthermore contain heteroatoms, as for instance N, O, S, Se or Si, or a carbon atom may be replaced by these heteroatoms. The term "alicyclic" also includes cycloalkenyl moieties which that are unsaturated cyclic hydrocarbons, which generally contain about three to about eight ring carbon atoms, for example five or six ring carbon atoms. Cycloalkenyl radicals typically have a double bond in the respective ring system. Cycloalkenyl radicals may in turn be substituted.

The term "aromatic" means, unless otherwise stated, a planar cyclic hydrocarbon moiety of conjugated double bonds, which may be a single ring or include multiple fused or covalently linked rings, for example, 2, 3 or 4 fused rings. The term aromatic also includes alkylaryl. Typically, the hydrocarbon (main) chain includes 5, 6, 7 or 8 main chain atoms in one cycle. Examples of such moieties include, but are not limited to, cylcopentadienyl, phenyl, naphthalenyl-, [10]annulenyl-(1,3,5,7,9-cyclodecapentaenyl-), [12]annulenyl-, [8]annulenyl-, phenalene (perinaphthene), 1,9-dihydropyrene, chrysene (1,2-benzophenanthrene). An example of an alkylaryl moiety is benzyl. The main chain of the cyclic hydrocarbon moiety may, unless otherwise stated, be of any length and contain any number of heteroatoms, as for instance N, O and S. Examples of such heteroaromatic moieties (which are known to the person skilled in the art) include, but are not limited to, furanyl-, thiophenyl-, naphtyl-, naphthofuranyl-, anthrathiophenyl-, pyridinyl-, pyrrolyl-, quinolinyl-, naphthoquinolinyl-, quinoxalinyl-, indolyl-, benzindolyl-, imidazolyl-, oxazolyl-, oxoninyl-, oxepinyl-, benzoxepinyl-, azepinyl-, thiepinyl-, selenepinyl-, thioninyl-, azecinyl-(azacyclodecapentaenyl-), diazecinyl-, azacyclododeca-1,3,5,7,9,11-hexaene-5,9-diyl-, azozinyl-, diazocinyl-, benzazocinyl-, azecinyl-, azaundecinyl-, thia[11]annulenyl-, oxacyclotrideca-2,4,6,8,10,12-hexaenyl- or triazaanthracenyl-moieties.

By the term "arylaliphatic" is meant a hydrocarbon moiety, in which one or more aromatic moieties are substituted with one or more aliphatic groups. Thus the term "arylaliphatic" also includes hydrocarbon moieties, in which two or more aryl groups are connected via one or more aliphatic chain or chains of any length, for instance a methylene group. Typically, the hydrocarbon (main) chain includes 5, 6, 7 or 8 main chain atoms in each ring of the aromatic moiety. Examples of arylaliphatic moieties include, but are not limited, to 1-ethyl-naphthalene, 1,1'-methylenebis-benzene, 9-isopropylanthracene, 1,2,3-trimethyl-benzene, 4-phenyl-2-buten-1-ol, 7-chloro-3 -(1-methylethyl)-quinoline, 3-heptyl-furan, 6-[2-(2,5-diethylphenyl)ethyl]-4-ethyl-quinazoline or, 7, 8-dibutyl-5,6-diethyl-iso-quinoline.

Each of the terms "aliphatic", "alicyclic", "aromatic" and "arylaliphatic" as used herein is meant to include both substituted and unsubstituted forms of the respective moiety. Substituents my be any functional group, as for example, but not limited to, amino, amido, azido, carbonyl, carboxyl, cyano, isocyano, dithiane, halogen, hydroxyl, nitro, organometal, organoboron, seleno, silyl, silano, sulfonyl, thio, thiocyano, trifluoromethyl sulfonyl, p-toluenesulfonyl, bromobenzenesulfonyl, nitrobenzenesulfonyl, and methanesulfonyl.

A heteroatom is any atom that differs from carbon. Examples include, but are not limited to N, O, P, S, and Se. Were several heteroatoms are present within a molecule or moiety to be immobilized or otherwise used in the invention, they are independently selected.

A molecule or chemical moiety that is immobilized on the inner and/or outer surface of the porous particulate metal or metalloid oxide may serve in tuning the surface properties such as hydrophilicity and hydrophobicity. Mono-, di-, and trifunctional silanes of variable alkyl, cycloalkyl, aryl, alkylaryl etc. chain length, e.g. a main chain from about 2 to about 30 carbon atoms may be immobilized, e.g. grafted, on the surfaces of metal and metalloid oxides, thereby selective tailoring the metal or metalloid oxide. Grafting with longer main chains, e.g. of more than 8 or more than 10 carbon atoms, can be used to improve the hydrothermal and mechanical stability. Trifunctional silanes may for instance be used to provide a closely packed and highly ordered monolayer with enhanced stability. Such monolayers typically possess multiple bonding, and alkyl group detachment is generally greatly reduced as compared to single bonded phases from monofunctional silanes. Likewise, organosilicon hydrides as grafting agents may in some embodiments provide several advantages over other silane coupling agents, since they provide a clean reaction environment. Hence, the uniformity of the alkyl chains on the substrates is typically improved and closely packed and well-ordered phases may result.

A molecule or chemical moiety may, without being limited thereto, be immobilized on the inner and/or outer surface of the porous particulate metal or metalloid oxide by covalent or non-covalent binding, adsorption, encapsulation, cross-linking or entrapment, to name a few common mechanisms. A surface modification of ordered (meso)porous metal or metalloid oxide material can be achieved by covalent attachment of the organic species on the preformed silica (i.e. grafting) or by direct synthesis via co-condensation during metal oxide/metalloid oxide preparation. The pore size of the porous materials enables grafting of the organic monolayers at the outer particle surface and within the pores. Due to the high surface area these materials generally possess a high amount of binding sites. A proper tailoring of the surface properties of such materials can be used to improve, for instance, their activity, selectivity, and stability in catalytic reactions, sorption processes, environmental and optical applications, and in nanotechnology.

A molecule or moiety immobilized on the porous particulate material may also serve in cross-linking individual particles. An organic bridge may for instance be formed between two particles by a phenylene-bridge or an ethylene-bridge. The bridge may also include a chiral moiety such as bulk vanadyl Schiff base complexes, a binaphthyl group, a 1,2-diaminocyclohexane group, a trans-(1R,2R)-bis-(ureido)-cyclohexyl-bridge (Zhu, G., et al., *Microporous and Mesoporous Materials* (2008) 116, 36-43) or a chiral borated ethylene-bridge. The resulting particulate matter is a chiral porous material with chiral induction ability in e.g. asymmetric catalysis. A further example of a chiral moiety that may be immobilized on the porous particulate material is a carbohydrate, including a cellulose derivative such as cellulose tris(3,5-dimethylphenyl carbamate).

A selected molecule or moiety used for the functionalization of the porous particulate material may in some embodiments have an affinity for selected matter of interest, e.g. a selected target molecule. A respective target molecule may for instance be or include a microorganism, a virus particle, a peptide, a peptoid, a protein, a nucleic acid, a nucleotide, a peptide, a nucleic acid, a saccharide, an oligosaccharide, a polysaccharide, an inorganic molecule, a synthetic polymer, a low molecular weight organic molecule or a drug molecule.

As an illustrative example, a linking moiety such as an affinity tag may be used to immobilise a molecule on and/or within the particulate porous material. Such a linking moiety may be a molecule, e.g. a hydrocarbon-based (including polymeric) molecule that includes nitrogen-, phosphorus-, sulphur-, carben-, halogen- or pseudohalogen groups, or a portion thereof. As an illustrative example, the selected surface may be provided with, for instance be coated with, a brush-like polymer, for example with short side chains. The immobilisation surface may also include a polymer that includes a brush-like structure, for example by way of grafting. It may for example include functional groups that allow for the covalent attachment of a biomolecule, for example a molecule such as a protein, a nucleic acid molecule, a polysaccharide or any combination thereof. Examples of a respective functional group include, but are not limited to, an amino group, an aldehyde group, a thiol group, a carboxyl group, an ester, an anhydride, a sulphonate, a sulphonate ester, an imido ester, a silyl halide, an epoxide, an aziridine, a phosphoramidite and a diazoalkane.

Examples of an affinity tag include, but are not limited to biotin, dinitro-phenol or digoxigenin, oligohistidine, polyhistidine, an immunoglobulin domain, maltose-binding protein, glutathione-S-transferase (GST), calmodulin binding peptide (CBP), FLAG'-peptide, the T7 epitope (Ala-Ser-Met-Thr-Gly-Gly-Gln-Gln-Met-Gly), maltose binding protein (MBP), the HSV epitope of the sequence Gln-Pro-Glu-Leu-Ala-Pro-Glu-Asp-Pro-Glu-Asp of herpes simplex virus glycoprotein D, the hemagglutinin (HA) epitope of the sequence Tyr-Pro-Tyr-Asp-Val-Pro-Asp-Tyr-Ala, the "myc" epitope of the transcription factor c-myc of the sequence Glu-Gln-Lys-Leu-Ile-Ser-Glu-Glu-Asp-Leu, or an oligonucleotide tag. Such an oligonucleotide tag may for instance be used to hybridise to an immobilised oligonucleotide with a complementary sequence. A further example of a linking moiety is an antibody, a fragment thereof or a proteinaceous binding molecule with antibody-like functions (see also below).

A further example of a linking moiety is a cucurbituril or a moiety capable of forming a complex with a cucurbituril. A cucurbituril is a macrocyclic compound that includes glycoluril units, typically self-assembled from an acid catalyzed condensation reaction of glycoluril and formaldehyde. A cucurbit[n]uril, (CB[n]), that includes n glycoluril units, typically has two portals with polar ureido carbonyl groups. Via these ureido carbonyl groups cucurbiturils can bind ions and molecules of interest. As an illustrative example cucurbit[7]uril (CB[7]) can form a strong complex with ferrocenemethylammonium or adamantylammonium ions. Either the cucurbit[7]uril or e.g. ferrocenemethylammonium may be attached to a biomolecule, while the remaining binding partner (e.g. ferrocenemethylammonium or cucurbit[7]uril respectively) can be bound to a selected surface. Contacting the biomolecule with the surface will then lead to an immobilisation of the biomolecule. Functionalised CB[7] units bound to a gold surface via alkanethiolates have for instance been shown to cause an immobilisation of a protein carrying a ferrocenemethylammonium unit (Hwang, I., et al., *J. Am. Chem. Soc.* (2007) 129, 4170-4171).

Further examples of a linking moiety include, but are not limited to an oligosaccharide, an oligopeptide, biotin, dinitrophenol, digoxigenin and a metal chelator (cf. also below). As an illustrative example, a respective metal chelator, such as ethylenediamine, ethylenediaminetetraacetic acid (EDTA), ethylene glycol tetraacetic acid (EGTA), diethylenetriaminepentaacetic acid (DTPA), N,N-bis(carboxymethyl)glycine (also called nitrilotriacetic acid, NTA), 1,2-bis (o-aminophenoxy)ethane-N,N,N',N'-tetraacetic acid (BAPTA), 2,3-dimercapto-l-propanol (dimercaprol), porphine or heme may be used in cases where the target molecule is a metal ion. As an example, EDTA forms a complex with most monovalent, divalent, trivalent and tetravalent metal ions, such as e.g. silver ($Ag^+$), calcium ($Ca^{2+}$), manganese ($Mn^{2+}$), copper ($Cu^{2+}$), iron ($Fe^{2+}$), cobalt ($Co^{3+}$) and zirconium ($Zr^{4+}$), while BAPTA is specific for $Ca^{2+}$. In some embodiments a respective metal chelator in a complex with a respective metal ion or metal ions defines the linking moiety. Such a complex is for example a receptor molecule for a peptide of a defined sequence, which may also be included in a protein. As an illustrative example, a standard method used in the art is the formation of a complex between an oligohistidine tag and copper ($Cu^{2+}$), nickel ($Ni^{2+}$), cobalt ($Co^{2+}$), or zinc ($Zn^{2+}$) ions, which are presented by means of the chelator nitrilotriacetic acid (NTA). Porous silica with various chelating agents immobilized therein has previously been used in the art. As an illustrative example, N-propylsalicylaldimino-functionalized SBA-15 mesoporous silica has been used as an adsorbent for heavy metal ions such as $Cu^{2+}$, $Co^{2+}$, $Ni^{2+}$ and $Zn^{2+}$ ions (Mureseanu, M., et al., *Chemosphere* (2008) 73, 9, 1499-1504).

Avidin or streptavidin may for instance be employed to immobilise a biotinylated nucleic acid. In some embodiments, in particular where the biomolecule is a nucleic acid, the biomolecule may be directly synthesised on the particle surface, for example using photoactivation and deactivation. As an illustrative example, the synthesis of nucleic acids or oligonucleotides on selected surface areas (so called "solid phase" synthesis) may be carried out using electrochemical reactions using electrodes. An electrochemical deblocking step as described by Egeland & Southern (*Nucleic Acids Research* (2005) 33, 14, e125) may for instance be employed for this purpose. A suitable electrochemical synthesis has also been disclosed in US patent application U.S. 2006/0275927. In some embodiments light-directed synthesis of a biomolecule, in particular of a nucleic acid molecule, including UV-linking or light dependent 5'-deprotection, may be carried out.

The porous material may in some embodiments be functionalized via organometalloid or organometal groups, such as organosilane groups, that may serve as a linking moiety for the immobilization of any desired matter including the examples above. For example, an organoazide may be formed with an ethynlated molecule through a Cu-catalyzed Huisgen [3+2] cycloaddition reaction, a "click" reaction, as described by Nakazawa & Stack (*J. Am. Chem. Soc.* (2008) 130, 44, 14360-14361). The respective organometalloid or organometal groups may in some embodiments be introduced via the metal oxide precursor and/or the metalloid oxide precursor used in the method of the invention. In some embodiments the functional groups may be introduced via the reaction of the formed particulate porous metal and/or metalloid oxide with a functionalized organometalloid or organometal compound such as a functionalized organosilane. An illustrative example is 3-aminopropyltrimethoxysilane (cf. also the details in Example 3 below), which can be reacted with a particulate porous material of the invention, for example under inert gas atmosphere in an anhydrous solvent such as toluene. Further matter such as organic molecules can then be immobilized via adsorption. As an illustrative example, on ammonium-functionalized particulate porous matter anionic molecules may be adsorbed as described by Qin, & Liu (*Journal of Hazardous Materials* (2009) 162, 133-139).

A particulate porous metal oxide or metalloid oxide obtainable according to the present invention may in some embodiments be used for the storage of matter, such as a fluid, including a gas. As an illustrative example, the porous material may be used for hydrogen storage and/or for fuel cell applications. A particulate porous metal oxide or metalloid oxide obtainable according to the present invention may also be used for the storage of one or more peptides, lipids, polysaccharides, saccharides, proteins or low molecular weight organic compounds. As an illustrative example, in embodiments where the porous material has been mono- or multi-functionalized, it may be used for the controlled release of pharmaceutically active compounds, for example in the treatment or diagnosis of an organism, such as a mammal, including a human. Alternatively, non-functionalized porous material may be used and compounds be included therein via adsorption, encapsulation and/or non-covalent interactions (cf. above). Selecting a suitable porous material avoids the use of a biodegradable polymer such as polylactic acid, a polyglycolic acid or a polylactic-co-glycolic acid, for degradation products of which an inflammatory response has been observed.

A respective controlled release may be used for administering a compound such as an active agent, e.g. an antibiotic, an analgesic, a polysaccharide, an oligosaccharide, a lipide, a peptide or a protein, including a growth factor, locally over an extended period of time, such as in the range of days, months or years Amino-groups or carboxyl groups may for instance serve in capturing a selected low molecular weight organic compound within and/or on the porous material and additional groups such as trimethylsilyl-groups may serve in delaying/slowing the release rate of the respective compound from the porous material. An example of respective functionalization and use of (meso)porous silica, including in vitro release data, has been presented by Xu et al. (*Journal of Solid State Chemistry* (2008) 181, 2837-2844). An illustrative example of using non-functionalized porous silica has for instance been disclosed by Radin et al. (*Biomaterials* (2009) 30, 850-858), where the biologically active molecule has been incorporated into the sol during the formation of the porous silica. Diffusion controlled drug release has been suggested to govern the release of the antibiotic vancomycin from the microspheres used in this example.

A peptide may be of synthetic origin or isolated from a natural source by methods well-known in the art. The natural source may be mammalian, such as human, blood, semen, or tissue. A peptide, including a polypeptide may for instance be synthesized using an automated polypeptide synthesizer. Illustrative examples of polypeptides are an antibody, a fragment thereof and a proteinaceous binding molecule with antibody-like functions. Examples of (recombinant) antibody fragments are Fab fragments, Fv fragments, single-chain Fv fragments (scFv), diabodies, triabodies (Iliades, P., et al., *FEBS Lett* (1997) 409, 437-441), decabodies (Stone, E., et al., *Journal of Immunological Methods* (2007) 318, 88-94) and other domain antibodies (Holt, L. J., et al., *Trends Biotechnol*. (2003), 21, 11, 484-490). An example of a proteinaceous binding molecule with antibody-like functions is a mutein based on a polypeptide of the lipocalin family (WO 03/029462, Beste et al., *Proc. Natl. Acad. Sci. U.S.A.* (1999) 96, 1898-1903). Lipocalins, such as the bilin binding protein, the human neutrophil gelatinase-associated lipocalin, human Apolipoprotein D or glycodelin, possess natural ligand-binding sites that can be modified so that they bind to selected small protein regions known as haptens. Examples of other proteinaceous binding molecules are the so-called glubodies (see e.g. internation patent application WO 96/23879), proteins based on the ankyrin scaffold (Mosavi, L. K., et al., *Protein Science* (2004) 13, 6, 1435-1448) or crystalline scaffold (e.g. internation patent application WO 01/04144) the proteins described in Skerra, *J. Mol. Recognit*. (2000) 13, 167-187, AdNectins, tetranectins and avimers. Avimers contain so called A-domains that occur as strings of multiple domains in several cell surface receptors (Silverman, J., et al., *Nature Biotechnology* (2005) 23, 1556-1561). Adnectins, derived from a domain of human fibronectin, contain three loops that can be engineered for immunoglobulin-like binding to targets (Gill, D. S. & Damle, N. K., *Current Opinion in Biotechnology* (2006) 17, 653-658). Tetranectins, derived from the respective human homotrimeric protein, likewise contain loop regions in a C-type lectin domain that can be engineered for desired binding (ibid.). Peptoids, which can act as protein ligands, are oligo(N-alkyl) glycines that differ from peptides in that the side chain is connected to the amide nitrogen rather than the a carbon atom. Peptoids are typically resistant to proteases and other modifying enzymes and can have a much higher cell permeability than peptides (see e.g. Kwon, Y.-U., and Kodadek, T., *J. Am. Chem. Soc*. (2007) 129, 1508-1509).

An illustrative example of a protein that can be encapsulated in, or immobilized in or on a particulate porous metal oxide or metalloid oxide obtainable according to the present invention is an enzyme, which may then be used in one or more catalysis applications. Any desired enzyme may be used that can for instance be encapsulated in a selected porous material, such as a cellulase, e.g. an enzyme that catalyses the hydrolysis of cellulose, for example to form glucose or ethanol. The selection of the pore size of the porous material may be optimized for each individual cellulase as described by Takimoto et al. (*Microporous and Mesoporous Materials* (2008) 116, 601-606). A further illustrative example of a suitable enzyme is penicillin acylase. Yet a further example of a suitable enzyme is pepsin such as porcine pepsin (Manyar, H. G., *J. Phys. Chem. C* (2008) 112, 18110-18116), which may be immobilized within the porous material by means of physical adsorption. An immobilized enzyme may in some embodiments provide a biosensor.

A particulate porous metal oxide or metalloid oxide obtainable according to the present invention may be used as a catalyst or as a support for a catalyst. In some embodiments it may for instance be used in catalytic combustion, such as the oxidation of volatile organic compounds, e.g. propen (Orlov & Klinowski, 2009, supra). In embodiments where the particulate porous material according to the invention includes more than one metal oxide or metalloid oxide one or more, including all, of the respective oxides may show a corresponding catalytic activity. In CuO-loaded mesoporous SBA-15 the copper oxide may for instance serve as the catalyst in the hydroxylation of benzene to phenol Kong et al., 2009, supra). A particulate porous metal oxide or metalloid oxide obtainable according to the invention may also be functionalized with chelating ligands, to which catalytically active organometallic complexes may be complexed. As an illustrative example, diphenylphosphino ligands may be covalently bound to the porous metal or metalloid oxide, and Pd- or Ru-containing organometallic silanes chelated thereto as described by Zhang et al. (*Advanced Functional Materials* (2008) 18, 3590-3597). Multiple active sites may be introduced, thereby forming a multifunctional catalyst (ibid.).

Accordingly, the present invention also relates to a particulate porous metal oxide or metalloid oxide obtainable by a method described above, as well as to uses thereof In some embodiments the particulate porous metal oxide or metalloid oxide has the form of spheres. In some embodiments the particulate porous metal oxide or metalloid oxide has a particle width of 10 micron or below. The particle width may for example range from about 250 nm to about 5 microns, or below about 3 microns, such as from about 500 nm to about 3 microns, including a particle width of 2 micron or below such as 1 micron or below.

In some embodiments the particulate porous metal oxide or metalloid oxide obtainable by a method described above has mesopores. The term "mesopore" is used in the art for a pore with a width in the range from about 2 to about 50 nm. The oxide may for instance be mesoporous and have a pore width (pore diameter) of more than about 5 nm, including a pore width of at least about 6 nm or a pore width of at least about 8 nm. In this context it is noted that the present application allows for the first time to enlarge the pore diameter to a size of, for example, 8 nm without losing the structural order of the particles. It may for example have a pore width in the range from about 5 nm to about 15 nm, including from about 6 nm to about 15 nm or from about 8 nm to about 15 nm. The pore volume of the particulate porous metal oxide or metalloid oxide is in some embodiments of at least about 0.5 cm$^3$/g, such as from about 0.5 cm$^3$/g to about 2 cm$^3$/g, e.g. at least about 0.7 cm$^3$/g, at least about 0.9 cm$^3$/g, at least about 1.0 cm$^3$/g, at least about 1.2 cm$^3$/g, at least about 1.3 cm$^3$/g, at least about 1.5 cm$^3$/g or at least about 1.7 cm$^3$/g. The particulate porous metal oxide or metalloid oxide has in some embodiments pore walls of at least about 1 nm, including at least about 2.5 nm. A mesoporous particle may have any form and shape, including a sphere, a rod, a disc or a rope. The pores may be arranged in an ordered arrangement with symmetry such as hexagonal, cubic or lamellar.

The pores of the particulate porous metal oxide or metalloid oxide can be analysed by a variety of techniques. Examples include, but are not limited to, transmission electron microscopy, scanning electron microscopy, gas, e.g. nitrogen, adsorption, inverse platinum replica imaging, small-angle X-ray scattering, small-angle neutron scattering and positron annihilation lifetime spectroscopy. In some embodiments of transmission electron microscopy (TEM) a series of TEM images is taken from the same position at different tilt angles and 3D-information obtained in the so called tomography mode. In some embodiments of scanning electron microscopy (SEM) high resolution-SEM is used, working at very low currents and voltages. Structural information can furthermore be taken from NMR, Raman and FTIR spectroscopies, electrochemical methods, UV-Vis absorption and fluorescence spectroscopies, as well as single molecule spectroscopic methods. In single molecule spectroscopic methods the materials are typically investigated by doping them with very low, usually nanomolar, concentrations of fluorescent dyes. Individual molecules and/or individual nanoscale environments can then be analysed.

The particulate porous metal oxide or metalloid oxide may have a BET surface area in the range from about 400 m$^2$/g to about 1200 m$^2$/g, such as about 400 m$^2$/g to about 1100 m$^2$/g, about 400 m$^2$/g to about 1000 m$^2$/g, including a BET surface area of at least about 500 m$^2$/g, such as at least about 600 m$^2$/g, at least about 700 m$^2$/g or at least about 800 m$^2$/g.

As indicated above, the present invention also relates to the use of a particulate porous metal oxide or metalloid oxide, obtainable as described above, in e.g. the separation of a mixture of molecules in a fluid, in catalysis, in nonlinear optics, as an ion-exchange coating, in the formation of a solid-state electrochemical device and in the formation of a drug delivery vehicle. Since metal and metalloid oxides such as silicates or aluminosilicates with high biocompatibility and at the same time mechanical strength, thermal and pH stability are available, a particulate material according to the invention is suitable for the controlled release of a pharmaceutically active substance therefrom. In some embodiments the separation of a mixture of molecules in a fluid is chromatography, such as gas chromatography, capillary electrochromatography, HPLC (high performance liquid chromatography) or UPLC (ultrahigh pressure liquid chromatography). In such separation applications the particulate porous metal oxide or metalloid oxide is typically used as a chromatography stationary phase. The present invention thus also relates to a chromatography stationary phase that includes a particulate porous metal oxide or metalloid oxide obtainable by a method as described above. The present invention also relates to a method of performing a fluid chromatographic separation of a mixture of molecules. This method includes contacting the mixture of molecules and the particulate porous metal oxide or metalloid oxide.

Accordingly, in some embodiments a method according to the invention is a method of forming a UPLC matrix. High-throughput analysis is in increasing demand, e.g. for fast screening of a plurality of samples generated by modern synthesis and combinatorial libraries, particularly in drug discovery. With an increase in the number of drug candidates, the demand to improve the productivity of analyses in pharmaceutical development has significantly raised the level of interest in high-speed liquid chromatography. In addition, real-time quality control in the manufacturing of drug substances and products demands an improvement in analytical speed that is most often related to chromatographic separations.

The efficiency of a chromatographic process (as it is very well known from the Van Deemter equation) is inversely proportional to particle size. The use of particulate material according to the invention is thus particularly advantageous, if a small particle size is selected. In describing band broadening on a theoretical basis by describing the relationship between height equivalent of a theoretical plate (HETP) and linear velocity, the path-dependent term depends on the diameter of particles packed into the column. Reducing the particle size of silica substantially increases the number of HETP for a given column length. Already on a theoretical basis it can therefore be concluded that the use of smaller particles will lead to increased separation efficiency at high linear velocities. However, the use of smaller particles requires much greater pressures (>6,000 psi) than conventional HPLC systems. Whereas in conventional liquid chromatography the maximum backpressure can be up to 35-40 MPa, depending on the instrument, in UPLC the backpressure can reach 103.5 MPa. Ultrahigh or very high pressure pump systems have only recently been made available that can overcome the high pressure drop generated by small particles. Such high pressure, in particular of 1000 bar and above, however induces changes in the physical-chemical properties of solvents, solutes and column packings. With regard to solutes, molar volume, solubility and diffusion coefficients change. With regard to solvents, the melting point, density and viscosity increase. With regard to the column, geometric deformation of the bed and column tube typically occurs. What is more, high pressure generates significant viscous heating inside the column. This heat is partly being exchanged with the ambience by axial convection toward the column outlet or by axial or radial heat diffusion, thereby further creating inhomogeneity. As a result the radial and axial velocity profiles may be altered, thereby causing band broadening. Gritti & Guichon (*J. Chromatography A* (2008) 1187, 165-179) have carried out a first approach on studying the effects of very high inlet pressure. Their data point to the viscosity of the mobile phase being twice larger at the column inlet than at its outlet, and to the density being 10% higher when the column inlet pressure reaches ca. 1000 bar. The local heights equivalent to a theoretical plate (HETP) was further found to vary significantly along the column, and classical HETP equations to be of only limited applicability.

One approach of achieving fast liquid chromatography separations without compromising efficiency or resolution has been the use of monolithic columns. The present inventors have surprisingly found that a porous particulate metal or metal oxide formed according to the method described above shows an extremely low column pressure in comparison to chromatography matrices used in the art. For instance at a flow rate of 0.4 mL/min a octadecyltriethoxysilane functionalized SBA-15 material generated according to a method of the invention exhibited only a back pressure of 2800 psi compared to 14500 psi observed with the commonly used Nanosil column (see also the examples below). The material obtained with the method of the invention thus allows the use of higher flow rates, thereby reducing separation time, and at the same time maintaining separation efficiency.

A chromatography matrix, i.e. a chromatography stationary phase, according to the invention may include any covalently or non-covalently immobilized molecules or moieties as described above, for example to affect its polarity or to provide it with affinity to a selected target molecule. In some embodiments the chromatography matrix is a stationary phase for UPLC. The invention thus also provides a UPLC column. The UPLC column includes a particulate porous metal oxide or metalloid oxide obtainable as described above as a stationary phase.

Accordingly the present invention also relates to a method of separating a mixture of molecules in a fluid, including a method of enriching, purifying and/or isolating a component of a mixture of molecules in a fluid. The term "enriched" means that an analyte of interest constitutes a significantly higher fraction of the total mixture of molecules present in a mixture obtained by the method than in the original mixture to which the method was applied. The term "isolating" indicates that a naturally occurring entity, e.g. molecule, virus or microorganism, has been removed from its usual, e.g. cellular, environment. The term "purifying" does not require absolute purity (such as a homogeneous preparation). Instead, it represents an indication that the analyte of interest is relatively purer than in the natural environment. Compared to the natural level this level will generally be at least 2-5 fold greater, e.g., in terms of mg/ml.

The method of enriching, purifying and/or isolating an analyte may be a method of column chromatography, of batch chromatography, of centrifugal chromatography or a method of expanded bed chromatography. It may be based on any underlying separation technique, such as adsorption chromatography, size exclusion chromatography (also termed gel-filtration) or affinity chromatography and may also be a method of capillary gas chromatography. In embodiments where the method is affinity chromatography the particulate porous metal oxide or metalloid oxide is usually covalently coupled to a molecule with binding affinity for a selected target molecule (see above).

As an illustrative example, in one embodiment a method according to the invention may include packing a chromatography column with a slurry that includes a particulate porous metal oxide or metalloid oxide as described above. The slurry may further include a liquid suitable for packing the chromatography column therewith. The method may further include introducing a mixture to be separated into the slurry. In some embodiments the slurry may have been packed into a column before applying a respective mixture thereto. In other embodiments the slurry may be packed into a column after the mixture has been applied thereto. In yet other embodiments the slurry may not be packed into a column, but rather be sedimented by centrifugation. In embodiments where a column has been packed with the particulate porous metal oxide or metalloid oxide, the method may further include introducing into the packed chromatography column a mobile phase of a liquid that is suitable for handling the mixture to be separated. The method may further include retrieving the mobile phase from the chromatography column, thereby retrieving at least one component of the mixture introduced into the slurry. In other embodiments the method may include at least essentially replacing the fluid in which the slurry was contacted with the mixture and retrieving at least one component of the mixture introduced into the slurry by sedimenting the particulate porous metal oxide or metalloid oxide by centrifugation.

In order that the invention may be readily understood and put into practical effect, particular embodiments will now be described by way of the following non-limiting examples.

EXAMPLES

Example 1

Fabrication of Mesoporous SBA-15

SBA-15 was synthesized using Pluronic P123 (Sigma-Aldrich) as structure directing agent and CTAB (Sigma-Aldrich) as co-surfactant and tetraethyl orthosilicate (TEOS, Sigma-Aldrich) as silica precursor, respectively. In a typical synthesis, 1.2 g P123 and 0.2 g CTAB were dissolved in a solution formed by mixing 20 ml of 2 M HCl, 16 ml $H_2O$ and 10 ml absolute ethanol. TEOS (4 ml) was added into the above-mentioned aqueous solution at 40° C. under vigorous stirring. The self-assembly was regulated for various time from 45 min to 2 h stirring at 40° C., followed by aging at 80° C. for the desired time (5 h, 6 h and 24 h) under refluxing condition. The resulting powder was recovered by filtration, washed with deionized water and dried under ambient conditions.

For the purpose of comparison, SBA-15 sample was also synthesized following the above-mentioned procedure in the absence of CTAB as co-surfactant. Conventional SBA-15 sample was prepared by static hydrothermal synthesis according to literatures (Chmelka, B. F., & Stucky, G. D., *J. Am. Chem. Soc.* (1998) 120, 6024; Zhao, D., et al., Science (1998) 279, 548). The pre-dried SBA-15 powder was heated at a constant rate from room temperature to 813 K over 20 h under He and held for 1 h under the same condition, then the sample was held at 813 K for 5 h in air to remove the residual surfactant. The thermal and hydrothermal stabilities were tested by calcining at 1073 K for 12 h in air flow and boiling for 12 h in 50 ml of distilled water, respectively (Regev, O. *Langmuir* (1996) 12, 4940). Mechanical stability tests were performed following a procedure reported by Ryoo et al. (Ryoo, R., et al., *Stud. Surf Sci. Catal.* (2001) 135, 150; Cassiers, K., et al., *Chem. Mater.* (2002) 14, 2317). About 0.5 g powdered calcined samples were palletized into a steel die of 13 mm diameter using a hand-operated press apparatus for 10 min. the unidirectional external pressures applied was as high as 450 MPa.

Example 2

Characterisation of Mesoporous SBA-15

Powder X-ray diffraction patterns were recorded with a Bruker AXS D8 diffractometer (under ambient conditions) using filtered Cu—Kα radiation. Diffraction data were recorded between 0.5° and 8° (2θ) with a resolution of 0.02° (2θ). Nitrogen adsorption-desorption isotherms were measured at 77 K with a static volumetric instrument Autosorb-6b (Quanta Chrome). Prior to each measurement, the sample was outgassed at 523 K to a residual pressure below $10^{-4}$ Torr. A Baratron pressure transducer (0.001-10 Torr) was used for low-pressure measurements. The specific surface area was estimated by the Brunauer-Emmett-Teller (BET) method (Brunauer, S., et al., *J. Am. Chem. Soc.* (1938) 60, 309).

The pore size distribution (PSD) was calculated from desorption branch using the Barrett-Joyner-Halenda (BJH) method (Barrett, E. P., et al., *J. Am. Chem. Soc.* (1951) 73, 373), although it is well-known that this method underestimates the pore diameter (Choma, J.; et al., *Appl. Surf Sci.* (2002) 196, 216). The BJH method here is used for the purpose of simplicity, and this mathematical algorithm will not significantly affect the systematic comparison.

The FESEM images were obtained with a JEOL Field Emission Scanning Electron Microscope (JSM-6700E-FE-SEM). Prior to the analysis, the samples were deposited on a sample holder using an adhesive carbon tape and then sputtered with gold. Transmission electron microscopy (TEM) was performed on a JEOL 2010, operated at 200 KV. Sample was suspended in ethanol and dried on holey carbon-coated Cu grids. The $^{29}Si$ solid-state nuclear magnetic resonance (NMR) experiment was carried out at frequency of 400 MHz on a Bruker NMR spectrometer. The spectra were measured at room temperature and the magic-angle spinning frequencies were set at 5 kHz. Chemical shifts were externally referenced to tetramethylsilane (TMS).

Example 3

Fabrication of Mesoporous SBA-16

SBA-16 was synthesized using triblock co-polymer Pluronic F127 (SigmaAldrich) as template, CTAB (Sigma Aldrich) as co-template, tetraethyl ortho-silicate (TEOS, Sigma Aldrich) as silica precursor. The preparation procedures were as follows: 0.63 g F127 and 0.073 g CTAB were completely dissolved in 71.28 g of 2 M HCl solution, followed by adding 2.083 g TEOS under intense stirring. The molar ratio was TEOS/F127/CTAB/HCl/$H_2O$=1:0.005: 0.02:14.3:495. The mixture was transferred into a 250 ml round bottle flask and kept stirring at an elevated temperature of 40° C. for 1~6 hrs, and another 6 hrs under refluxing condition at 80° C. The final products were collected by centrifugation and dried at 80° C. overnight. The surfactant was removed by calcination at 550° C. for 6 hrs. In comparison, conventional SBA-16 (denoted as SBA-16-cv) was synthesized under static condition according to the procedure reported elsewhere (Mesa et al., 2005, supra). The thermal and hydrothermal stabilities of calcined SBA-16 were tested by calcining the sample at 800° C. for 6 hrs in air flow and boiling for 72 hrs in distilled water, respectively. Calcined SBA-16 samples were pressed by means of a carver press to test their mechanical stability. The pressure was regulated from 3.15 to 13.5 tons, pressing time was fixed at 10 min. For simplicity, SBA-16 synthesized by this novel method is denoted SBA-16-xx/yy. For instance, SBA-16-02/06 represents SBA-16 synthesized with a self assembly time of 2 hrs and an aging time of 6 hrs.

Figure 28:
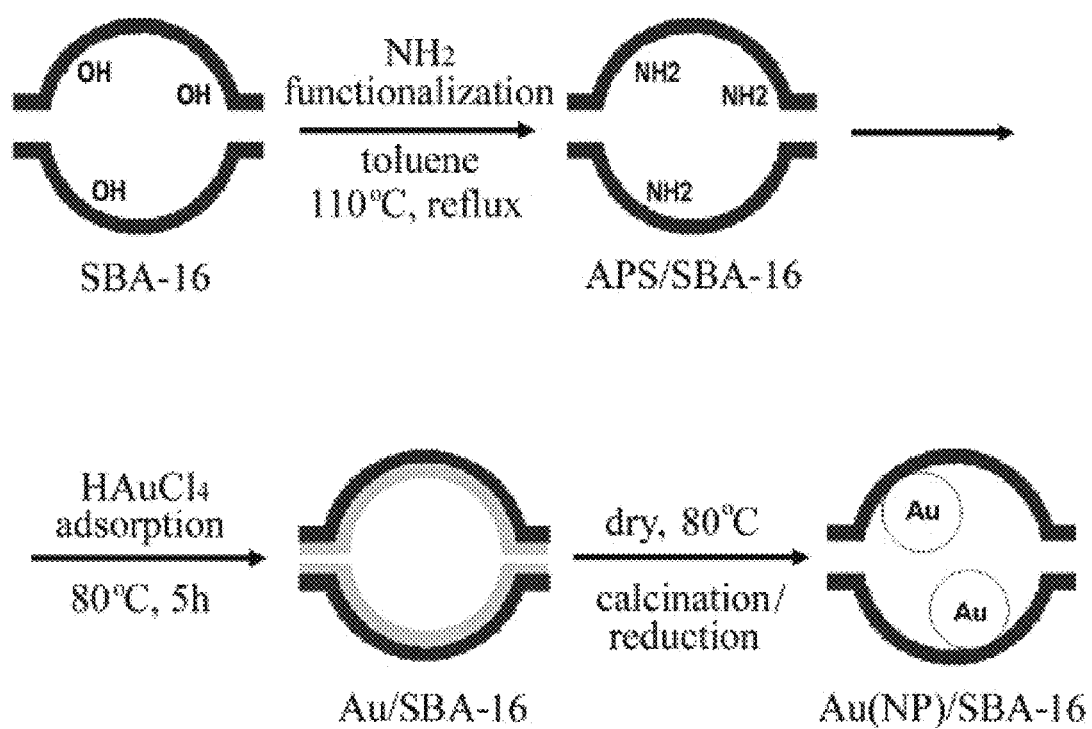
FIG. 28 shows a schematic of amine functionalization of SBA-16 and the preparation of Au/SBA-16.

Au/SBA-16 was prepared by a method reported by Chi et al (Chi, Y.-S., & Mou, C.-Y., Appl. Catal. A (2005) 284, 199.), using surfacefunctionalized mesoporous silica to adsorb the gold precursor (cf. FIG. 28). In a typical preparation, 1.0 g of SBA-16-02/06 sample was suspended in 30 mL of toluene solution containing 1.0% (3-aminopropyl) triethoxysilane (APS) and refluxed for 5 hrs. The resulting materials were filtered off, washed with toluene, and then dried at 80° C. to remove the remaining solvent. The amine functionalized SBA-16 sample was denoted as APS/SBA-16 Immobilization of gold nanoparticles was conducted by adding 1.0 g APS/SBA-16 to 100 mL $10^{-3}$ M $HAuCl_4$ aqueous solution, followed by stirring at 80° C. for 5 hrs. The mixture was filtered, washed with deionized water, and dried at 80° C. For comparison, Au/SBA-15 and Au/MCM-41 were also prepared following the same procedure. The final gold loading was measured by ICP.

Example 4

Characterisation of Mesoporous SBA-16

Powder X-ray diffraction patterns were recorded with a Bruker AXS D86 diffractometer (under ambient conditions) using filtered Cu—Kα radiation. Diffraction data were collected between 0.5° and 8° (2θ) with a resolution of 0.02° (2θ). Nitrogen physisorption isotherms were measured at −196° C. with a static volumetric instrument Autosorb-6b (Quanta Chrome). Prior to each measurement, the sample was degassed at 250° C. to a residual pressure below $10^{-4}$ Torr. A Baratron pressure transducer (0.001-10 Torr) was used for low-pressure measurements. The Brunauer-Emmett-Teller (BET) method was adopted to estimate the specific surface area. The Barrett-Joyner-Halenda (BJH) method was used to calculate the pore size distribution using the desorption branch. Transmission electron microscopy (TEM) was performed on a JEOL JEM-2010, operated at 200 KV. The samples were suspended in ethanol and dried on holey carbon-coated Cu grids. $^{29}Si$ solid-state NMR experiments were performed on a Bruker DSX300 spectrometer with a frequency of 59.63 MHz, a recycling delay of 600 s, a radiation frequency intensity of 62.5 kHz, and the reference sample of $Si_8O_{12}$. Diffuse reflectance UV-visible (DR UV-vis) spectra were recorded with a Varian-Cary 5000 spectrometer equipped with a diffuse reflectance accessory. The spectra were collected between 200~800 nm at room temperature with $BaSO_4$ as a reference.

Example 5

SBA-16 Catalyst Evaluation

The solvent-free oxidation of benzyl alcohol with molecular $O_2$ was carried out using a bath-type reactor operated under atmospheric condition. In a typical reaction run, 200 mg of catalyst was loaded to a glass flask pre-charged with 10 mL (98.5 mmol) benzyl alcohol. The mixture was then heated to the reaction temperature of 160° C. under vigorous stirring. Oxygen flow was bubbled at a flow rate of 20 mL min$^{-1}$ into the mixture to start the reaction once the reaction temperature was reached. After reaction, the solid catalyst was filtered off and the liquid organic products were analyzed using an Agilent gas chromatograph 6890 equipped with a HP-5 capillary column. Dodecane was the internal standard to calculate benzyl alcohol conversion and benzaldehyde selectivity.

Example 6

Use of Mesoporous SBA-15 as a Stationary Phase in UPLC

Prior to the UPLC column packing, the mesoporous SBA-15 was functionalized following a general process of octadecyl-functionalization step by using octadecyltriethoxysilane coupling reagent (Kailasam, K., & Muller, K., *J. Chromatogr. A* (2008) 1191, 125; Zhao, J. W., et al., *Chem. Commun.* (2002) 752). Briefly, 1.5 g of SBA-15 sample and 1.0 mL of dried pyridine were immediately added to the solution with magnetic stirring. Then 1.0 mL of octadecyltriethoxysilane was dropped to the suspension and refluxed in oil bath for 24 h. After cooling, the modified silica was collected from the mixture by centrifuge followed by successive solvent washings. The $C_{18}$ functionalized SBA-15 sample was slurry-packed into a stainless column (4.6×50 mm) under 15000 psi (1 psi=6896 Pa) pressure. Ultra Performance Liquid Chromatography experiments were tested on a Waters Acquity UPLCTM system, which was equipped with a sample manager, a binary solvent delivery manager and a tunable ultraviolet (UV) detector. Eight aromatic molecules, benzene, toluene, naphthalene, biphenyl, fluorene, phenanthrene, anthracene and fluoranthene, were separated on the column using acetonitrile-water (55:45, v/v) as the mobile phase at a flow rate of 1.0 mL/min with a wavelength detector set at 254 nm.

SBA-15: Results and Discussion

To study the effect of cationic CTAB on the self-assembly process during the synthesis of SBA-15, the aging time is fixed at 24 h and the self-assembly time is varied from 45 min to 2 h. The observations emphasize on the importance of CTAB in reducing the self-assembly time. It is well-known that SBA-15 material is typically identified by an intense (100) X-ray diffraction around 2θ=0.8° and several other higher index diffraction peaks in the 2 θ range from 1.5 to 8°. The XRD patterns of these as-synthesized SBA-15 samples are shown in FIG. 7. As a comparison, synthesis of SBA-15 without adding CTAB as co-surfactant is studied first. A transparent gel is obtained when the self-assembly time is 1 h in the absence of CTAB, the sample does not show any discernable XRD diffraction peak in the range of 0.8-8°, indicating the amorphous nature of resulting material. When the self-assembly time is prolonged to 2 h, the resultant product exhibits a single broad peak with low intensity and absence of the XRD diffraction peaks at higher angle, it indicates at least 2 h of self-assembly time is required to form the less ordered mesostructure. The results here are marginally different from the observation on the synthesis of SBA-15 reported by Jaroniec and co-workers (Fulvio, P. F., et al, *J. Colloid Interface Sci.* (2005) 287, 717; Fulvio, P. F., et al., *J. Mater. Chem.* (2005) 15, 5049). When CTAB is introduced into the synthesis mixture as co-surfactant, it has a significant influence on the self-assembly of P123 block co-polymer during the SBA-15 synthesis, the self-assembly time can be remarkably reduced from 2 h to 45 min. XRD pattern exhibits well resolved diffraction peaks assigned to (100), (110), and (200) planes, indicating the well defined long range order mesostructure. A slightly improved mesostructure can be noticed with increasing the self-assembly time in the presence of CTAB; XRD diffraction peaks at higher angle range become better-resolved.

Figure 8B:
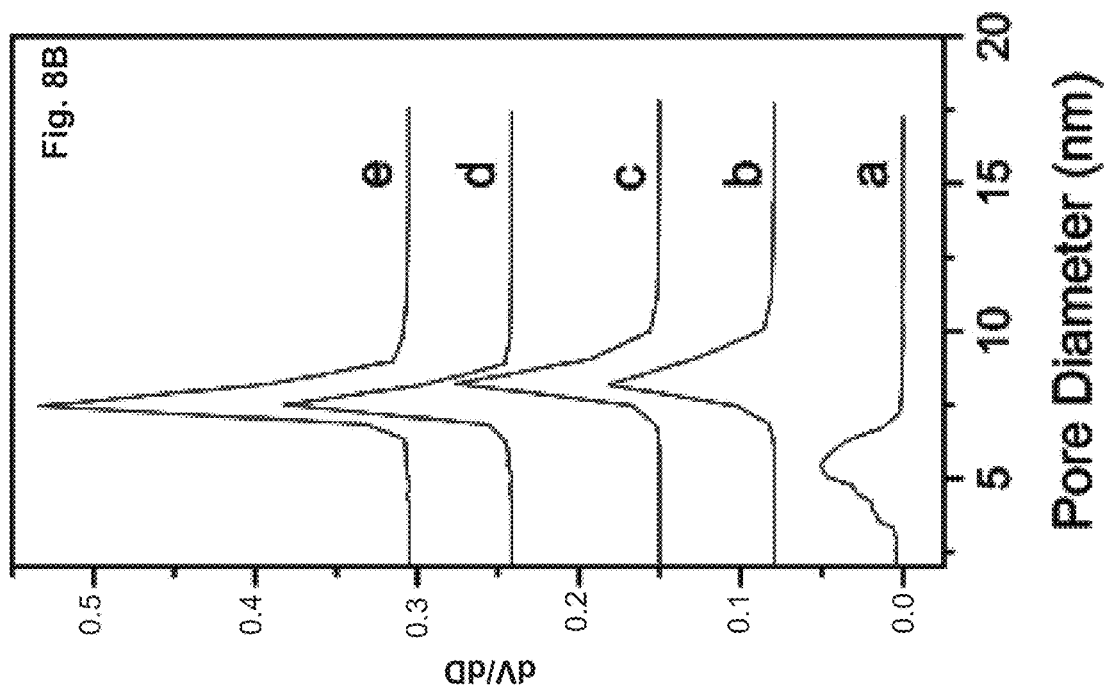
FIG. 8 depicts nitrogen sorption isotherms (A) and corresponding pore size distributions (B) of the samples at a given aging time of 24 h and varying the self-assembly time of (a) 2 h without introducing CTAB, (b) 2 h, (c) 1.5 h, (d) 1 h and (e) 45 min.

The nitrogen physisorption isotherms and pore size distributions are depicted in FIG. 8, and the corresponding textural properties are summarized in FIG. 2. All samples exhibit type IV isotherms with clear capillary condensation steps. The product obtained without introducing CTAB shows type H2 hysteresis loop which ascribe to network effects commonly observed for porous materials lack of long range order structure (Chmelka & Stucky, 1998, supra; Zhao et al., 1998, supra). For the sample prepared with CTAB as co-surfactant, it shows a sharp step increase at $P/P_0$=0.6-0.8 due to the capillary condensation of nitrogen in the regular mesopores. The pore size distributions in FIG. 8 indicate that all the samples synthesized in the presence of CTAB have uniform pore size distribution even though the self-assembly time is extremely short. These results confirm that introduction of CTAB in initial synthesis mixture has a significant effect on the time reduction of the self-assembly step. With the increase of the self-assembly time from 45 min to 2 h, the pore diameters of the samples are slightly increased from 7.5 to 8.2 nm, which is larger than conventional SBA-15 prepared under similar conditions. The wall thicknesses are slightly reduced, which is mainly caused by the evolution of the ordered mesostructure.

Figure 6:
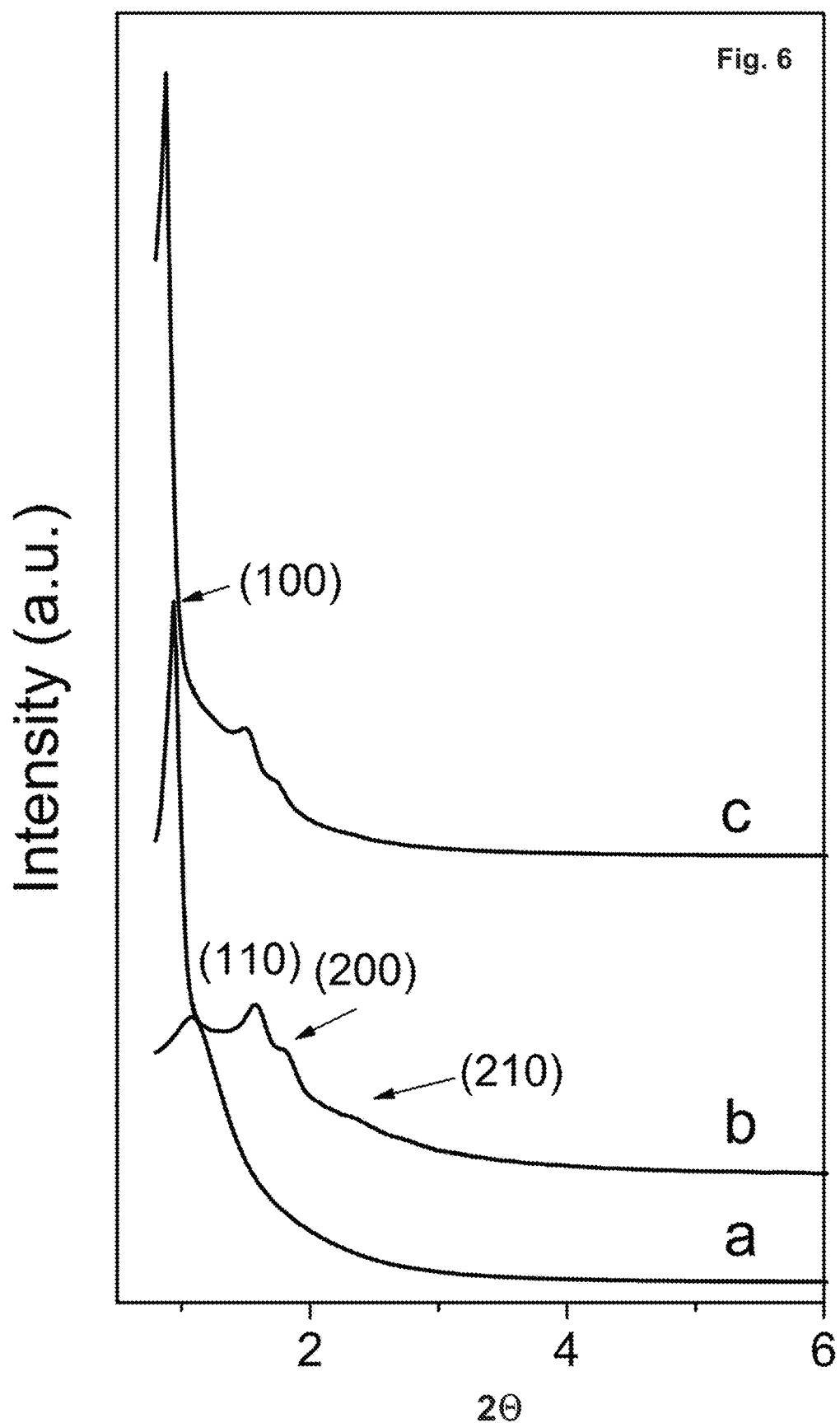
FIG. 6 depicts XRD patterns of calcined SBA-15 samples at different aging times: (a) 5 h, (b) 6 h and (c) 24 h. The self-assembly time was 45 min.

Further, in a method according to the invention refluxing is employed to improve the synthesis, aiming at controlling the morphology and reducing the aging time simultaneously. The self-assembly time is fixed at 45 min and the aging time is reduced from 24 h to 5 h. The XRD patterns of the resultant products synthesized with this protocol are shown in FIG. 6. When the aging time is 24 h, the sample exhibits the characteristic diffraction peaks assignable to a hexagonal symmetry of mesoporous SBA-15 evidenced by a intense (100) peak with several well-resolved (110), (200), and (210) peaks between 2θ=1.5-8.0°. As the aging time is shortened to 6 h, the sample shows identical XRD pattern compare to that of the 24 h aging sample. The obtained sample shows a d100 spacing of 9.8 nm, and the calculated hexagonal unit cell value ($a_0=2d_{100}/3^{1/2}$) of the sample from (100) diffraction peak reaches ca. 11.3 nm. The FWHM (full-width-at-half-maximum) of the (100) peak is about 0.2°, it indicates that the product is particularly well developed within 6 h. When the aging time is further reduced to 5 h, the XRD pattern exhibits only a single broad (100) peak with low intensity; it lacks of the XRD diffraction peaks at higher angle, indicating the less ordered mesostructure.

Figure 9A:
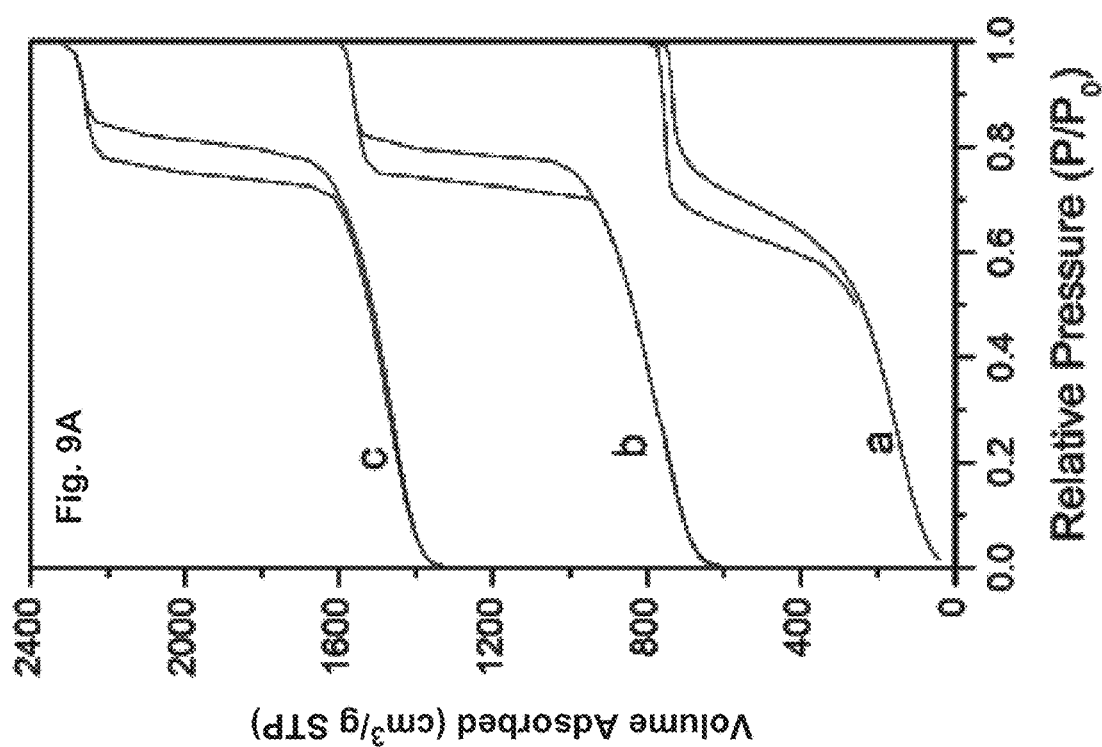
FIG. 9 shows nitrogen adsorption/desorption isotherms (A) and corresponding pore size distributions (B) calculated from the desorption branch by BJH method: (a) aging time of 5 h, (b) aging time of 6 h and (c) aging time of 24 h.
Figure 9B:
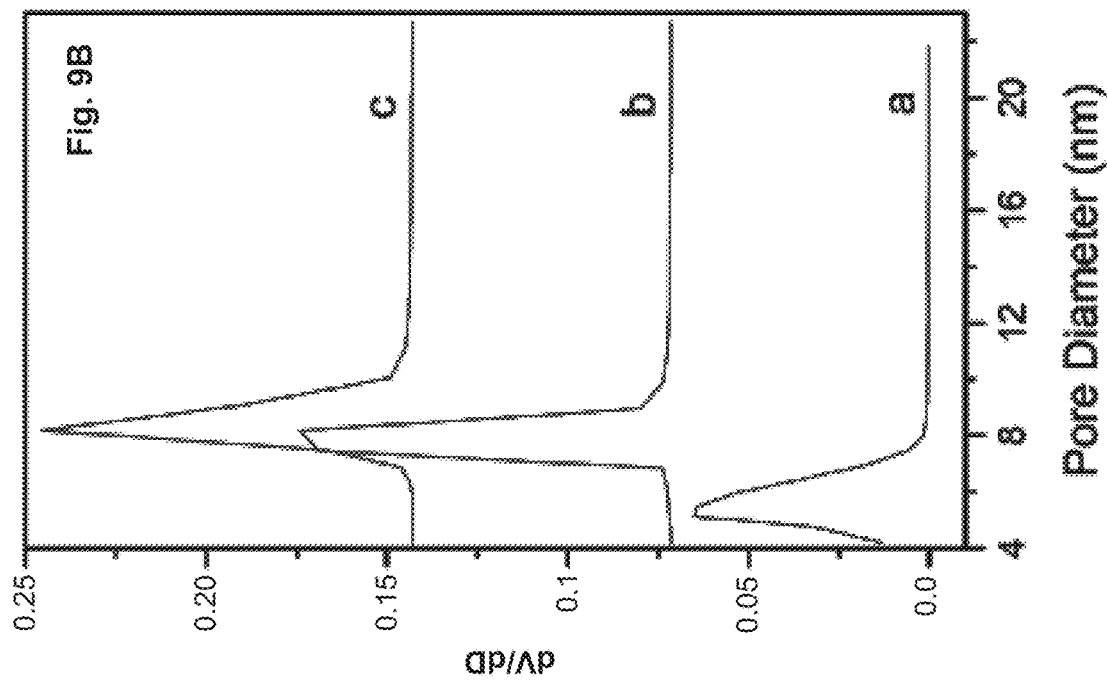

The representative nitrogen physisorption isotherms and corresponding pore size distributions of calcined SBA-15 materials are shown in FIG. 9. All samples exhibit type IV adsorption-desorption isotherms and sharp condensation steps, which reflect a highly uniform mesopore arrangement (Kruk, M., & Jaroniec, M., *Chem. Mater.* (2001) 13, 3169). In the case of sample aged for only 5 h, type IV adsorption-desorption isotherms with the characteristic H2 hysteresis loop is observed, corresponding pore diameter is 5.2 nm. It is suggested that the SBA-15 mesostructure cannot be completely developed within 5 h. For the sample of 6 h aging, it shows a sharp step increase at P/P0=0.7-0.8 due to the capillary condensation of nitrogen with the H1 hysteresis loops for the characteristic SBA-15 structure. The large slope of this step indicates a uniform-size pore system (Romero, A. A., et al., *J. Phys. Chem. B* (1998) 102, 123). A uniform and narrow pore size distribution (PSD) with average pore diameter of 8.0 nm is observed. The pore wall thickness is about 2.85 nm calculated by subtracting the pore diameter from the lattice unit parameter ($2d_{100}/3^{1/2}$-pore diameter). The textural parameters of various samples are summarized in Table 2. The surface area and the pore volume are 743 m$^2$/g and 2.1 cm$^3$/g, respectively. Considering the XRD results, the conclusion can be drawn that high quality SBA-15 sample can be prepared within 6 h aging under fluxing condition. When the aging time is prolonged to 24 h, the sample shows the identical physisorption properties with that of the aging 6 h sample; only the wall thickness is appreciably increased due to more silanol group condensation.

Figure 10A:
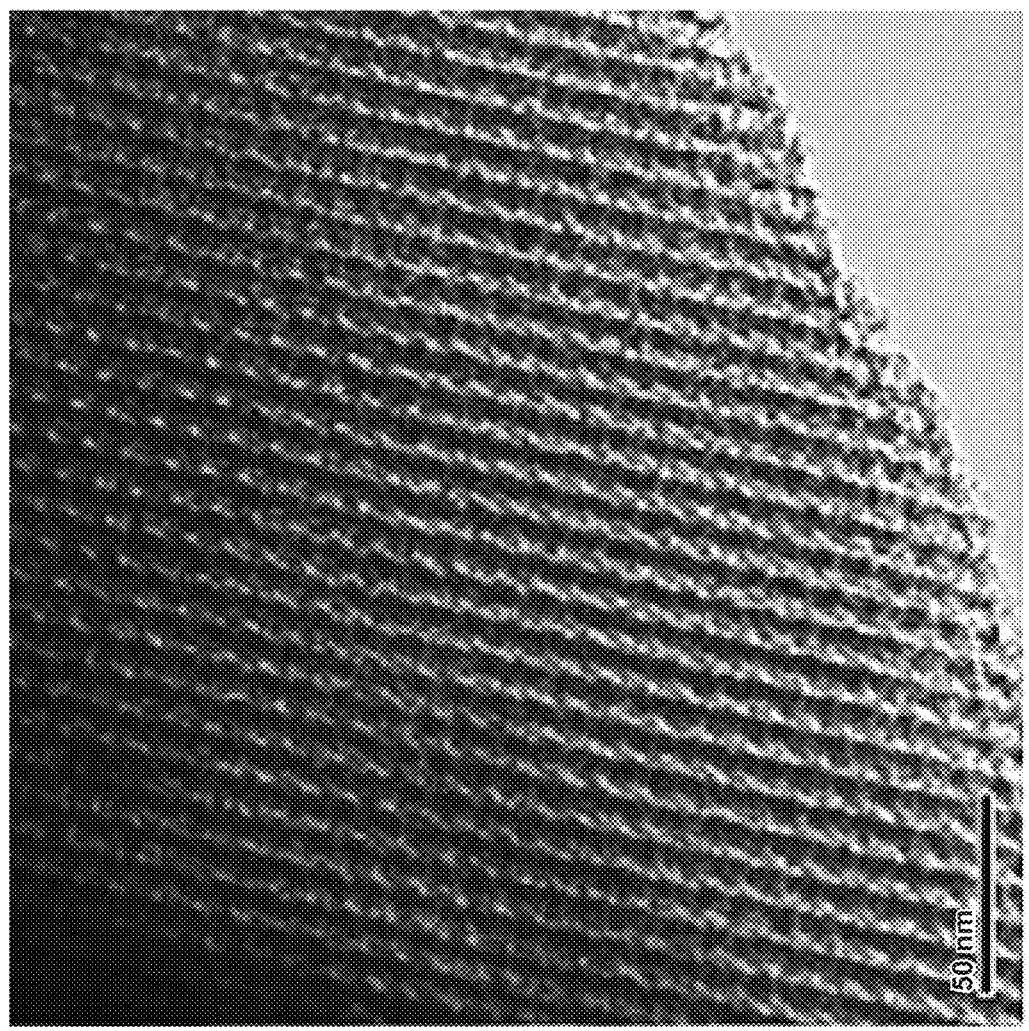
FIG. 10 depicts representative TEM (A) and SEM (B) images of the calcined sample obtained with the self-assembly tome of 45 min and the aging time of 6 h.
Figure 10B:
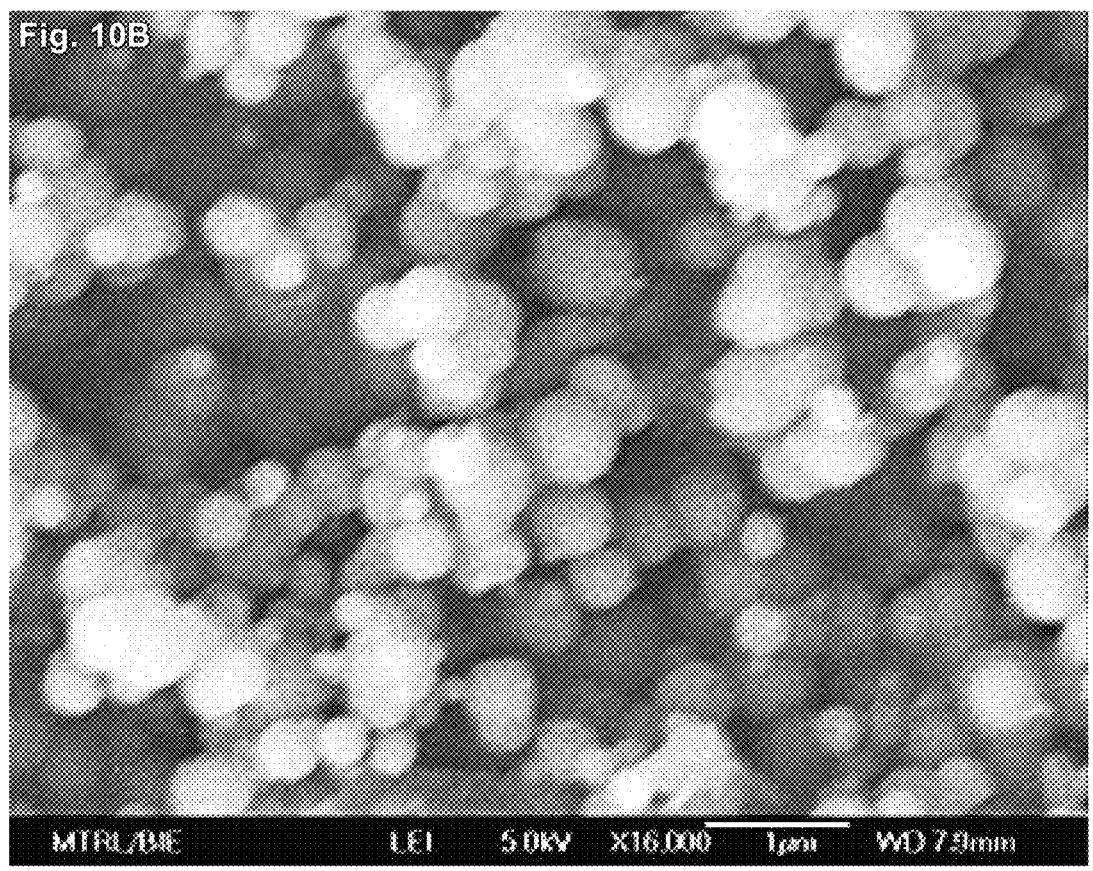
Figure 11:
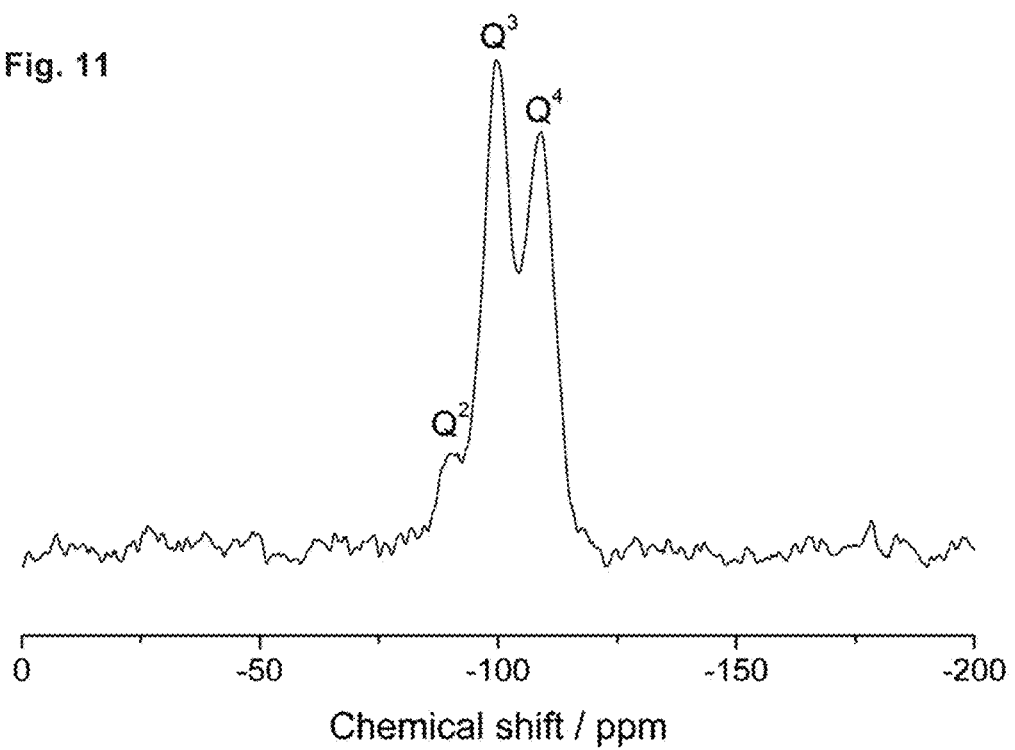
FIG. 11 shows Representative $^{29}Si$ MAS NMR spectra of the calcined sample obtained with the self-assembly time of 45 min and the aging time of 6 h.

The structural order of the sample obtained by this modified method (CTAB as co-surfactant under refluxing condition) is also evidenced by transmission electron microscopy (TEM) as shown by the representative TEM image in FIG. 10A. Well-ordered pore channels are clearly observed. From the TEM image, it is estimated that the pore channel diameter is about 8.0 nm, which is in good agreement with the pore size calculated from nitrogen physisorption measurement (FIG. 3). The FESEM image of the calcined sample is illustrated in FIG. 10B; uniform spherical particles with size ranging from 0.5 to 1 μm are observed. $^{29}$Si MAS NMR is used to probe the Si coordination environments. A representative $^{29}$Si MAS NMR spectrum for the sample with self-assembly time of 45 min and the aging time of 6 h is shown in FIG. 11. Two strong resonances at $\delta=-108.0$ and $-98.3$ ppm are observed, which can be assigned to Q4 and Q3 species of the silica framework, respectively, [$Q_n=Si(OSi)_n(OH)_{4-n}$, n=1–4] (Zhao & Lu, 2004, supra; Sakthivel, A., et al., *Micro. Meso. Mater.* (2005) 86, 341). A weak shoulder is also found at $\delta=-90.0$ ppm for the Q2 species. The spectrum bears much resemblance to that of the conventional SBA-15 (Zhang, F., et al., *J. Phys. Chem. B* (2005) 109, 8723), indicating that local arrangement of Si—O—Si bonds in the pore walls is similar.

The proposed formation mechanism here is: (1) as described in the introduction part, the formation of ordered CTAB micelle is fast (ca. 3 min) (Regev, O. *Langmuir* (1996) 12, 4940), while P123 needs a relative longer time to form the ordered micelle which is about 2 h (Flodstrom, K., et al., *Langmuir* (2004) 20, 4885; Flodstrom, K., et al., *Langmuir* (2004) 20, 680; Ruthstein, S., et al., *J. Am. Chem. Soc.* (2006) 128 3366; Imperor-Clerc, M., et al., *Chem. Commun.* (2007) 834). The introduction of CTAB will affect the micelle formation of P123 due to CTAB's CTAB's ionic characteristic. Based on this study, it is hypothesized that CTAB plays a key role in the formation of the nucleus (or core) of micelle in the initial micellization stage, then P123 molecules envelop the pre-formed nucleus to form compound micelle. Adding CTAB may accelerate the formation of P123 micelle. The schematic illustration of the whole procedure is shown in FIG. 1. (2) The concentration and temperature gradient in the synthesis suspension is lowered due to the continuous stirring and reflux, mass transfer rate is improved and the entire mixture is highly homogenized which favors the process of self-assembly of surfactant and silica species and aged. (3) The virtual concentration of ethanol in this reaction mixture is reduced by evaporation and it facilitates TEOS to hydrolyze and condense in the initial step of reaction. However, the ethanol is not discharged due to the reflux, with the progress of reaction, the overall ethanol concentration will increase, and then the condensation rate will decrease which promotes the formation of spherical particle to maintain the minimum free energy in the entire system (Stober, W., et al., *J. Colloid Interface Sci.* (1968) 26, 62). The pore diameter of 8.0 nm in our study is appreciably larger than that of conventional method (5.0 nm) (Chmelka & Stucky, 1998, supra; Zhao et al., 1998, supra). This verifies our proposed synthesis mechanism to a large extent.

Thermal, hydrothermal, and mechanical stability tests are also performed in this study evaluated by XRD (shown in FIG. 12) and nitrogen physisorption (shown in FIG. 13). A general overview of the results clearly indicates that SBA-15 samples obtained by this modified synthesis method present high hydrothermal, thermal, and mechanical stabilities. The sample can maintain highly ordered structure under calcinations at 1073 K for 12 h in air and boiling in deionized water for 12 h under continuous stirring; the XRD patterns exhibit three well-discernable XRD diffraction peaks in the range of 0.8-8°. After pressing SBA-15 sample at 450 MPa for 10 min, XRD pattern still shows a diffraction peak implying the good mechanical stability. The structural decay can be ascribed to the uncompleted condensed silica wall and is a consequence of the cleavage of Si—O—Si by adsorbed water promoted by compression (Galacho, C., et al., *Micro. Meso. Mater.* (2008) 108 283; Tatsumi, T., et al., *J. Porous Mater.* (1999) 6, 13). For the sample treated at 1073 K for 12 h in air, excellent thermal stability is demonstrated by the negligible change of the nitrogen physisorption isotherm (shown in FIG. 13), the hexagonal structure of SBA-15 is well-preserved, the pore diameter becomes smaller and the pore size distribution is narrower than that of the fresh SBA-15 sample. The increase of wall thickness is ascribed to the further condensation of Si—OH groups (Chen, C.-Y., et al., *Micro. Mater.* (1993) 2, 17). Though the sample treated in boiling water for 12 h still shows clear capillary condensation, a broader pore diameter distribution centered at 9.0 nm is attributed to the hydrolysis of surface silanol groups in the channel which leads to the pore expansion. The occurrence of pore expansion ascribes to the hydrolysis of surface silanol groups in the channel (Liu, X., et al., *J. Colloid Interface Sci.* (2008) 319, 377). In the case of pressing at a pressure of 450 MPa for 10 min, although the intensity of XRD diffraction peaks slightly decreases, the isotherm still presents a clear sharp capillary condensation step, indicating the existence of mesostructure. Additionally, the pore diameter is appreciably decreased; the full-width at the half-height of pore size distribution is increased, indicating minimal pore deformation upon compression (Galacho et al., 2008, supra; Tatsumi et al., 1999, supra; Kruk, M., et al., *Chem. Mater.* (1999) 11, 492. Furthermore, the shape of hysteresis loop changes from H1 type to H2 type upon the hydrothermal and mechanical treatments, indicating a less degree of pore size uniformity (Kruk, M.; Jaroniec, M. *Chem. Mater.* (2001) 13, 3169). Table 3 clearly shows that the above-mentioned treatments lead to a decrease of the specific surface area and pore volume by 30%. For the purpose of comparison, similar treatments are performed on the conventional SBA-15 samples, as shown in FIG. 14 and FIG. 5. The results indicate that the samples prepared with this modified rapid synthesis show comparable thermal, hydrothermal, and mechanical properties as the SBA-15 samples prepared under conventional conditions.

The sample in this study does possess high hydrothermal, thermal, and mechanical stabilities, which makes this sample a very good candidate for those gas phase reactions at high temperature, the separation of large organic molecules, such as proteins, and selective adsorption of large molecules from effluents, etc. Furthermore, this good mechanical stability is especially advantage for applications as the stationary phase in chromatography.

Mesoporous silicas with defined structure have been a very attractive research topic, primarily on the basis of new separation technology. Average particle size, morphology and mechanical strength are found to affect the plate height of the column and thus their separation efficiency (Ma, Y., et al., *Colloid Surf A* (2003) 229, 1; Boissière, C., et al., *Adv. Funct. Mater.* (2001) 11, 129). Inagaki et al. found the MCM-41 obtained by conventional method cannot be applied for packing material because they had very fine particle size and thus exhibited low mechanical strength (Inagki, S., et al., in: *Mesoporous molecular sieve (Sstudies in surface science and catalysis)*, by S. Kaliaguine, Elsevier Science (1998) 117, 65). Other researchers modified the synthesis route to prepare MCM-41, further used as stationary phase for conventional HPLC (Gallis, K. W., et al., *Adv. Mater.* (1999) 11, 1452), size-exclusion chromatohraphy (Kurganov, A., et al., *J. Chromatogr. A* (1996) 753, 177), capillary gas chromatohraphy (Raimondo, M., et al., *Chem. Commun* (1997) 1343), chiral HPLC (Thoelen, C., et al., *Chem. Commun.* (1999) 1841), and reversed-phase liquid chromatography (RPLC) (Martin, T., et al., *Chem. Mater.* (2004) 16, 1725). As for mesoporous SBA-15, there are few reports in the literatures for HPLC applications. Zhao et al. successfully applied C18 modified spherical SBA-15 as stationary phase in HPLC to separate biomolecules with 1000 plate number using dopamine as solute probe (Zhao et al., 2002, supra). Up to now, there is no literature available on the application of SBA-15 mesoporous silica in UPLC due to the extremely high back pressure operation. In this study, large pore-diameter SBA-15 with excellent mechanical stability will be packed into a UPLC column for separating aromatic molecules.

The functionalized large pore-diameter SBA-15 prepared with this modified approach (C18-SBA-15) is slurry-packed into an UPLC column for separation of aromatic molecules. Usually, the column pressure would increase dramatically with increasing flow rate if the column is packed with non-porous octadecyl-modified silica particles. The maximum flow rate attainable herein was ca 0.4 mL/min albeit under an extremely high pressure of 14,500 psi, which is the maximum pressure allowable for the Waters Acquity™ UPLC system. Consequently, in this instance, it would be difficult to effect a rapid separation on account of the limited flow rate. However, with the C18-SBA-15 spherical particles with relatively large pore-diameter (8.2 nm) the flow rate window can be dramatically increased due to lower back pressure. FIG. 15 shows that high flow rate can be easily achieved up to 2.0 mL/min, which means that a rapid separation is possible by using the functionalized spherical large pore-diameter SBA-15. In view of the low back pressure, the present inventors firstly applied this mesoporous silica as the packing materials for an UPLC column. Furthermore, a rapid and good separation of eight polycyclic aromatic hydrocarbons has been demonstrated on the C18-SBA-15 (shown in FIG. 16). The eight compounds are separated completely within 15 minutes by using acetonitrile-water (55:45, v/v) as the mobile phase at a flow rate of 1.0 mL/min. The calculated column efficiency is ca. 20,000 plates/m by biphenyl as solute probe. Further chromatographic and mechanistic studies are currently in progress.

SBA-16: Results and Discussion

Figure 19:
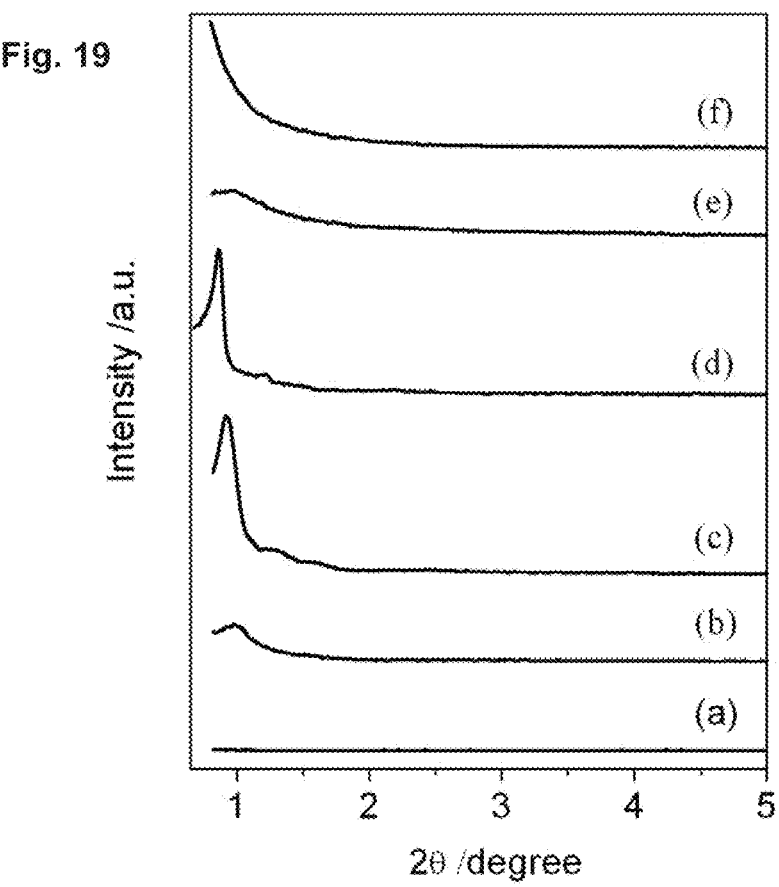
FIG. 19 depicts X-Ray Diffraction patterns of SBA-16. The molar ratio of F127 to TEOS is (a) 0.001, (b) 0.003, (c) 0.004, (d) 0.005, (e) 0.006, and (f) 0.007.

Powder XRD patterns of calcined SBA-16 mesoporous silicas are shown in FIG. 19, showing the effect of F127 content on the mesostructured SBA-16. It can be observed that in the present example the best synthesis of cubic SBA-16 structure occurs under an optimized F127/TEOS molar ratio of 0.005. No noticeable diffraction peak is observed when the F127/TEOS molar ratio is as low as 0.001. When the F127/TEOS molar ratio increases to 0.003, only one weak diffraction peak centered at $2\theta=0.9°$ appears, indicating a poorly ordered mesostructure. As the ratio increases to 0.005, the sample exhibits one strong diffraction peak and two higher angle peaks in the range of $2\theta=0.8-1.8°$, assigned to (110), (200) and (211) planes. The FWHM (full width at half maximum) of the (110) peak is about 0.2°, indicating the particularly well developed grains. When the F127/TEOS molar ratio increases to 0.006, the XRD pattern becomes less resolved; the diffraction peaks are diminished when the ratio is 0.007.

Figure 20:
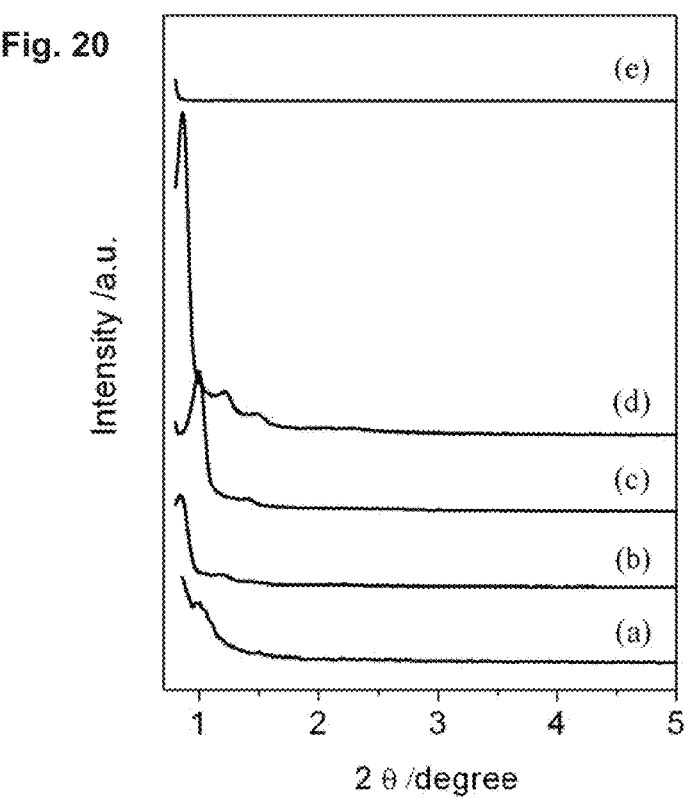
FIG. 20 shows X-Ray Diffraction patterns of SBA-16 of different self-assembly times: (a) SBA-16-01/06; (b) SBA-16-1.5/06; (c) SBA-16-02/06; (d) SBA-16-06/06; (e) SBA-16-02/06 without addition of CTAB.

Synthesis time is an important factor to be concerned in the synthesis method of the present invention modified. The synthesis of SBA-16 by the conventional approach takes approximately 2 days. Using the method of the present invention, CTAB is added as the co-template, aiming at accelerating the formation of F-127 micelles because of CTAB's ionic characteristics. SBA-16 samples were synthesized under a fixed aging time of 6 h with various self assembly times; F127/TEOS molar ratio was regulated as 0.005. FIG. 20 shows the XRD patterns of SBA-16 mesostructured silicas prepared under different self-assembly time. The SBA-16-01/06 sample exhibits only one weak diffraction peak, indicating that the mesostructure is poorly constructed within 1 h of self-assembly time. When the self-assembly time is increased to 1.5 hrs, one strong diffraction peak (110) and one weak peak (200) demonstrate the emerging of a good mesoporous structure. The sample SBA-16-02/06 displays three strong and well-resolved (110), (200) and (211) diffraction peaks of Im3m symmetry, suggesting that 2 hrs are sufficient for self-assembly during the synthesis of a well ordered 3-D mesostructured SBA-16. A longer self-assembly time (6 hrs) results in a better mesoporous structure of SBA-16-06/06.

Figure 21A:
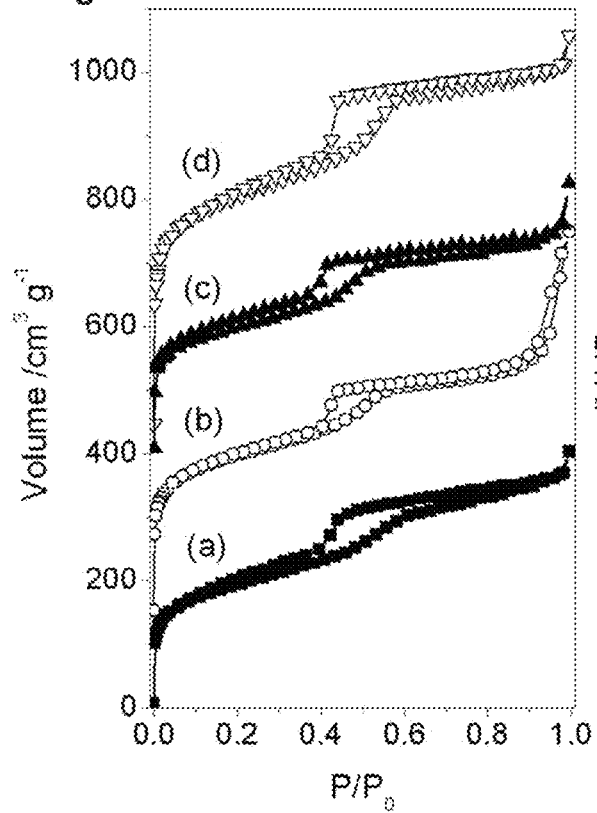
FIG. 21 depicts $N_2$ adsorption/desorption isotherms (A) and pore size distributions (B) calculated from the desorption branch by the BJH method: (a) SBA-16-01/06; (b) SBA-16-1.5/06; (c) SBA-16-02/06; (d) SBA-16-06/06.
Figure 21B:
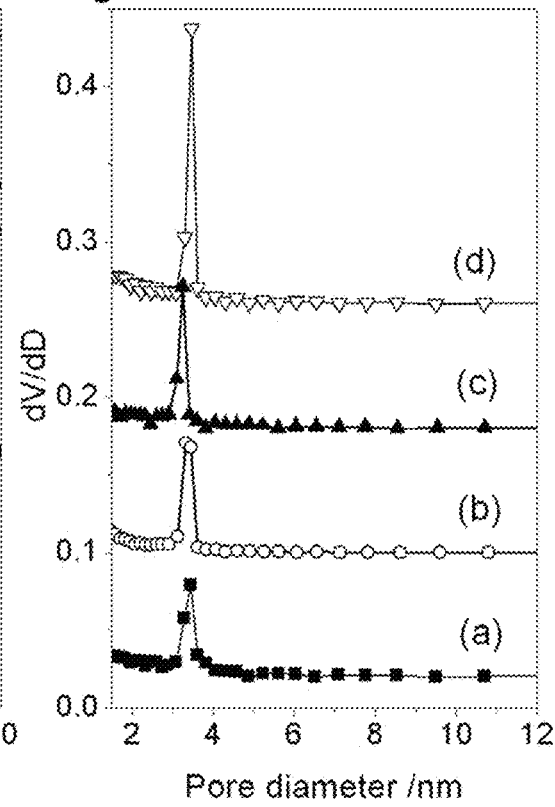

The $N_2$ adsorption-desorption isotherms and pore size distributions of SBA-16 prepared with varied self-assembly times are shown in FIG. 21. Type IV hysteresis loop of SBA-16-01/06 is poorly formed with the absence of any sharp condensation step. For the sample of SBA-16-1.5/06, $N_2$ isotherms form a type IV hysteresis loop with a sharp capillary condensation step on desorption branch at $P/P_0=0.45$. This indicates a good mesoporous structure. SBA-16-02/06 also exhibits a type IV isotherm with a sharper capillary condensation step, which are typical features of highly ordered Im3m mesostructure. All the samples exhibit narrow pore size distribution centered at approximately 3.5 nm. The d spacing, BET surface area, pore size, and pore volume of various SBA 16 samples are summarized in FIG. 17. The SBA 16 sample synthesized by conventional method show a d spacing of 9.0, BET surface area of 1203 $m^2g^{-1}$, and pore volume of 1.35 $cm^3g^{-1}$, which is in good agreement with the results reported elsewhere (Mesa, M., et al, *Solid State Sci.* (2005) 7, 990). Although the d spacing of SBA 16 01/06 is closed to that of SBA-16-cv, the BET surface area (691 $m^2g^{-1}$) and pore volume (0.70 $cm^3g^{-1}$) are lower than that of SBA 16cv. With an increase of the self assembly time, both surface area and pore volume increase remarkably while maintaining the same d spacing. When the self assembly time is 2 h, the surface area and pore volume are 1114 $m^2g^{-1}$ and 1.34 $cm^3g^{-1}$, respectively. Thus, the textural properties of SBA-16 by this new method are comparable to those of SBA-16 by conventional synthesis.

It should be noted the current method shortens the synthesis time by a factor of 6 (from 48 h to 8 h).

Figure 22A:
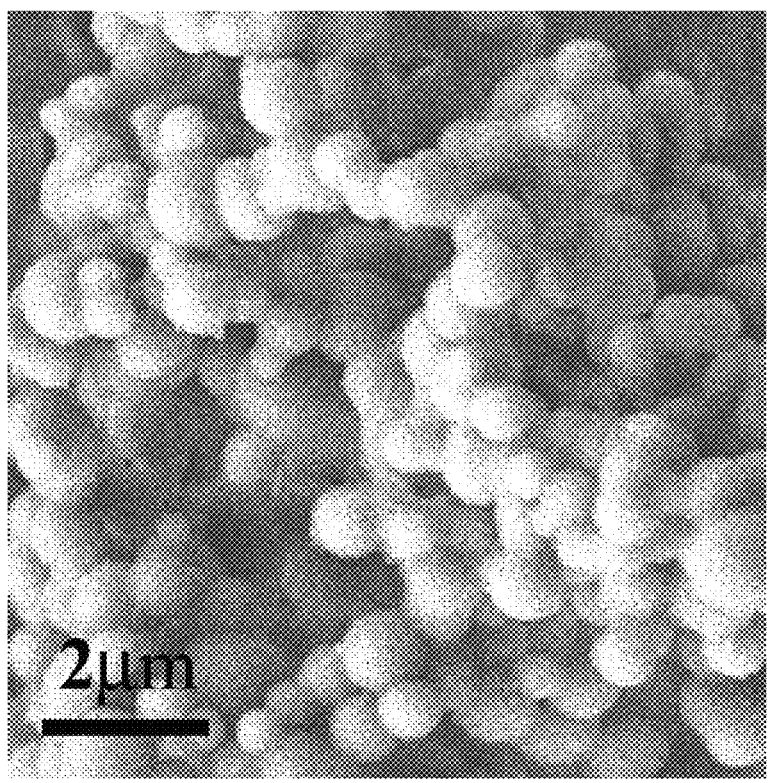
FIG. 22 depicts an SEM image (A) and a TEM image (B) of SBA-16-02/06, showing the mono-dispersed spherical morphology and characteristic planes for a cubic pore structure: (a)(b)[111], (c)(d)[100].
Figure 22B:
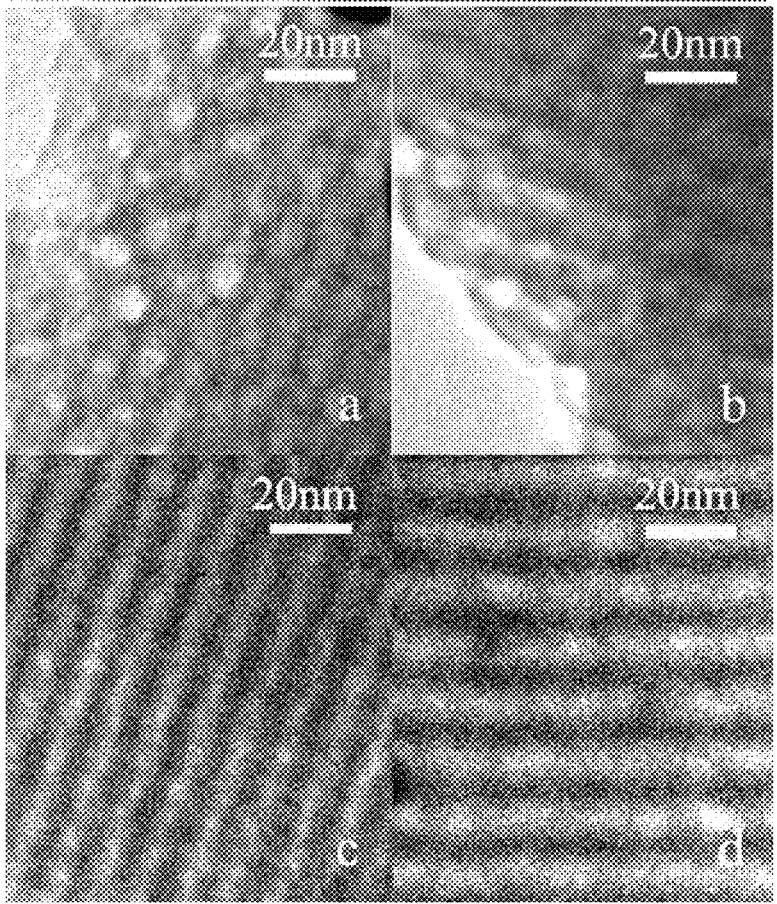

Scanning electron microscope image of as synthesized SBA-16-02/06 is shown in FIG. 22A. The particles exhibit mono dispersed spherical morphology with diameter ranging from 0.8 to 1.2 μm. The nanoporous structure of SBA-16-02/06 was characterized using transmission electron microscopy. Typical micrographs of the as-synthesized particle are shown in FIG. 22B. Well ordered cubic pore structure of ca. 5-6 nm in diameter is clearly observed, which is in good agreement with the analysis of XRD and $N_2$ physisorption.

Results in FIG. 20 suggest that CTAB plays an important role to facilitate the synthesis of SBA-16 within a short time. The role of CTAB was further verified by preparing SBA-16-02/06 in the absence of CTAB (see FIG. 20(e)). No diffraction peaks are observed which indicates amorphous silica characteristic without any long range order structure. It is proposed that cationic surfactant CTAB may enhance the micellization of F127 template by adjusting the conformation of the hydrophilic PEO chains. There can be few hydrogen bonds interacting between F127 micelle and silica precursors without changing the dimension of Im3m mesostructure of SBA-16.

Figure 23:
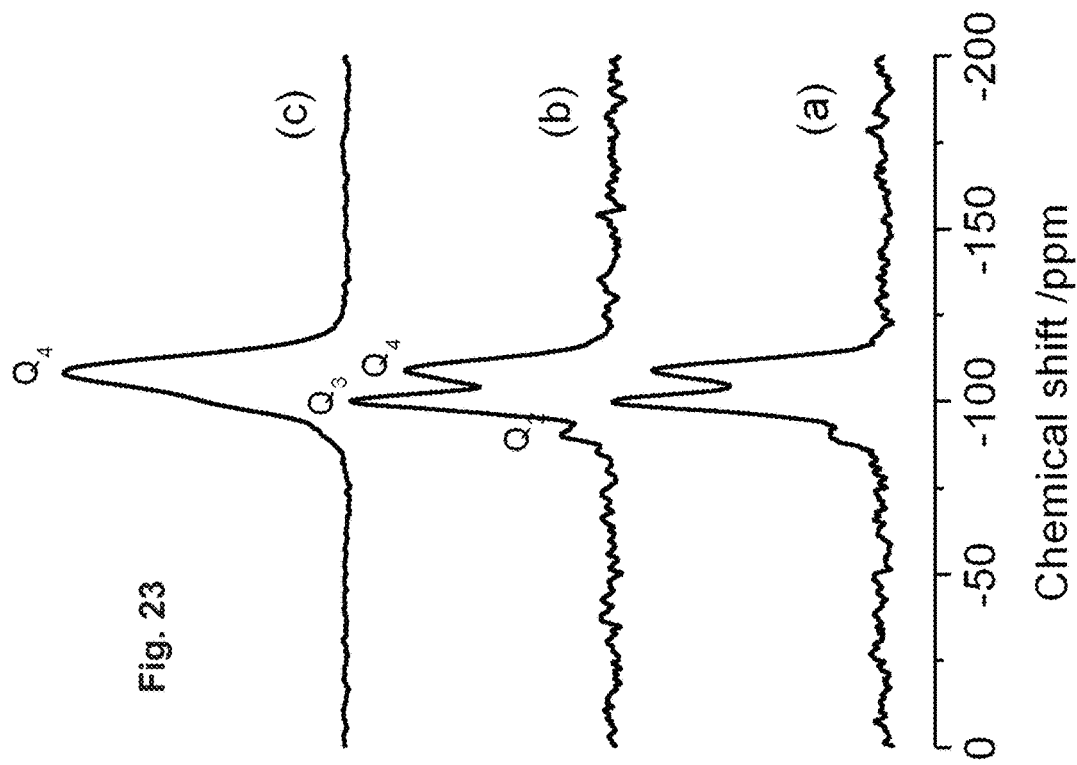
FIG. 23 depicts solid state MNR spectra of calcined SBA-16: (a) SBA-16-02/06; (b) SBA-16-cv; (c) SBA-16-02/06 after thermal treatment.

Although shortening synthesis time has no considerable effect on the order of SBA-16 mesostructure, it is speculated whether the silica local chemical environment is affected. Solid state nuclear magnetic resonance (NMR) spectroscopy has become a powerful tool for structural characterization of mesoporous material and other catalytic materials; it detects the inequivalent environments among the silicon sites. Mesoporous silicas are generally characterized by the presence of silicon sites $Q^2$, $Q^3$, and $Q^4$, representing the species of $Si(OSi)_2(OH)_2$, $Si(OSi)_3(OH)$, and $Si(OSi)_4(OH)$ at −90, −102 and −110 ppm chemical shifts, respectively. $^{29}Si$ solid state NMR spectra of SBA-16-02/06 (before and after thermal treatment) and SBA-16-cv are shown in FIG. 23. Three bands associated with $Q^2$, $Q^3$, and $Q^4$ Si species for fresh SBA-16-02/06 are similar to those of SBA-16 synthesized by the conventional method; there is no significant change in silica local environment when the synthesis time is shortened from 48 hrs to 8 hrs. After thermal treatment, only one peak associated with $Q^4$ Si species can be observed which is due to the condensation of $Q^2$ and $Q^3$ to $Q^4$, during the thermal test.

Figure 24:
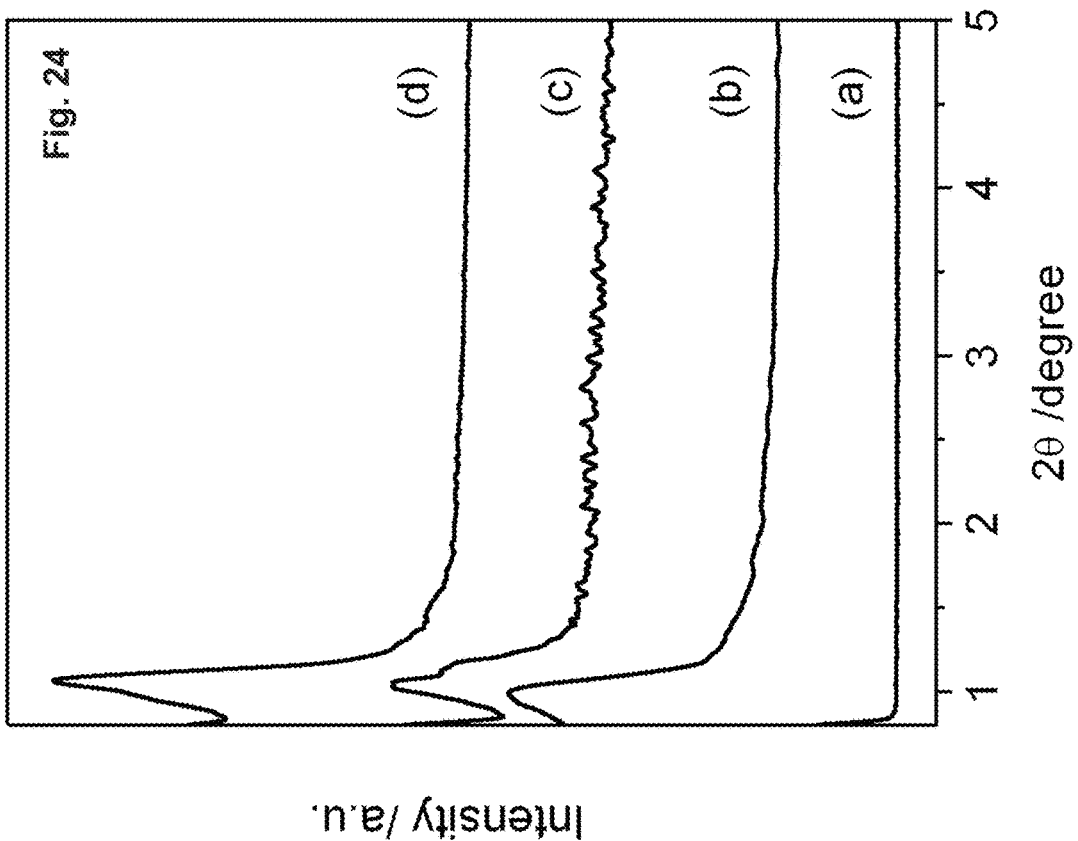
FIG. 24 shows XRD patterns for SBA-16 after hydrothermal and thermal tests: (a) SBA-16-cv-hy; (b) SBA-16-02/06-hy; (c) SBA-16-cv-th, (d) SBA-16-02/06-th.

In this example, hydrothermal, thermal, and mechanical stability tests were carried out to compare the SBA-16 by this modified method and by the conventional approach. The XRD patterns are shown in FIG. 24. Here, "-hy" represents hydrothermal treatment, "-th" represents thermal treatment. After hydrothermal treatment, SBA-16-cv does not exhibit any diffraction peak, suggesting the mesoporous structure is completely destroyed. On the other hand, the XRD pattern of SBA-16-02/06 remains a strong diffraction peak indexed to (110) plane after severe hydrothermal treatment, indicating the excellent hydrothermal stability of SBA-16-02/06. As shown in FIG. 17, the surface area of SBA-16-cv after hydrothermal treatment decreases to 285 $m^2g^{-1}$, and that of SBA-16-02/06 decreases to 527 $m^2g^{-1}$. Only one weak diffraction peak associated with the (110) reflection plane is resolved for SBA-16-cv after thermal test. SBA-16-02/06 is able to maintain a better mesostructure as evidenced by the presence of one strong diffraction peak corresponding to the (110) reflection plane. Moreover, both surface area and pore volume of SBA-16-02/06 after thermal test are much higher than that of SBA-16-cv (FIG. 17). Thus, it is clear that SBA-16 from this new approach possesses higher hydrothermal and thermal stabilities than SBA-16 obtained by a conventional approach.

Figure 25B:
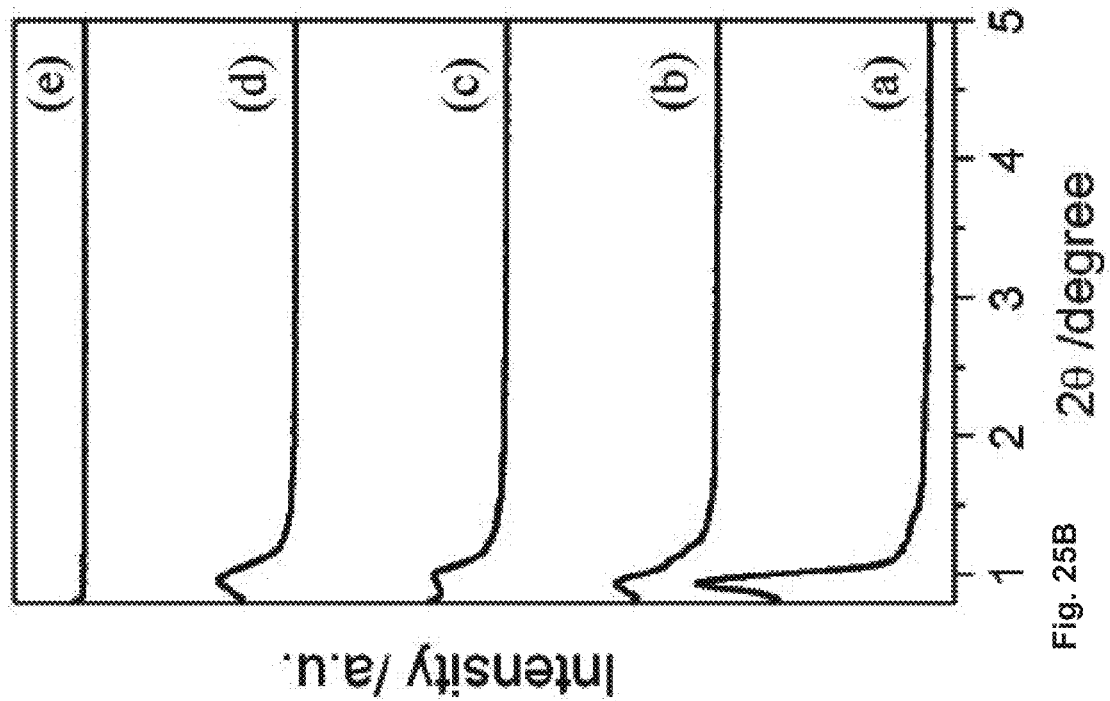
FIG. 25 depicts XRD patterns of calcined SBA-16 (A) and SBA-16-02/06 (B) SBA-16-cv under mechanical press at: (a) 0; (b) 3.15 tons; (c) 4.74 tons; (d) 10.0 tons; (e) 13.5 tons.
Figure 25A:
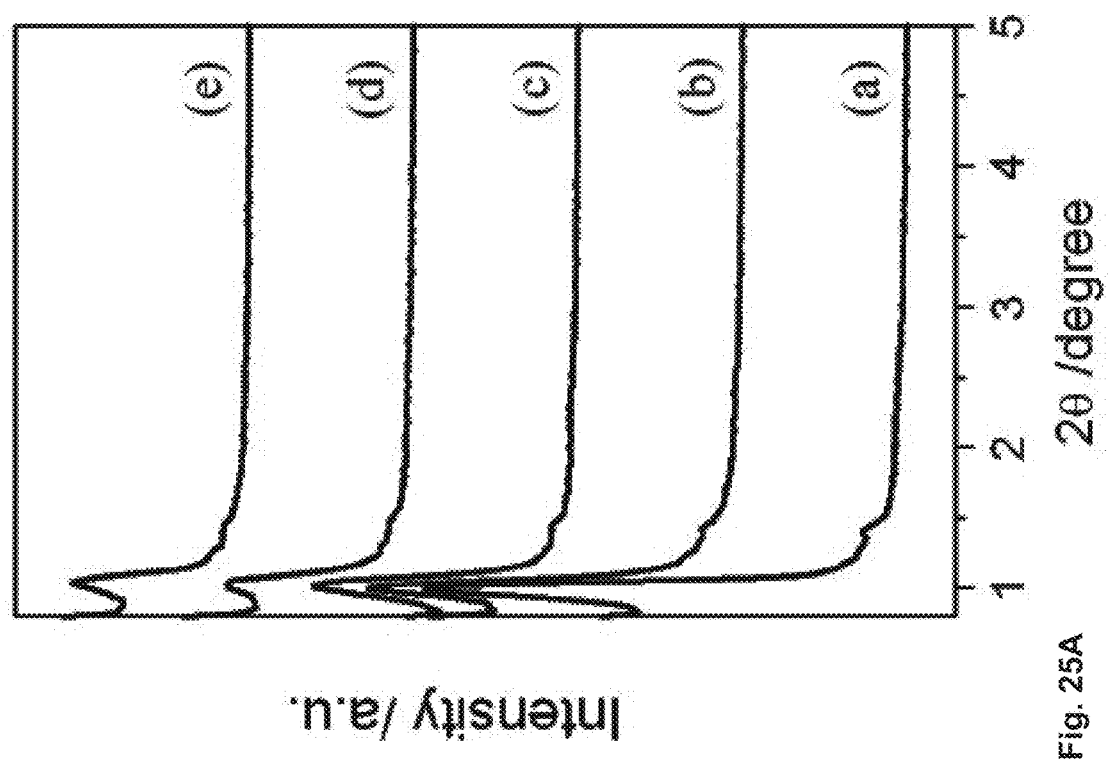

Furthermore, mechanical stability is also concerned and the mechanical pressure test results are shown in FIG. 25. Without applying any press, three well-resolved diffraction peaks indexed to (110), (200) and (211) planes of SBA-16-02/06 characterize a highly ordered Im3m mesoporous structure (FIG. 25B). Under low pressure, these three diffraction peaks are well conserved. The SBA-16-02/06 sample shows one diffraction peak centered at 2θ=1.02° when the pressure has increased to 10.0 tons. The (110) diffraction peak slightly changes as the pressure further increases to 13.5 tons, suggesting an ordered mesostructure can be preserved under a pressure of up to 13.5 tons. As a comparison, conventional SBA-16 was also tested under mechanical pressure (FIG. 25B). SBA-16-cv loses its ordered mesoporous structure with the absence of any diffraction peaks under pressure of 13.5 tons. The textural parameters of both samples with an increase of mechanical pressure are also compared in FIG. 17. Under a pressure of 3.15 tons, the surface area and pore volume of SBA-16-02/06 are 1008 $m^2g^{-1}$ and 0.71 $cm^3g^{-1}$, respectively, and the surface area and pore volume of SBA-16-cv under this pressure are 540 $m^2g^{-1}$ and 0.6 $cm^3g^{-1}$, respectively. With an increase of pressure, surface area and pore volume of both SBA-16-02/06 and SBA-16-cv decrease gradually, but the surface area and pore volume of SBA-16-02/06 under the same pressure are always higher than that of SBA-16-cv. Thus, SBA-16 obtained by the method of the present invention exhibits higher mechanical stability than that of the conventional SBA-16.

Figure 27B:
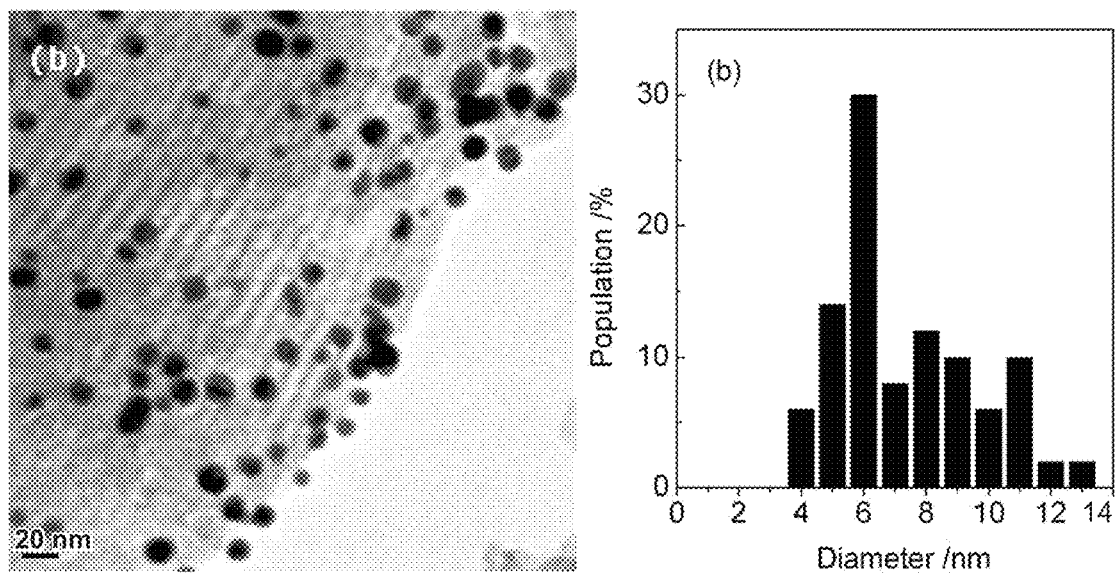
FIG. 27 depicts TEM micrographs of Au-containing mesoporous silica samples as well as the corresponding Au particle size distributions: (a) Au/SBA-16-02/06, (b) Au/SBA-15, (c) AV/MCM-41.
Figure 27C:
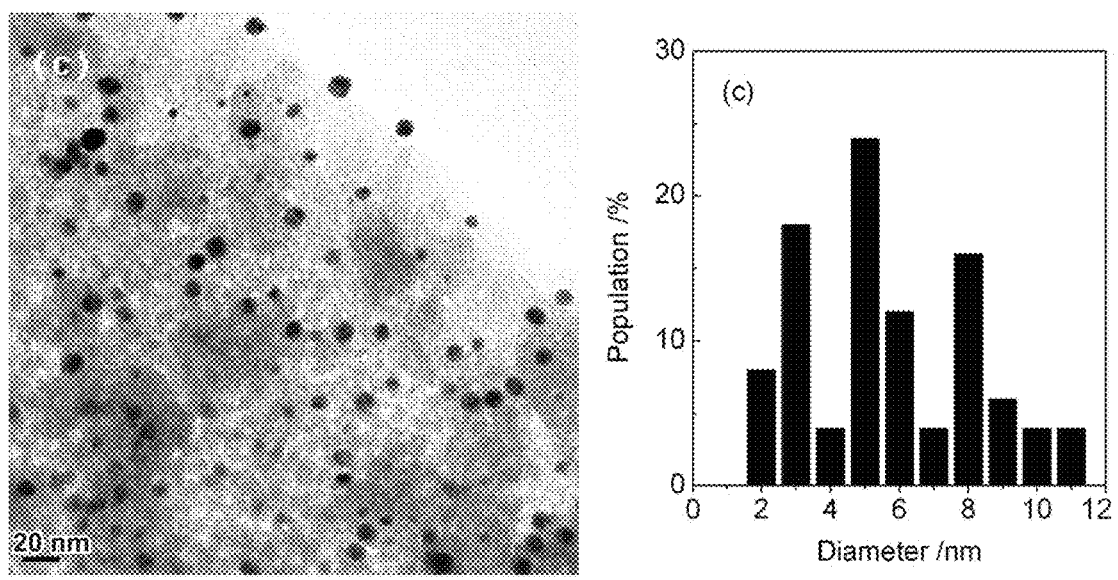

The catalytic results of solvent-free benzyl alcohol selective oxidation with molecular $O_2$ over Au/SBA-16 pretreated under different conditions are listed in FIG. 18. The best catalytic performance is obtained over the SBA-16 sample pretreated in a $H_2$ flow at 400° C., benzyl alcohol conversion is 19.0% and TOF is 2419 $h^{-1}$. The catalytic performances of Au/SBA-15 and Au/MCM-41 catalysts with the same Au content (~1 wt. %) are also investigated for comparison. Although both Au/SBA-15 and Au/MCM-41 have the capability to catalyze the benzyl alcohol oxidation at 160° C., forming benzaldehyde as the main product, both benzyl alcohol conversion and TOF are lower than that of Au/SBA-16. FIG. 26 shows the UV-vis spectra of Au containing mesoporous silica catalysts pretreated in a $H_2$ flow at 400° C. All samples show the characteristic surface plasmon resonance absorption peak of Au nanoparticles at around 520 nm. Compared to Au/SBA-16, Au/MCM-41 and Au/SBA-15 exhibit a slightly red shifted and a narrower absorption band, which indicates a larger mean particle size and more particle aggregation (Link. S., & El-Sayed, M. A., J. Phy. Chem. B (1999) 103, 4212). To examine the Au nanoparticle size, the TEM microscopic observation was performed. As show in FIG. 27, one can discern a homogeneous distribution of Au nanoparticles in the Au/SBA-16 catalyst. The particles are mostly observed in the size range of 2-9 nm, with a maximum of size distribution at 5-6 nm. Particles larger than ca. 7 nm are hardly seen in this sample. Considering the channel structure of SBA-16, it is reasonable to conclude that most of Au nanoparticles are confined inside the cage of SBA-16 structure. On the other hand, relatively large Au nanoparticles with sizes more than ca. 7 nm can be observed in Au/SBA-15 and Au/MCM-41 catalysts. Gold nanoparticles are not well confined in the pore structure of SBA-15 and MCM-41, many large particles may appear outside of the pores. Moreover, the size distributions of Au particles over SBA-15 and MCM-41 are much broader than that of SBA-16. Thus, it is clear that the unique pore structure of SBA-16 is superior to MCM-41 and SBA-15 for confining Au nanoparticles. Combined the catalytic performances of Au containing samples discussed above, it is suggested that the Au nanoparticles with a mean size of 5-6 nm confined within the SBA-16 cage are more active for benzyl alcohol oxidation with molecular $O_2$.

The invention has been described broadly and generically herein. Each of the narrower species and subgeneric groupings falling within the generic disclosure also form part of the invention. This includes the generic description of the invention with a proviso or negative limitation removing any subject matter from the genus, regardless of whether or not the excised material is specifically recited herein. Other embodiments are within the following claims. In addition, where features or aspects of the invention are described in terms of Markush groups, those skilled in the art will recognize that the invention is also thereby described in terms of any individual member or subgroup of members of the Markush group.

One skilled in the art would readily appreciate that the present invention is well adapted to carry out the objects and obtain the ends and advantages mentioned, as well as those inherent therein. Further, it will be readily apparent to one skilled in the art that varying substitutions and modifications may be made to the invention disclosed herein without departing from the scope and spirit of the invention. The compositions, methods, procedures, treatments, molecules and specific compounds described herein are presently representative of preferred embodiments are exemplary and are not intended as limitations on the scope of the invention. Changes therein and other uses will occur to those skilled in the art which are encompassed within the spirit of the invention are defined by the scope of the claims. The listing or discussion of a previously published document in this specification should not necessarily be taken as an acknowledgement that the document is part of the state of the art or is common general knowledge.

The invention illustratively described herein may suitably be practiced in the absence of any element or elements, limitation or limitations, not specifically disclosed herein. Thus, for example, the terms "comprising", "including," containing", etc. shall be read expansively and without limitation. The word "comprise" or variations such as "comprises" or "comprising" will accordingly be understood to imply the inclusion of a stated integer or groups of integers but not the exclusion of any other integer or group of integers. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by exemplary embodiments and optional features, modification and variation of the inventions embodied therein herein disclosed may be resorted to by those skilled in the art, and that such modifications and variations are considered to be within the scope of this invention.

What is claimed is:

1. A method of forming a particulate porous metal oxide or metalloid oxide, the method comprising:
    forming an acidic aqueous solution of a non-ionic surfactant and an ionic surfactant, wherein the non-ionic surfactant and the ionic surfactant self-assemble in the acidic aqueous solution to form a micelle and the ionic surfactant forms a core of the micelle;
    adding to the solution a metal oxide precursor or a metalloid oxide precursor, thereby forming a reaction mixture, the reaction mixture comprising the micelle and the metal oxide precursor or the metalloid oxide precursor;
    agitating the reaction mixture; and
    heating the reaction mixture under reflux following agitation for a period of time sufficient to obtain a particulate porous metal oxide or metalloid oxide.

2. The method of claim 1, wherein agitating the reaction mixture is carried out at an elevated temperature below the boiling point thereof for a period of time sufficient to allow a gel to form.

3. The method of claim 1, wherein heating the reaction mixture under reflux following agitation is carried out in the presence of an alcohol.

4. The method of claims 1, wherein the acidic aqueous solution further comprises an alcohol.

5. The method of claim 1, wherein the metal oxide precursor or metalloid oxide precursor is an alkoxide.

6. The method of claim 1, further comprising removing the surfactant from the product obtained by heating the reaction mixture for a sufficient period of time.

7. The method of claim 6, wherein removing the surfactant is carried out by one of (i) calcining the product obtained by heating the reaction mixture under reflux for a sufficient period of time and (ii) extracting the surfactant from the product obtained by heating the reaction mixture under reflux for a sufficient period of time with a suitable solvent.

8. The method of claim 7, wherein the solvent is ethanol.

9. The method of claim 1, wherein the non-ionic surfactant is a polyether.

10. The method of claim 1, wherein the ionic surfactant is one of an ionic liquid and an alkyl ammonium salt.

11. The method of claim 1, wherein pH of the acidic aqueous solution is selected in the range from about pH 1 to about pH 6.

12. The method of claim 1, wherein forming the acidic aqueous solution further comprises adding an alcohol.

13. The method of claim 1, wherein the non-ionic surfactant is used in a ratio between about 0.001 and about 0.007 to the metal oxide precursor or the metalloid oxide precursor.

14. The method of claim 1, wherein the ionic surfactant is used in a ratio between about 0.01 and about 0.04 to the metal oxide precursor or the metalloid oxide precursor.

15. The method of claim 2, wherein the elevated temperature below the boiling point of the reaction mixture at which a gel is allowed to form is selected in the range from about 35 to about 65° C.

16. The method of claim 1, wherein the method is a method of forming a UPLC matrix.

17. The method of claim 1, wherein the acidic aqueous solution further comprises an inorganic salt.

18. The method of claim 1, wherein the particulate porous metal oxide or metalloid oxide has one or more mesopores having a pore diameter ranging from about 2 nm to about 50 nm.

19. The method of claim 1, wherein the metal oxide precursor or the metalloid precursor are nanoparticles.

20. The method of claim 1, further comprising immobilizing a molecule or moiety onto or into the particulate porous metal oxide or metalloid oxide.

* * * * *

UNITED STATES PATENT AND TRADEMARK OFFICE
CERTIFICATE OF CORRECTION

PATENT NO. : 10,464,811 B2
APPLICATION NO. : 12/754519
DATED : November 5, 2019
INVENTOR(S) : Yanhui Yang et al.

Page 1 of 1

It is certified that error appears in the above-identified patent and that said Letters Patent is hereby corrected as shown below:

On the Title Page

Item (56), Other Publications, NPL beginning with "Holt et al.":
"Trends" should read --TRENDS--.

Item (56), Other Publications, NPL beginning with "Kleitz et al.":
"lm3m" should read --Im3m--.

Item (56), Other Publications, NPL beginning with "Kadin et al.":
"Kadin" should read --Radin--.

Signed and Sealed this
First Day of September, 2020

Andrei Iancu
*Director of the United States Patent and Trademark Office*